(12) United States Patent  (10) Patent No.: US 7,726,890 B2
Misawa  (45) Date of Patent: Jun. 1, 2010

(54) CAMERA

(75) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 472 days.

(21) Appl. No.: 11/653,236

(22) Filed: Jan. 16, 2007

(65) Prior Publication Data

US 2007/0166027 A1    Jul. 19, 2007

(30) Foreign Application Priority Data

Jan. 19, 2006  (JP)  ............................. 2006-011614
Jan. 19, 2006  (JP)  ............................. 2006-011615
Jan. 19, 2006  (JP)  ............................. 2006-011616

(51) Int. Cl.
    *G03B 17/00*  (2006.01)
(52) U.S. Cl. .......................... 396/529; 396/84; 396/373; 348/360
(58) Field of Classification Search ................. 396/71, 396/84, 148, 378, 422, 529, 540, 541, 373, 396/383; 348/53, 360, 373, 375; 248/222.52
    See application file for complete search history.

(56) References Cited

U.S. PATENT DOCUMENTS

| | | | | |
|---|---|---|---|---|
| 3,913,116 | A * | 10/1975 | Kastner et al. | 396/383 |
| 3,940,777 | A * | 2/1976 | Komine | 396/85 |
| 6,101,339 | A * | 8/2000 | Miki et al. | 396/301 |
| 6,549,650 | B1 * | 4/2003 | Ishikawa et al. | 382/154 |
| 6,567,618 | B2 * | 5/2003 | Kai et al. | 396/299 |
| 6,864,911 | B1 * | 3/2005 | Zhang et al. | 348/42 |
| 7,102,686 | B1 * | 9/2006 | Orimoto et al. | 348/375 |
| 7,280,151 | B2 * | 10/2007 | Kojima et al. | 348/373 |
| 2003/0086006 | A1 * | 5/2003 | Misawa | 348/231.99 |
| 2004/0165107 | A1 * | 8/2004 | Yip | 348/375 |

FOREIGN PATENT DOCUMENTS

| | | |
|---|---|---|
| JP | 45-1345 U | 1/1970 |
| JP | 52-141288 U | 10/1977 |
| JP | 56-117739 U | 9/1981 |

(Continued)

OTHER PUBLICATIONS

Machine translation of JP 2000-187268A.*

(Continued)

*Primary Examiner*—W B Perkey
*Assistant Examiner*—Linda B Smith
(74) *Attorney, Agent, or Firm*—Sughrue Mion, PLLC

(57) ABSTRACT

An aspect of the present invention provides a lens-interchangeable camera which has operability equal to a right-handed user and a left-handed user without necessity of any addition of extra members and without sacrificing a design for a smaller size. Since a camera according to the present invention does not need any extra members, a user-friendly camera which eliminates any disadvantage for a use by left-handed persons at a high level that any conventional cameras have not yet achieved can be achieved. Also, since a camera body can be disposed on a left side as needed even for a right-handed user and the right-handed user can operate the camera body only with his/her left hand, this form is convenient when the user picks up images while the user is operating another apparatus with his/her right hand.

2 Claims, 42 Drawing Sheets

FOREIGN PATENT DOCUMENTS

| | | | |
|---|---|---|---|
| JP | 57-115024 | U | 7/1982 |
| JP | 60-57271 | U | 4/1985 |
| JP | 63-178962 | U | 11/1988 |
| JP | 02-82173 | U | 6/1990 |
| JP | 3-117982 | U | 12/1991 |
| JP | 04-103269 | A | 4/1992 |
| JP | 05-181047 | A | 7/1993 |
| JP | 06-014223 | A | 1/1994 |
| JP | 06-098210 | A | 4/1994 |
| JP | 07-131690 | A | 5/1995 |
| JP | 08-116476 | A | 5/1996 |
| JP | 09-037131 | A | 2/1997 |
| JP | 10-215396 | A | 8/1998 |
| JP | 11-295809 | A | 10/1999 |
| JP | 11-305293 | A | 11/1999 |
| JP | 2000187268 | A * | 7/2000 |
| JP | 2001-142107 | A | 5/2001 |
| JP | 2002-040540 | A | 2/2002 |
| JP | 2002-051253 | A | 2/2002 |
| JP | 2002-077675 | A | 3/2002 |
| JP | 2003-66522 | A | 3/2003 |
| JP | 2003-344943 | A | 12/2003 |
| JP | 2005-286497 | A | 10/2005 |

OTHER PUBLICATIONS

Japanese Office Action, corresponding to Japanese Appln. No. 2006-11616, dated Feb. 24, 2010.

Japanese Office Action, corresponding to Japanese Appln. No. 2006-11615, dated Feb. 24, 2010.

Japanese Office Action, corresponding to Japanese Appln. No. 2006-11614, dated Feb. 24, 2010.

Windy Co., "Fujifilm FinePix S602," "DCM Review, Digital Camera Magazine, Jul. 1, 2002, vol. 3, No. 7, pp. 169-183.

Fumihiko Fujiki, "Improvement of a home-use camera for video shooting education", 1999 Proceeding of the Institute of Electronics, Information and Communication Engineers General Conference, Information and system 1, Mar. 8, 1999, p. 275.

Japanese Office Action, corresponding to Japanese Appln. No. 2006-11614, dated Mar. 24, 2010.

Japanese Office Action, corresponding to Japanese Appln. No. 2006-11615, dated Mar. 23, 2010.

Japanese Office Action, corresponding to Japanese Appln. No. 2006-11616, dated Mar. 23, 2010.

* cited by examiner

CAMERA

BACKGROUND OF THE INVENTION

1. Field of the Invention

The present invention relates to a camera, in particular, a camera having a camera body with a grip part to and from which an interchangeable lens part having an image pickup device can be attached and removed.

2. Description of the Related Art

Japanese Patent Application Laid-Open No. 2003-344943 discloses a digital camera which includes a low-profile camera body having a connector, and the digital camera is adapted to right-handed and left-handed persons by selectively replacing an accessory for right-handed persons and an accessory for left-handed persons which are provided with operation buttons such as a shutter release button and attaching the selected accessory to the camera body via the connector.

Japanese Patent Application Laid-Open No. 2003-66522 discloses a digital camera which includes a camera body, a lens cover for covering a lens for image pickup at a front surface of the camera body, and the digital camera is set to be a camera for right-handed persons upon a detection of a position of the lens cover when the lens cover is slided to the left side of an image pickup optical system relative to the front surface of the camera body, while the digital camera is set to be a camera for left-handed persons upon a detection of a position of the lens cover when the lens cover is slid to the right side of the image pickup optical system relative to the front surface of the camera body.

Japanese Patent Application Laid-Open No. 2001-142107 discloses a lens-interchangeable digital camera which includes a camera body having an image pickup device and a rectangular camera mount part at a front surface of the camera body, and a rectangular lens mount for a lens barrel of the interchangeable lens is removably mounted to the camera mount part.

SUMMARY OF THE INVENTION

However, the cameras of the above Japanese Patent Application Laid-Open Nos. 2003-344943 and 2003-66522 are configured to be adaptable to both right-handed persons and left-handed persons, but are compact cameras with a lens part being housed in a camera body, and it is not intended to adopt the cameras to a camera having a lens barrel of a relatively large lens of an interchangeable lens type. Conventionally, no camera of an interchangeable lens type has been structured so that it can be adapted for both right-handed persons and left-handed persons.

In the camera of the above Japanese Patent Application Laid-Open No. 2003-344943, because an accessory for right-handed persons and an accessory for left-handed persons are members separated from the camera, the accessories are extra members, and the accessories have to be replaced depending on a user, resulting in a burdensome work for a user.

Moreover, the lens-interchangeable digital camera of the above Japanese Patent Application Laid-Open No. 2001-142107 has an image pickup device built in a camera body to which a lens part is connected at the rear end thereof, and this configuration limits the use of the lens mount of the lens part to the connection with the camera body.

Meanwhile, the structure of the camera of the above Japanese Patent Application Laid-Open No. 2001-142107, that is, a structure in which a lens part is connected to a camera body at the rear end thereof, is not essential for a type of a camera in which a lens part having an image pickup device built therein is replaced with respect to a camera body. Furthermore, in the camera of the above Japanese Patent Application Laid-Open No. 2003-344943, an accessory member is connected to a camera body, and a separate connecting device which is exclusively used to the accessory member is provided, which makes the configuration of the camera complicated.

Since the lens-interchangeable digital camera of the above Japanese Patent Application Laid-Open No. 2001-142107 has a configuration in which a lens part is connected to a camera body at the rear end thereof, a lens mount of the lens part does not function as a rotation axis, resulting in that a position of the camera body cannot be changed as desired relative to the lens part for image pickup. That is, a relative rotation between the lens part and the camera body only causes the lens part to rotate about an optical axis, which limits its function as a camera.

The above problem is similarly found not only in a lens-interchangeable camera as Japanese Patent Application Laid-Open No. 2001-142107 which has a camera body with an image pickup device built therein and a single unit of a lens part to be separately replaced, but also a lens-interchangeable camera in which a lens part with an image pickup device built therein is replaced with respect to a camera body. However, no conventional camera has been designed to have a mount at the most appropriate position.

The present invention was made in view of the above situation, and one object of the present invention is to provide a lens-interchangeable camera which has operability equal to a right-handed user and a left-handed user without necessity of adding extra members and without sacrificing a design for a smaller size. More particularly, one object of the present invention is to achieve a user-friendly camera which eliminates any disadvantage for a use by left-handed persons at a high level that any conventional cameras have not yet achieved.

The present invention was made in view of the above situation, and another object of the present invention is to provide a lens-interchangeable camera having a lens part with an image pickup device built therein for a replacement as an integral unit, the camera being provided with the most appropriate mount placement/mount structure, and various accessory members can be reliably connected to the camera without necessity of any connecting device which is exclusively used for the accessory members.

The present invention was made in view of the above situation, and still another object of the present invention is to provide a camera which has excellent operability by providing the most appropriate mount placement.

A first aspect of the present invention provides, in order to achieve the above objects, a camera including: a lens part having an image pickup device; a camera body which has a grip part, and to and from which the lens part is attached and removed; and a mount part which is provided on each of opposite sides of the lens part, and to and from which the camera body is attached and removed.

According to the first aspect of the present invention, a camera body is mounted to a mount part which is provided on a right side of a lens part as seen from a user for a right-handed user, and the camera body is mounted to a mount part which is provided on a left side of the lens part as seen from a user for a left-handed user. According to the present invention, this configuration provides a lens-interchangeable camera which has operability equal to a right-handed user and a left-handed user without necessity of any addition of extra members and without sacrificing a design for a smaller size. Since a camera according to the present invention does not need any extra members, a user-friendly camera which eliminates any disadvantage for a use by left-handed persons at a high level that any conventional cameras have not yet achieved can be achieved. Also, since a camera body can be disposed on a left side as needed even for a right-handed user and the right-handed user can operate the camera body only with his/her left hand, this form is convenient when the user picks up images while the user is operating another apparatus with his/her right hand.

A second aspect provides the camera according to the first aspect of the present invention, further comprising an image displaying section which is provided to the lens part.

According to the second aspect of the present invention, when a camera body, which is also used as a grip part, has an image displaying section therein, the camera body inevitably has a large size to keep a room for the image displaying section, but since a relatively large lens part itself has such a room for an image displaying section, even when an image displaying section is provided in a lens part, the size of the lens part will not be changed. Also, since the mount parts are provided on opposite sides of the lens part, the image displaying section is preferably provided at a rear portion of the lens part or a rear surface of the lens part, so that a user who is behind the lens part can check an image without disturbance of the camera body which is mounted to the lens mount part.

A third aspect of the present invention, in order to achieve the above objects, provides a camera including: a lens part having an image pickup device and a plurality of mount parts; a camera body which is mounted to one of the plurality of mount parts; and a switching device which is provided to the camera body, the switching device for switching a camera control which is performed by a camera operating member provided to the camera body.

According to the third aspect of the present invention, a lens part is provided with a plurality of mount parts, and to a selected one of the mount parts, a camera body can be mounted. In this case, depending on a position of the mount where the camera body is mounted, it is desirable to switch a camera control which is performed by a camera operating member. For example, when the camera body is mounted at an operating position for right-handed persons, a button at a position where the user can easily operate with the index finger of his/her right hand is set to be a button for image pickup, but when the camera body is mounted at an operating position for left-handed persons, the button for image pickup is not always located at a position where the user can easily operate with the index finger of his/her left hand. Thus, in the latter case, a button at a position where the user can easily operate with the index finger of his/her left hand is preferably switched into a button for image pickup (assignments of button functions are changed). According to the third aspect of the present invention, a camera control performed by a camera operating member such as a button for image pickup is manually switched by using a switching device. For example, a question whether a switching is performed or not is displayed on a display section of a touch panel which is superimposed on the image displaying section, so that a user is allowed to select an answer by pushing a button of the touch panel. This provides a user-friendly camera which eliminates any disadvantage for a use by left-handed persons.

A fourth aspect of the present invention provides, in order to achieve the above objects, a camera including: a lens part having an image pickup device and a plurality of mounts; a camera body having an identifying device for identifying to which one of the plurality of mount parts the camera body is mounted; and a switching device which is provided to the camera body, the switching device for switching a camera control which is performed by a member provided to the camera body based on the mount part identified by the identifying device.

The fourth aspect is the camera according to the third aspect of the present invention in which a camera control is automatically switched. That is, when the camera body is mounted to a mount part, an identifying device identifies to which one of the plurality of mount parts the camera body is mounted. And based on the identified mount part, a switching device switches a camera control which is performed by a member provided to the camera body. This automatically provides the most appropriate operability of the camera body depending on a position of the mount where the camera body is mounted relative to the lens part. The member may be a camera operating member and a display screen, and when a display screen is used, the facing direction of the screen, a display position of a menu, and the like is switched into the one which is easily seen by a user.

A fifth aspect provides the camera according to any one of the first to fourth aspects of the present invention, in which the camera body has a rotatable viewfinder therein which is caused to rotate depending on a mounted position of the camera body relative to the lens part.

According to the fifth aspect of the present invention, a rotation of a viewfinder allows the camera to be used both with a right hand operation by right-handed persons and with a left hand operation by left-handed persons.

A sixth aspect of the present invention provides, in order to achieve the above objects, a camera including: a lens part having an image pickup device; a camera body which has a grip part, and to and from which the lens part is attached and removed; and a mount part which is provided on each of opposite sides of a lens barrel of the lens part, and to and from which the camera body and an accessory member is attached and removed.

According to the sixth aspect of the present invention, the camera body is mounted to a mount which is provided on a right side of a lens part as seen from a user for a right-handed user, and a camera body is mounted to a mount part which is provided on a left side of a lens part as seen from a user for a left-handed user. Then, an accessory member is mounted to the mount on the right side of the lens part. According to the present invention, this configuration provides the most appropriate mount placement/mount structure for a lens-interchangeable camera in which a lens part having an image pickup device built therein is replaced as a single unit, and various accessory members can be reliably connected to the camera in a simple structure without necessity of any connecting device which is exclusively used for the accessory members.

A seventh aspect of the present invention provides, in order to achieve the above objects, a camera including: a lens part having a plurality of mount parts; a camera body having an identifying device for identifying to which one of the plurality of mounts the camera body is mounted; an accessory member which is mounted to one of the plurality of mounts; and a switching device which is provided to the camera body, the switching device for switching a camera control based on the mount identified by the identifying device.

According to the seventh aspect of the present invention, a lens part is provided with a plurality of mount parts to one of which a camera body is mounted and also to the one of which an accessory member is mounted. In this case, depending on a position of the mount where the camera body is mounted, it is desirable to switch a camera control which is performed by a camera operating member. For example, when the camera body is mounted at an operating position for right-handed persons, a button at a position where the user can easily operate with the index finger of his/her right hand is set to be a button for image pickup, but when the camera body is mounted at an operating position for left-handed persons, the button for image pickup is not always located at a position where the user can easily operate with the index finger of his/her left hand. Thus, in the latter case, a button at a position where the user can easily operate with the index finger of his/her left hand is preferably switched into a button for image pickup (assignments of button functions are changed). When a camera control performed by a camera operating member such as a button for image pickup is manually switched by using a switching device, for example, for example, a question whether a switching is performed or not is displayed on a display section of a touch panel which is superimposed on the image displaying section, so that a user is allowed to select an answer by pushing a button of the touch panel. This provides a user-friendly camera which eliminates any disadvantage for a use by left-handed persons. Also when a camera control is automatically switched, an identifying device which is provided to a lens part of a camera body is caused to identify to which mount part of a plurality of mount parts the camera body is mounted, so that, based on the identified mount part, a camera control which will be performed by a camera operating member provided to the camera body is automatically switched by a switching device. This automatically provides the most appropriate operability of the camera body depending on a position where the camera body is mounted relative to the lens part. The identifying device may be provided to the lens part.

An eighth aspect provides the camera according to the sixth or seventh aspect of the present invention, in which the accessory member is a flash unit, and a flash light emission control signal and a power are supplied to the flash unit via the lens part from the camera body or from the lens part.

According to the eighth aspect of the present invention, a camera body and a flash unit can be selectively connected to a plurality of mount parts, thereby a power can be supplied to the flash unit via the lens part from the camera body or from the lens part, and can be controlled. The accessory member is not limited to a flash unit, and may be an electronic viewfinder for example. In the latter case, a preview image is supplied via the lens part, and a power is supplied via the lens part from the camera body or from the lens part.

A ninth aspect of the present invention provides, in order to achieve the above objects, a camera including: a lens part having an image pickup device; and a camera body which has a grip part, and to and from which the lens part is attached and removed, wherein the camera body is mounted to the lens part via an accessory member.

According to the ninth aspect of the present invention, since a camera body is connected via an accessory member to a mount part on a lens part, various accessory members can be reliably connected in a simple structure without necessity of any connecting device which is exclusively used for the accessory members.

A tenth aspect of the present invention provides, in order to achieve the above objects, a camera including: a lens part which includes a lens barrel having a lens barrel body that has an image pickup device built therein and a mount part on a side surface thereof; a camera body which is removably mounted to the mount part on the lens part, the mounted camera body being rotatable relative to the lens part.

According to the tenth aspect of the present invention, an angle of a camera body which also functions as a grip part can be adjusted by using a mount part so that the camera body is arranged at the most appropriate angle which reduces physical strain on the wrist of a user.

An eleventh aspect provides the camera according to the tenth aspect of the present invention, further including: an angle detecting device for detecting a relative rotation joint angle between the lens part and the camera body; and a switching device for switching a camera control based on the angle detected by the angle detecting device.

According to the eleventh aspect of the present invention, after a camera body is mounted to the lens part via a mount part, for example in order to change the camera having a specification for right hand operation by right-handed persons into the camera having a specification for left hand operation by left-handed persons, the lens part is reversed about an optical axis by 180 degrees to dispose the camera body on the left side as seen from a user, and also the camera body is reversed by 180 degrees relative to the lens part. This changes a specification for right-handed persons of the camera into a specification for left-handed persons. In this case, a relative rotation joint angle between the lens part and the camera body is detected by an angle detecting device, so that a camera control performed by a camera operating member which is provided to the camera body is switched by a switching device based on the detected angle. This automatically provides the most appropriate operability of the camera body depending on a position where the camera body is mounted relative to the lens part.

A twelfth aspect provides the camera according to the eleventh aspect of the present invention, further comprising an image displaying section which is provided to the lens part, wherein the switching device switches an upright or vertical flip display of an image which is displayed on the image displaying section, based on the angle detected by the angle detecting device.

According to the twelfth aspect of the present invention, for example, when a specification for right-handed persons of the camera is changed into a specification for left-handed persons, the angle detecting device detects an angle of 180 degrees, thereby the switching device vertically flips the image displayed on the image displaying section. In this way, even when a specification for right-handed persons of the camera is changed into a specification for left-handed persons, no image is displayed upside down.

A thirteenth aspect of the present invention provides, in order to achieve the above objects, a camera including: a camera body; a lens; and a circular mount part which is provided to each of the camera body and the lens part, the mount part for connecting the camera body and the lens part, wherein one of the mount parts has a cylindrical recess into which a groove is formed in the inner circumferential surface thereof, and the other mount part has a pawl which fits in the groove, so that the camera body and the lens part are rotatably connected to each other with the pawl being engaged into the groove.

According to the thirteenth aspect of the present invention, a simple rotatable mechanism of a pawl and a recess enables an adjustment of a rotation angle of the camera body without adding any extra structure member. The camera body can be positioned at the most appropriate rotation angle in picking up both a static image and a dynamic image.

A fourteenth aspect of the present invention provides, in order to achieve the above objects, a camera including: a camera body; a lens part; and a circular mount part which is provided to each of the camera body and the lens part, the mount part for connecting the camera body and the lens part, wherein each mount part has an electric contact which is used as a terminal for a power supply, an operation system, a heavy current, or a reduction of time lag, and other communicating device which is used for image data having a small capacity.

According to the fourteenth aspect of the present invention, since an electric contact which is suitable to a power or an operation system, and a radio communication which is suitable to data communication of a large capacity are used together, the size of each mount part is reduced with a less number of terminals, while sufficient communication response can be secured. Image data having a small capacity may be transmitted through an electric contact.

A fifteenth aspect of the present invention provides, in order to achieve the above objects, a camera including: a lens part which includes a lens barrel having a lens barrel body that has an image pickup device built therein and a mount on a side surface thereof; a camera body which is removably mounted to the mount part of the lens part, the camera body being rotatable relative to the lens part; an angle detecting device for detecting a rotation angle of the camera body relative to the lens part; and a switching device for switching an operation mode of the camera body into a predetermined mode based on the rotation angle detected by the angle detecting device.

According to the fifteenth aspect of the present invention, since the camera body can be rotatable by using a rotatable mount part, an operation mode of the camera is automatically switched into a predetermined mode, which enhanced an operability of the camera.

A sixteenth aspect of the present invention provides, in order to achieve the above objects, a camera including: a camera body; a lens part integrally having an image pickup device therein; and a mount part which is provided to each of the camera body and the lens part, the mount part for removably connecting the camera body and the lens part, wherein one of the mounts has a plurality of patterns concentrically formed therein about the center of the mount part, and the other the mount parts has a plurality of contacts radially arranged thereon about the center of the mount part.

According to the sixteenth aspect of the present invention, when the camera body and the lens part are removably connected, the camera body and the lens part are kept conductive in spite of the position of the mount on the lens part after rotation. Also, flexible cables and wirings will not be twisted, which provides a high durability.

A seventeenth aspect provides the camera according to the sixteenth aspect of the present invention, in which the plurality of radially arranged contacts are arrayed in a plurality of rows.

According to the seventeenth aspect of the present invention, in connecting the camera body to the lens part, a plurality of contacts are brought into contact with one pattern, resulting in that the camera body and the lens part are kept conductive in spite of the position of the mount after rotation.

An eighteenth aspect provides the camera according to the sixteenth or seventeenth aspect of the present invention, in which the plurality of radially arranged contacts are radially arranged in a plurality of lines which do not interfere each other, and adjacent patterns of the pattern individually contact a contact on a different line.

According to the eighteenth aspect of the present invention, since contacts are radially arranged in a plurality of lines which do not interfere each other, even when the contacts are arranged between wide spaces, the mount part can be configured in a compact size.

A nineteenth aspect of the present invention provides, in order to achieve the above objects, a camera including: a camera body; and a lens part integrally having an image pickup device; and a mount part which is provided to each of the camera body and the lens part, the mount part for removably connecting the camera body and the lens part, wherein one of the mount parts has a plurality of patterns concentrically formed therein about the center of the mount part, and the other mount part has a plurality of contacts spirally arranged therein about the center of the mount part.

According to the nineteenth aspect of the present invention, since contacts are spirally arranged, even when the contacts are arranged between wide spaces, the mount part can be configured in a compact size.

A twentieth aspect of the present invention provides, in order to achieve the above objects, a camera including: a lens part which includes a lens barrel having a lens barrel body that has an image pickup device built therein, a mount on a side surface thereof, and an image displaying section on a rear surface thereof; a camera body which is removably mounted to the mount part of the lens part, the mounted camera body being rotatable relative to the lens part; an angle detecting device for detecting a rotation angle of the camera body relative to the lens part; and a controlling section which is capable to display and record an image which is displayed on an image displaying section after flipping the image, based on the rotation angle detected by an angle detecting device.

According to the twentieth aspect of the present invention, since the camera can be used with left hand for image pickup by rotating the camera body using a rotatable mount part, the one camera can be used by both a right-handed user and a left-handed user.

A twenty-first aspect provides the camera according to any one of the tenth to twentieth aspects of the present invention, in which the mount part is provided with a click mechanism for providing a click at a predetermined rotation angle.

According to the twenty-first aspect of the present invention, the click mechanism makes it easy to maintain the position of the rotated camera body relative to the lens part.

A twenty-second aspect provides the camera according to any one of the tenth to twenty-first aspects of the present invention, in which the lens part is provided with a mount part for mounting an accessory member.

According to the twenty-second aspect of the present invention, an accessory member such as an electronic flashlight unit can be mounted onto a mount part for mounting an accessory member, which enhances an image pickup function of the camera.

A twenty-third aspect provides the camera according to any one of the tenth to twenty-first aspects of the present invention, in which the camera body is mounted onto the mount part of the lens part via an accessory member.

According to the twenty-third aspect of the present invention, when an accessory member such as an electronic flashlight unit is mounted, the camera body can be mounted onto the mount part of the lens part via the accessory member without adding a mount part for mounting an accessory member provided to the lens part.

A twenty-fourth aspect of the present invention provides, in order to achieve the above objects, a camera including: a lens part which includes a lens barrel having a lens barrel body that has an image pickup device built therein and a mount on a side surface thereof; and a camera body which is removably mounted to the mount part of the lens part at a plurality of different angles relative to the lens part.

According to the twenty-fourth aspect of the present invention, a removable mount of the mount part at a different angle provides a camera type which is suitable for various operation modes such as a dynamic image pickup, a static image pickup, and the like.

A twenty-fifth aspect of the present invention provides the camera according to the fifteenth aspect, further including: a mount angle detecting device for detecting a mount angle of the camera body relative to the lens part; and a switching device for switching an operation mode of the camera body into a predetermined mode based on the rotation angle detected by the mount angle detecting device.

According to the twenty-fifth aspect of the present invention, a removable mount of the mount part at a different angle switches an operation mode of the camera, which enhances the operability of the camera.

A twenty-sixth aspect of the present invention provides a camera comprising: a lens part having an image pickup device therein; a camera body which has a grip part, and to and from which the lens part is attached and removed; and a mount part which is provided at least one side of the lens part, and to and from which the camera body is attached and removed.

The above-described Japanese Patent Application Laid-Open No. 2003-344943 discloses a camera in which a camera body is attached to a rear end portion of a lens part. However, in such camera, since a grip part is arranged far from a center of gravity in an optical axis direction, it is difficult to balance the camera in holding, and as a result, the camera is not convenient to the user.

In contrast, according to the twenty-sixth aspect, since a grip part can be closely arranged to a center of gravity in an optical axis of a camera, a user-friendly camera is provided (for example, user can easily hold the camera in a balanced state). In addition, since a camera body can be attached via an accessory unit, the accessory unit can be arranged at an appropriate position without providing an additional mount, and moreover, an accessory which requires an opening at a rear end portion thereof (a finder unit and the like) can be attached without interfering the camera body, and further more, an accessory unit which requires an opining at a front end portion thereof (an electronic flash unit and the like) can be attached without interfering a lens part.

A twenty-seventh aspect of the present invention provides a camera, comprising: a lens part having an image pickup device and a mount part, provided on at least one side of a lens barrel, to and from which a camera body is attached and removed; a camera body which has a grip part; and an accessory unit, wherein the mount part is provided at a side of the accessory unit and the camera body so that the camera body is attached to and removed from a side of the lens part via the accessory unit.

According to a camera of the present invention, since a camera body is mounted to a mount part is provided on the right side of a lens part as seen from a user for a right-handed user, while a camera body is mounted to a mount part is provided on the left side of a lens part as seen from a user for a left-handed user, a camera which has equal operability equal for a right-handed user and a left-handed user can be provided without necessity of any addition of extra members and without sacrificing a design for a smaller size. And since a camera of the present invention does not require an extra accessory, a user-friendly camera which eliminates any disadvantage for a use by left-handed persons at a high level that any conventional cameras have not yet achieved can be achieved.

According to a camera of the present invention, two mount parts are provided at on the right and left sides of a lens part to and from which a camera body and an accessory member are attached and removed, and this configuration provides the most appropriate mount placement/mount structure for a lens-interchangeable camera in which a lens part having an image pickup device built therein is replaced as a single unit, and also various accessory members can be reliably connected to the camera in a simple structure without necessity of any connecting device which is exclusively used for the accessory members.

According to a camera of the present invention, since an angle of a camera body which also functions as a grip part can be adjusted by using a mount part so that the camera body is arranged at the most appropriate angle which reduces physical strain on the wrist of a user, a camera having an excellent operability is provided.

DETAILED DESCRIPTION OF THE PREFERRED EMBODIMENTS

Figure 1:
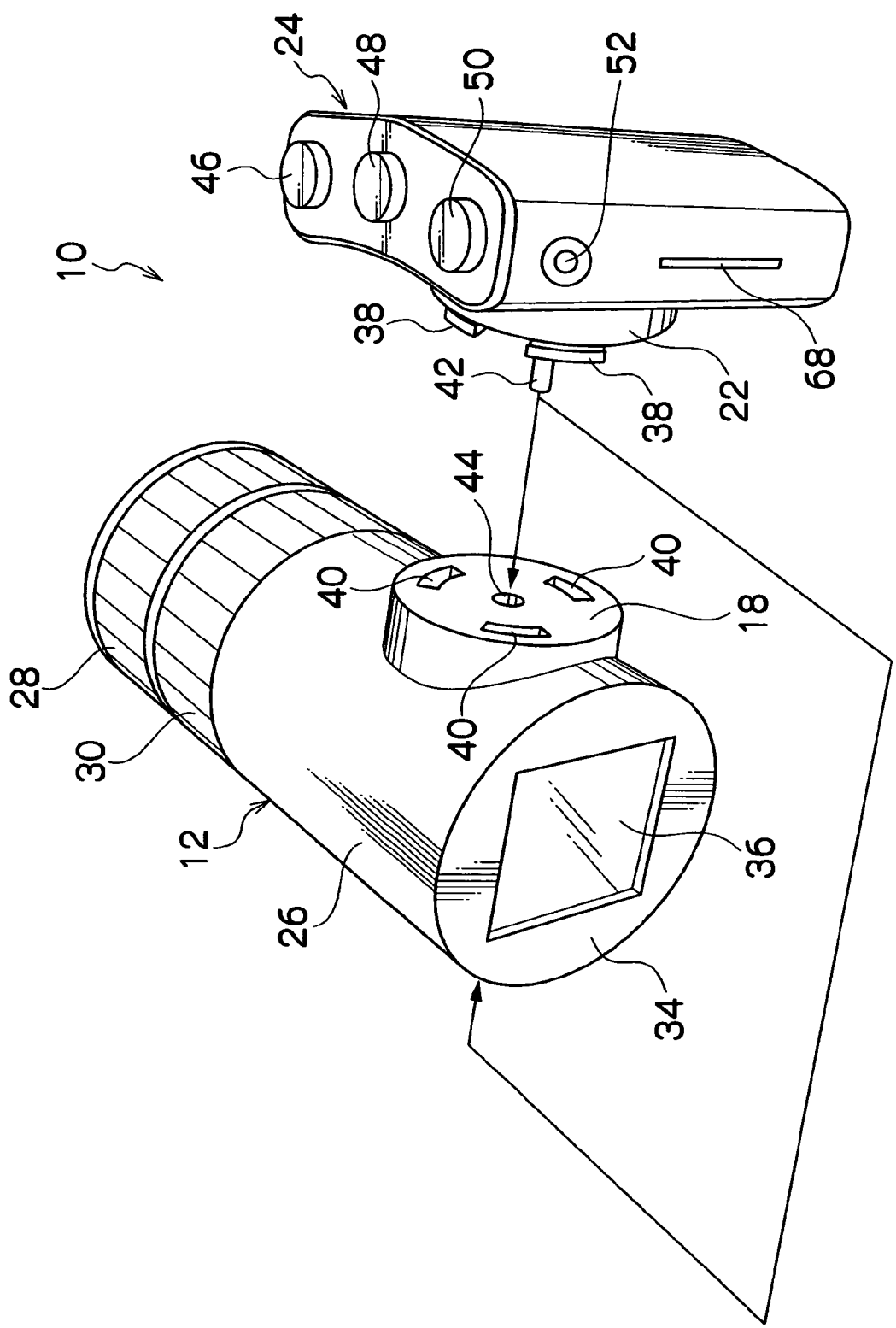
FIG. 1 is a perspective assembly view showing an embodiment of digital camera having a specification for right-handed persons.
Figure 2:
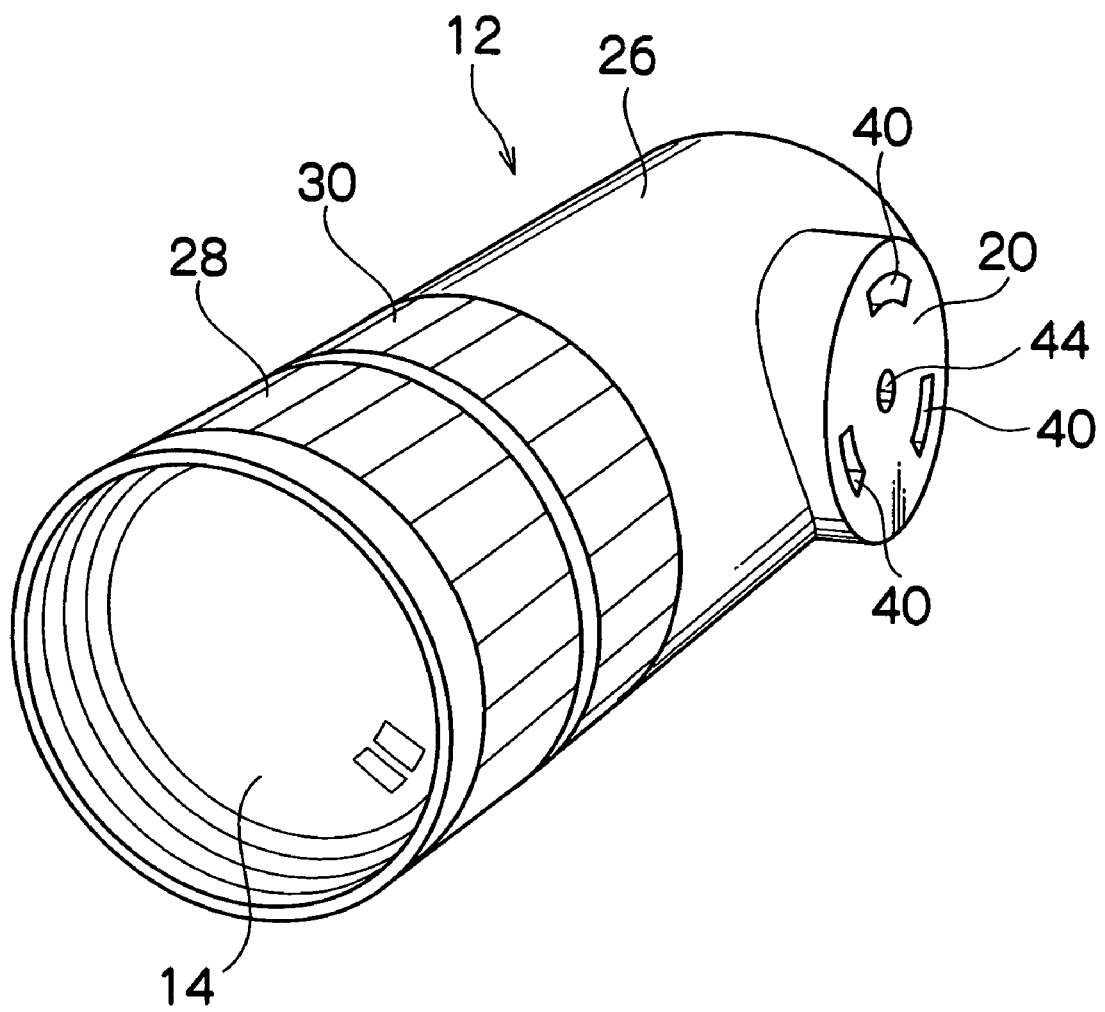
FIG. 2 is a perspective view showing a lens part of digital camera as seen from the front thereof.
Figure 3:
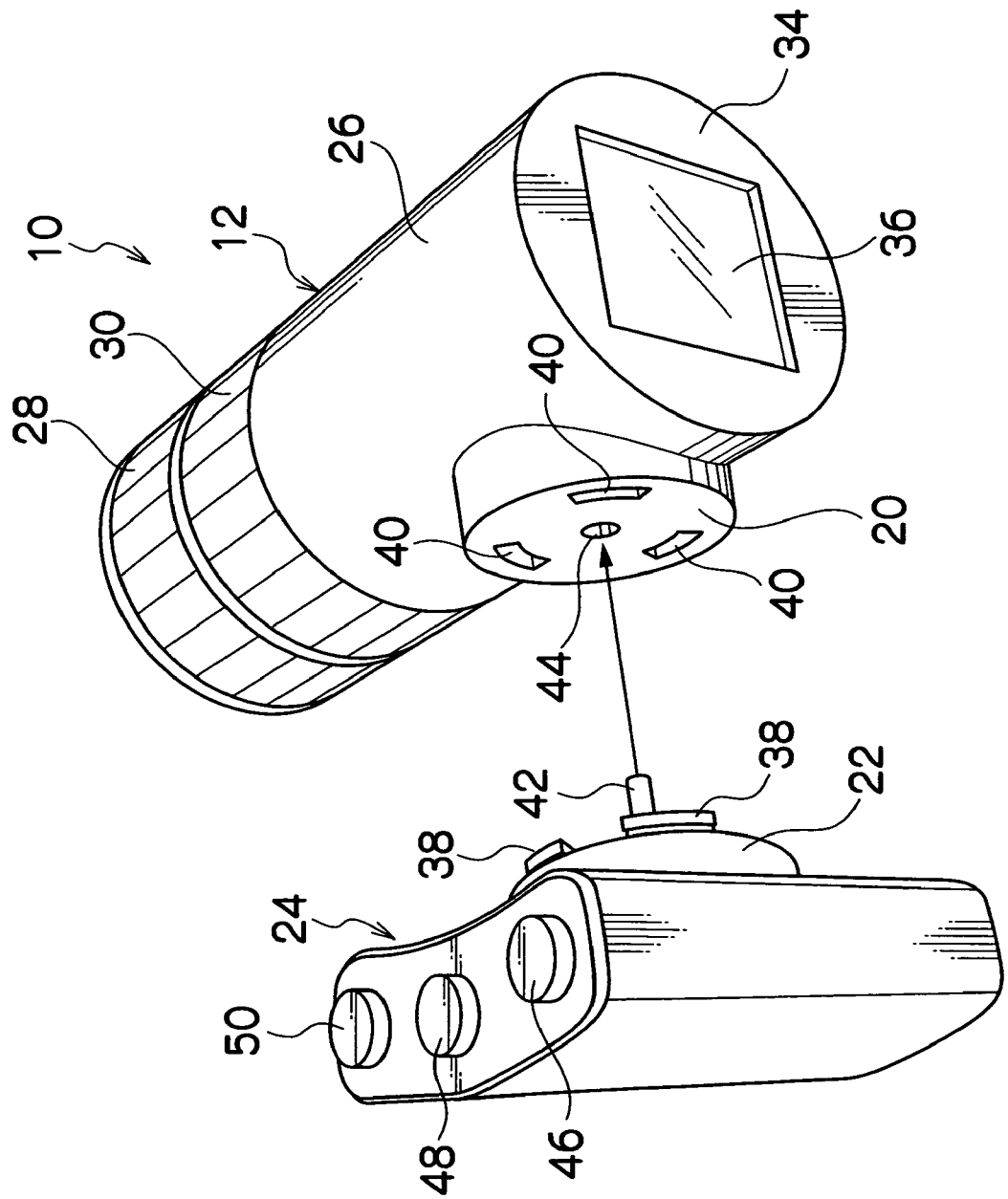
FIG. 3 is a perspective assembly view showing a digital camera having a specification for left-handed persons.
Figure 4:
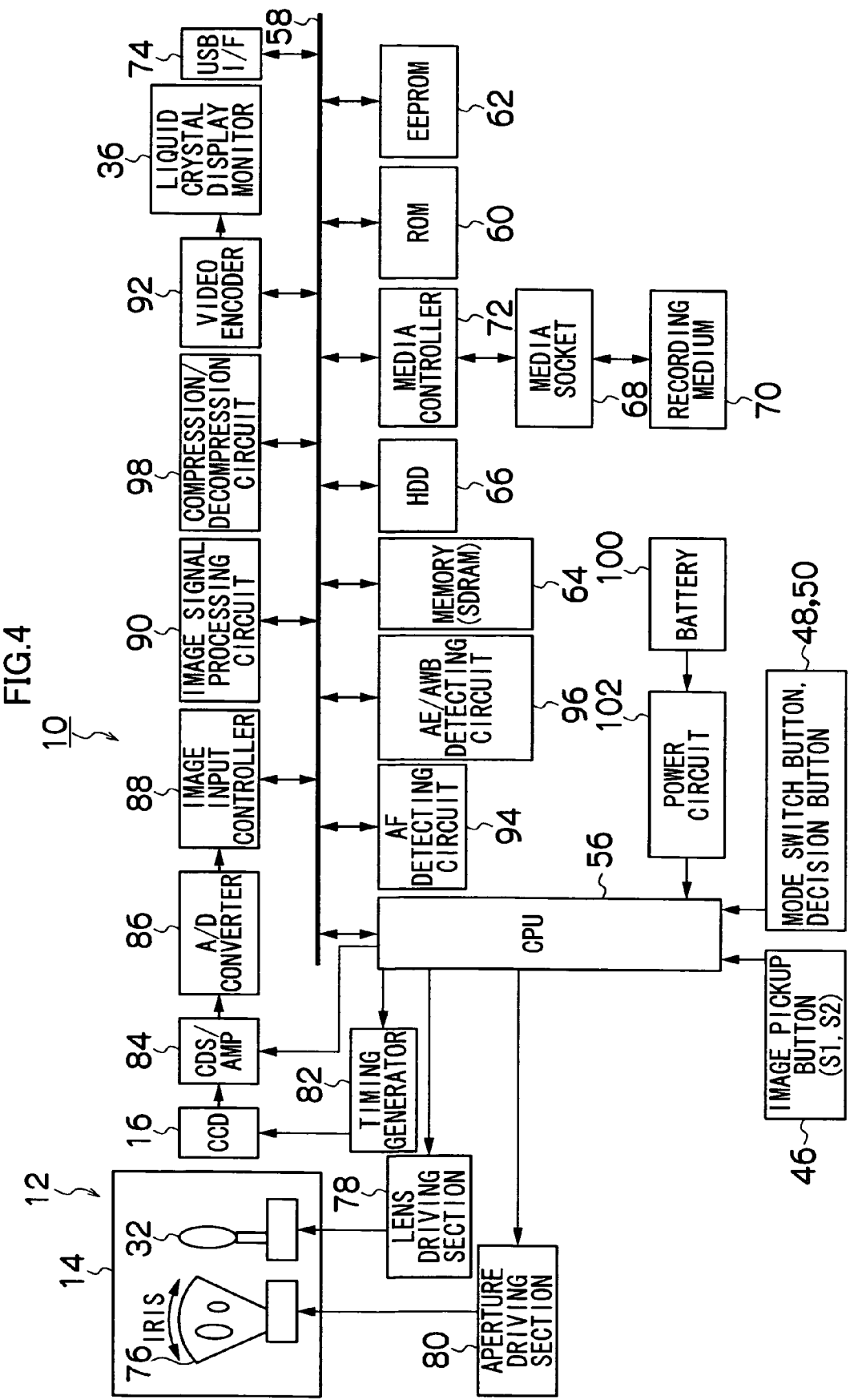
FIG. 4 is a block diagram showing an entire structure of the digital camera of FIG. 1.

Now, a preferable embodiment of a camera according to the present invention will be explained with reference to the accompanying drawings. FIG. 1 is a perspective assembly view showing an embodiment of a digital camera 10 having a specification for right-handed persons; FIG. 2 is a perspective view showing a lens part 12 of the digital camera 10 as seen from the front thereof; FIG. 3 is a perspective assembly view showing the digital camera 10 having a specification for left-handed persons; and FIG. 4 is a block diagram showing a structure of the digital camera 10. The digital camera 10 of the FIGS. 1 to 4 includes: a lens part 12 in which a lens 14 for image pickup (see FIG. 2) and a CCD (a solid image pickup device, see FIG. 4) 16 disposed at a position of an image formation of the lens 14 for image pickup are interchangeable as a single unit; and a camera body 24 which is removably mounted to lens mount parts 18 and 20 on lens part 12 via a mount part 22.

The lens part 12 includes a lens barrel 26 which is an exterior component of the lens part 12, a focus ring 28 and a zoom ring 30 which are rotatably provided in front of the lens barrel 26. In a manual mode, a rotation of the focus ring 28 by a user causes a lens 32 of a focusing system of the lens for image pickup 14 (see FIG. 4) to perform a focusing operation, while a rotation of the zoom ring 30 causes a lens of a zooming system of the lens 14 for image pickup (not shown) to perform a zooming operation.

As shown in FIG. 1, the lens barrel 26 is provided a rectangular liquid crystal display monitor (an image displaying section) 36 at a rear surface 34 thereof to which a preview image during a picking up operation, and a static image or a dynamic image during a playback operation. The liquid crystal display monitor 36 has a largest size in the circular rear surface 34.

As shown in FIG. 1 and FIG. 2, the lens barrel 26 has lens mount parts 18 and 20 on the right and left sides thereof respectively. As shown in FIG. 1, when the camera body 24 is mounted to the lens mount part 18, the camera body 24 is positioned on the right side of the lens part 12 as seen from a user. Thus, the digital camera 10 is preferable for an operation by right-handed persons with the right hand holding the camera body 24 as a grip part. While, as shown in FIG. 3, when the camera body 24 is mounted to the lens mount part 20, the camera body 24 is positioned on the left side of the lens part 12 as seen from a user. Thus, the digital camera 10 is preferable for an operation by left-handed persons with the left hand holding the camera body 24 as a grip part. In a form shown in FIG. 3, since a user can operate the camera body 24 with one (left) hand, this form is convenient when the user picks up images while the user is operating another apparatus with his/her right hand.

The lens mount parts 18, 20 and the mount part 22 of the camera body 24 are attached to and removed from each other by a known bayonet attaching mechanism having three pawls 38 and three grooves 40. The mount part 22 has a connector pin 42 which projects from the center of the mount part 22, and when the connector pin 42 is fitted into a connector 44 formed in the center of the lens mount part 18 or 20, the camera body 24 is positioned relative to the lens mount part 18 or 20, and data can be sent and received bi-directionally between the lens part 12 and the camera body 24. The sending and receiving of data may be performed by connecting other connectors to each other.

The camera body 24 has an upper surface to which an image pickup button 46, a mode switching button 48, a decision button 50 are provided, and a side surface to which a power button 52 is provided.

The image pickup button 46 is halfway or fully pressed down by a user who is holding the camera body 24 as a grip part. While the button is pressed halfway down, a focusing is performed, and the full pressing of the button makes an image of an object formed on a CCD 16 of FIG. 4 via the lens for image pickup 14 of FIG. 2. The mode switching button 48 switches an image pickup mode of the digital camera 10 between an aperture priority mode, a shutter priority mode, a fully automatic mode, a manual mode, and the like, and upon a serial pressing of the mode switching button 48, the characters of "aperture priority mode", "shutter priority mode", "fully automatic mode", "manual mode" are serially displayed on a liquid crystal display monitor 36. The decision button 50 is pressed to switch a current mode into a selected mode.

The operation buttons provided to the camera body 24 are not limited to the image pickup button 46, the mode switching button 48, and the decision button 50. For example, a zoom button, a playback button, a photo mode button may be provided. The zoom button is operated to adjust a focal length on a telephoto side or a wide side, and the playback button is operated to immediately playback a picked-image. The photo button switches a way to pick up an image between a color photography and a monochrome photography. Furthermore, a playback button, a stop button, a fast-forward button, a fast-rewind button may be provided to be operated in a playback of an image.

Next, the block diagram of FIG. 4 will be explained below.

The entire operation of the digital camera 10 is controlled by CPU 56. The CPU 56 functions both as a system controlling circuit for controlling a camera system according to a predetermined program, and as an operation device for executing various operations such as automatic exposure (AE) operation, automatic focusing (AF) operation, white balance (WB) operation, and the like.

The CPU 56 is connected to ROM 60 via a bus 58, and the ROM 60 stores various data which are necessary for the CPU 56 to execute and control programs, and EEPROM 62 stores CCD pixel defect information and various constants/information with respect to camera actions.

A memory (SDRAM) 64 is used as an area for developing programs and an area for operations by the CPU 56, and also is used as an area for temporarily storing image data and voice data. A recording section (HDD) 66 is an exclusive memory for temporarily storing image data.

The image pickup button 46 is used to input an instruction of start of image pickup, and is configured to be a two-stage switch having an S1 switch which is turned on by a halfway press and an S2 switch which is turned on by a full press.

The liquid crystal display monitor 36 is driven as an electronic viewfinder for displaying a preview image during a mode for picking up an image, and also is driven as an image playback monitor for displaying static images and dynamic images during a mode for playback. The liquid crystal display monitor 36 is also used as a display screen for a user interface, and displays information such as menu information, a selected item, and settings. On the liquid crystal display monitor 36, image data which are recorded in the recording section 66 are compressed and displayed as thumbnails.

The camera body 24 has a media socket 68 in a side surface thereof (see FIG. 1) to insert a recording medium 70. The recording medium 70 may be of any form, and may be various media including a semiconductor memory card such as xD-Picture Card and Smart Media™, a portable compact hard disc, a magnetic disc, an optical disc, magnetic optical disc, and the like.

A media controller 72 converts signals, as needed, to send and receive input/output signals suitable to the recording medium 70 which is inserted into the media socket 68.

The digital camera 10 has a USB interface section 74 which functions as a communicating device for a connection with external equipment including a personal computer. The USB interface section 74 is connected to a connector which is a communication terminal, and a connection between the connector and external equipment via an USB cable (not shown) allows data such as image data to be sent and received between the digital camera 10 and the external equipment. Of course, the communication system is not limited to USB, and other communication systems may be used.

Next, functions for picking up images of the digital camera 10 will be explained below.

The lens 14 for image pickup of the lens part 12 is an optical unit which includes an aperture/mechanical shutter 76. The lens 14 for image pickup is electrically driven by a lens driving section 78 which is controlled by the CPU 56 and an aperture driving section 80, and performs a zoom control, a focus control, and an iris control.

Light passes through the lens 14 for image pickup to be focused on a light receiving surface of the CCD 16. The light receiving surface of the CCD 16 has a number of photodiodes (light receiving elements) two-dimensionally arrayed thereon, and primary color filters of red (R), green (G), and blue (B) are arranged in a predetermined array structure, corresponding to each photodiode. The CCD 16 also has an electronic shutter function for controlling a charge storage time (shutter speed) of each photodiode. The CPU 56 controls the charge storage time of the CCD 16 via a timing generator 82. Instead of the CCD 16, other image pickup device such as a MOS type may be used.

An image of an object formed on the light receiving surface of the CCD 16 is converted into an amount of signal charge in response to the amount of incident light, by each photodiode. The signal charge stored in each photodiode is serially read out as a voltage signal (image signal) for the signal charge based on a drive pulse which is provided by the timing generator 82 in response to a command from the CPU 56.

The signal output from the CCD 16 is sent to an analog processing section (CDS/AMP) 84 where R, G, and B signals of each pixel are sampled and held (correlated double sampling processing) to be amplified and then added to an A/D converter 86. The A/D converter 86 converts the R, G, and B signals of dot sequential system into digital signals which are stored in a memory 64 via an image input controller 88.

An image signal processing circuit 90 processes the R, G, and B signals stored in the memory 64 in accordance with a command from the CPU 56. That is, the image signal processing circuit 90 functions as an image processing device which includes a synchronization circuit (a processing circuit for interpolating spatial deviation of color signals in association with color filter arrays of a monoplane based CCD, and converting the color signals in a synchronous system), a white balance correction circuit, a gamma correction circuit, a contour correction circuit, a brightness/color-difference signal generation circuit, and the like, and performs a predetermined signal processing by using the memory 64 in accordance with a command from the CPU 56.

The image data of the RGB colors is input into the image signal processing circuit 90 where the image data is converted into brightness signals and color-difference signals, and is subjected to predetermined processings such as a gamma correction. The image data after the processings at the image signal processing circuit 90 is recorded in a recording section 66.

When a playback of a picked up image is output on the liquid crystal display monitor 36, the image data is read out from the recording section 66 to be sent to a video encoder 92 via a bus 58. The video encoder 92 converts the input image data into signals in a predetermined style for display (for example, color composite video signals of NTSC type), and outputs the signals to the liquid crystal display monitor 36. A preview image during picking up an image is sent from the image signal processing circuit 90 via the bus 58 and the video encoder 92 and is displayed on the liquid crystal display monitor 36.

When the image pickup button 46 is pressed halfway down to turn on S1, the digital camera 10 starts the AE and AF processing. That is, an image signal output from the CCD 16 is, after A/D conversion, input into an AF detecting circuit 94 and an AE/AWB detecting circuit 96 via an image input controller 88.

An AE/AWB detecting circuit 96 includes a circuit for dividing one screen into a plurality of areas (for example, 16×16) and integrating the RGB signals for each divided area, and provides the integrated values to the CPU 56. The CPU 56 detects a brightness of an object (object brightness) based on the integrated values obtained from the AE/AWB detecting circuit 96, and calculates an exposure value (EV value) which is suitable for an image pickup. In accordance with the calculated exposure value and a predetermined program diagram, an aperture value and a shutter speed are determined, and in accordance with the value and the speed, the CPU 56 controls the electronic shutter and the iris of the CCD 16 to obtain an appropriate exposure.

The AE/AWB detecting circuit 96, in performing automatic white balance, calculates an average integrated value of RGB signals for each divided area, and provides the calculated value to the CPU 56. The CPU 56 obtains an integrated values of R, B, and G to calculate ratios of R/G and B/G for each divided area, and distinguishes a light source type based on a distribution of the values of RIG and B/G in color spaces of R/G and B/G, and then in accordance with a white balance value suitable to the distinguished light source type, for example, controls gain values (white balance correction values) for the R, G, and B signals of the white balance control circuit so that each ratio value is set to be about 1, to correct signals of each color channel. When the gain values of the white balance control circuit is controlled to set each of the above ratios to be a value other than 1, an image having a certain color can be generated.

The AF control of the digital camera 10 is performed, for example, by using a contrast AF method in which the focus lens 32 is moved so that a high frequency component of G signal of a video signal can be the maximum. That is, the AF detecting circuit 94 includes a high-pass filter for passing only a high frequency component of G signal, an absolute value processing section, an AF area extracting section for extracting a signal from a preset area to be focused in a screen (for example, the center part of the screen), and an integrating section for integrating absolute value data in the AF area.

The absolute value data calculated in the AF detecting circuit 94 is reported to the CPU 56. The CPU 56 computes a focus evaluation value (AF evaluation value) at a plurality of AF detected points while controlling the lens driving section 78 to move a focusing lens, and determines a lens position where the evaluation value is the maximum to be a focused position. Then the CPU 56 controls the lens driving section 78 to move the focusing lens to the obtained focused position. The computing of the AF evaluation value is not limited to the aspect with the use of G signal, and a brightness signal (Y signal) may be used.

An operation for picking up images for recording is started by pressing the image pickup button 46 halfway down to turn on S1 for the AE/AF processing, and pressing the image pickup button 46 fully to turn on S1. When an image data is obtained in response to the turned on S2, the image data is converted into brightness/color-difference signal (Y/C signal) in the image signal processing circuit 90 to be stored in the memory 64 after predetermined processings such as gamma correction.

The Y/C signal stored in the memory 64 is compressed by a compression/decompression circuit 98 in accordance with a predetermined format to be recorded in a recording medium 70 via a media controller 72. For example, static images are recorded in JPEG format.

The camera body 24 houses a rechargeable battery 100 therein so that the power of the battery 100 is supplied via a power circuit 102 to drive the entire digital camera 10.

Now, actions of the digital camera 10 which is configured as described above will be explained below.

For a use by a right-handed user, as shown in FIG. 1, the camera body 24 is mounted to the lens mount part 18 which is provided on the right side of the lens part 12 as seen from a user. This configuration enables a camera operation with the user's right hand holding the camera body 24 as a grip part, which is a preferable form for right-handed persons. For a use by a left-handed user, as shown in FIG. 3, the camera body 24 is mounted to the lens mount part 20 which is provided on the left side of the lens part 12 as seen from a user. This configuration enables a camera operation with the user's left hand holding the camera body 24 as a grip part, which is a preferable form for left-handed persons.

Thus, according to the digital camera 10 of this embodiment, the lens-interchangeable digital camera 10 can be provided as a digital camera which has equal operability equal for a right-handed user and a left-handed user without necessity of any addition of extra members and without sacrificing a design for a smaller size. And since the digital camera 10 does not require an extra accessory, a user-friendly digital camera 10 which eliminates any disadvantage for a use by left-handed persons at a high level that any conventional cameras have not yet achieved can be achieved. Furthermore, since the camera body 24 can be disposed on a left side as needed as shown in FIG. 3 even for a right-handed user and the right-handed user can operate the camera body only with his/her left hand, this form is convenient when the user picks up images while the user is operating another apparatus with his/her right hand.

The digital camera 10 of this embodiment has the liquid crystal display monitor 36 in the lens part 12. If the digital camera 10 has the liquid crystal display monitor 36 in the camera body 24 which functions as a grip part, the camera body 24 inevitably has a large size to keep a room for the monitor, but since a relatively large lens part itself has such a room for the liquid crystal display monitor 36, even when the liquid crystal display monitor 36 is provided in a lens part 12, the size of the lens part 12 will not be changed.

Figure 5:
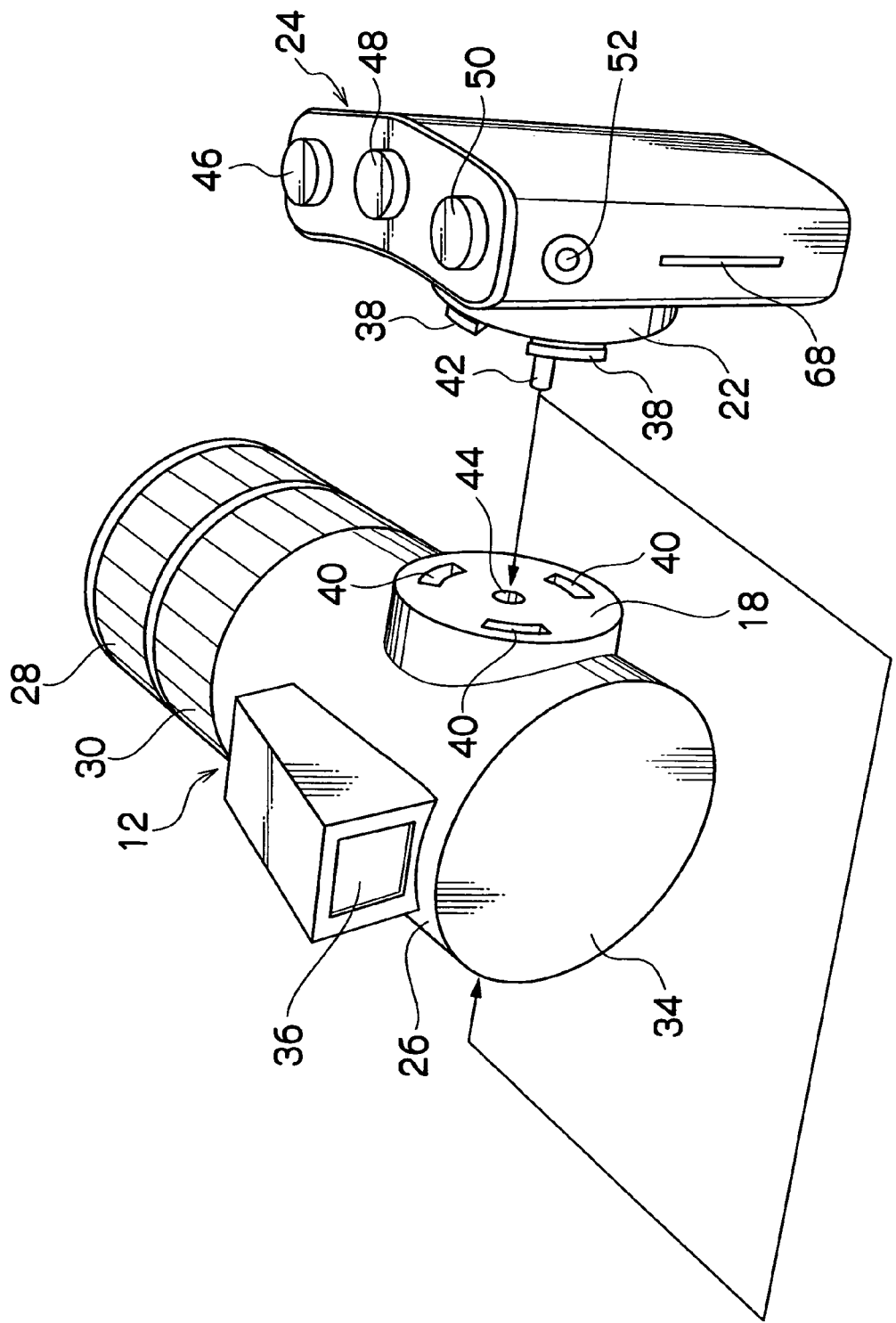
FIG. 5 is a view showing a digital camera having a liquid crystal display monitor at a rear portion of a lens part.

Also, since the liquid crystal display monitor 36 is provided on the rear surface 34 of the lens barrel 26, a user who is behind the lens part 12 can check an image displayed on the liquid crystal display monitor 36 without any disturbance of the camera body 24 which is mounted to the lens mount part 18 or 20. This is the same in the case when the liquid crystal display monitor 36 is provided on an upper surface of the back portion of the lens barrel 26 as shown in FIG. 5. According to the digital camera 10, the lens part 12 can be carried around by a user with the camera body 4 taken away therefrom.

Meanwhile, as a camera of another embodiment, a camera can be exemplified, which includes: in order to achieve an object to provide a user-friendly camera for right-handed persons and left-handed persons, a lens part having a plurality of mount parts; and a camera body which is mounted to one selected one of the mount parts and has a camera operating member for performing a camera control that can be switched by a switching device.

According to the above camera, depending on the preference of a user, the camera body can be mounted to any selected one of the plurality of mount parts. In this case, depending on a position of where the camera body is mounted, it is desirable to switch a camera control which is performed by the camera operating member. For example, when the camera body is mounted at an operating position for right-handed persons, a button at a position where the user can easily operate with the index finger of his/her right hand is set to be a button for image pickup, but when the camera body is mounted at an operating position for left-handed persons, the button for image pickup is not always located at a position where the user can easily operate with the index finger of his/her left hand. Thus, in the latter case, a button at a position where the user can easily operate with the index finger of his/her left hand is preferably switched into a button for image pickup (assignments of button functions are changed). In this camera, a camera control performed by a camera operating member such as a button for image pickup is manually switched by using a switching device. For example, a question whether a switching is performed or not is displayed on a display section of a touch panel which is superimposed on a liquid crystal display monitor, so that a user is allowed to select an answer by pushing a button of the touch panel. This provides a user-friendly camera which eliminates any disadvantage for a use by left-handed persons.

As a camera of another embodiment, a camera can be exemplified, which includes a camera body having an identifying device for identifying which mount part of a plurality of mount parts a camera body is mounted and a switching device for switching a camera operation performed by camera operating member which is provided to the camera body, based on the identified mount part by the identifying device.

The above camera is featured by an automatic switching of camera controls, compared to the above camera featured by a manual switching of camera controls. That is, when a camera body is mounted to a mount part, an identifying device identifies which mount part of a plurality of mount parts the camera body is mounted. Then, based on the identified mount part, a camera control which will be performed by a camera operating member provided to the camera body is automatically switched by a switching device. This automatically provides the most appropriate operability of the camera body depending on a position where the camera body is mounted relative to the lens part.

Figure 6:
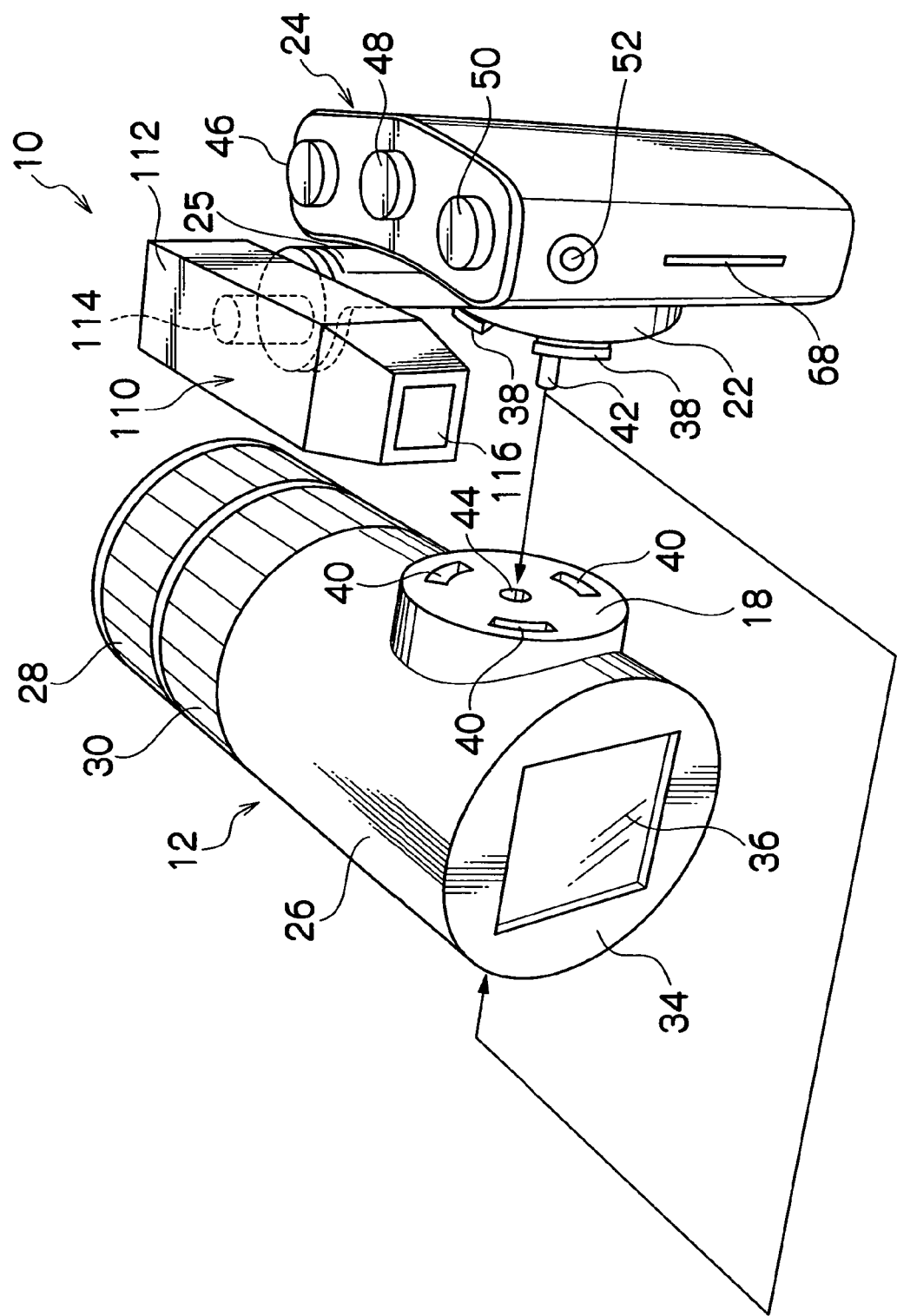
FIG. 6 is a view showing a digital camera having specification for right-handed persons with an electronic viewfinder provided to a camera body.
Figure 7:
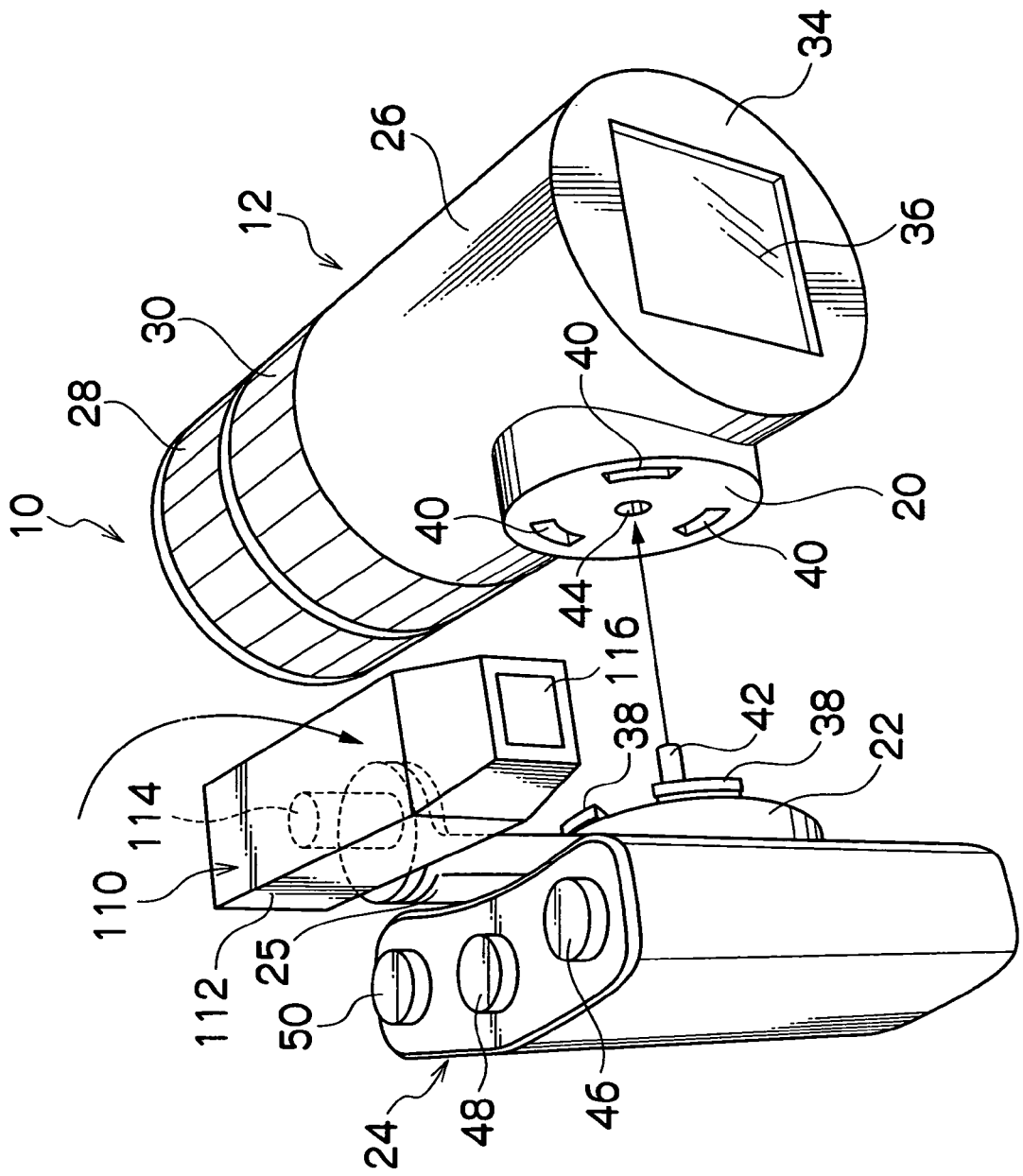
FIG. 7 is a view showing a digital camera having specification for left-handed persons with an electronic viewfinder provided to a camera body.

FIG. 6 and FIG. 7 show an embodiment of the digital camera 10 which has a camera body 24 provided with an electronic viewfinder 110. As shown in FIG. 6 and FIG. 7, the lens part 12 is provided with lens mount parts 18 and 20 on the right and left sides thereof respectively, and the camera body 24 can be connected either of the lens mount parts 18 and 20 for use.

The electronic viewfinder 110 has a housing 112 which is rotatably supported by a shaft 114, the shaft 114 being provided protruding from a shaft receiving section 25 of the camera body 24. So a rotation of the electronic viewfinder 110 by 180 degrees changes a form having a specification for right-handed persons of FIG. 6 into another form having a specification for left-handed persons of FIG. 7 which directs an eyepiece part 116 of the electronic viewfinder 110 toward a user. That is, by changing a direction to which the electronic viewfinder 110 is facing, the camera can be used both in a right hand operation by right-handed persons and in a left hand operation by left-handed persons.

As a camera of another embodiment, a camera can be exemplified, which includes: a lens part having a rotatable mount part; and a camera body which is mounted to the mount part, one of the lens part of the camera body having an angle detecting device for detecting a relative rotation joint angle between the camera body and the lens body, so that a camera control is switched by a switching device based on the detected angle by the angle detecting device.

According to this camera, after a camera body is mounted to the lens part via a mount part, for example in order to change the camera having a specification for right hand operation by right-handed persons into the camera having a specification for left hand operation by left-handed persons, the lens part is reversed about its optical axis by 180 degrees to dispose the camera body on the left side as seen from a user, and also the camera body is reversed by 180 degrees relative to the lens part. This changes a specification for right-handed persons of the camera into a specification for left-handed persons. In this case, a relative rotation joint angle between the lens part and the camera body is detected by an angle detecting device, so that a camera control performed by a camera operating member which is provided to the camera body is switched by a switching device based on the detected angle. This automatically provides the most appropriate operability of the camera body depending on a position where the camera body is mounted relative to the lens part.

When the camera is provided with a liquid crystal display monitor, an upright or vertical flip display of an image which is displayed on the liquid crystal display monitor is switched based on the angle detected by the angle detecting device. For example, when a specification for right-handed persons is changed into a specification for left-handed persons, after the angle detecting device detects an angle of 180 degrees, thereby the switching device vertically flips the image displayed on the image displaying section. In this way, even when a specification for right-handed persons of the camera is changed into a specification for left-handed persons, no image is displayed upside down.

Figure 8:
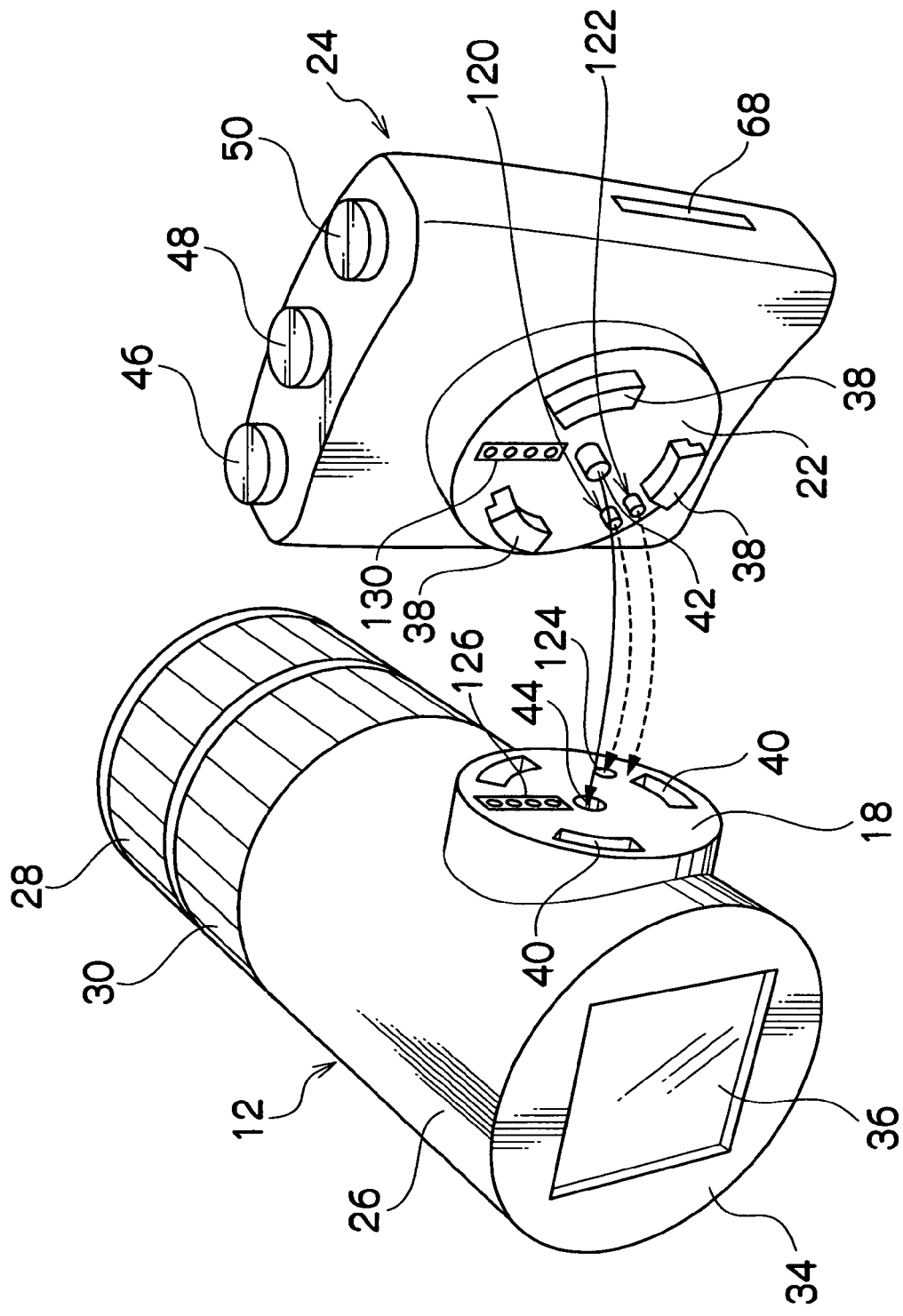
FIG. 8 is a perspective view showing another embodiment of a digital camera.
Figure 9:
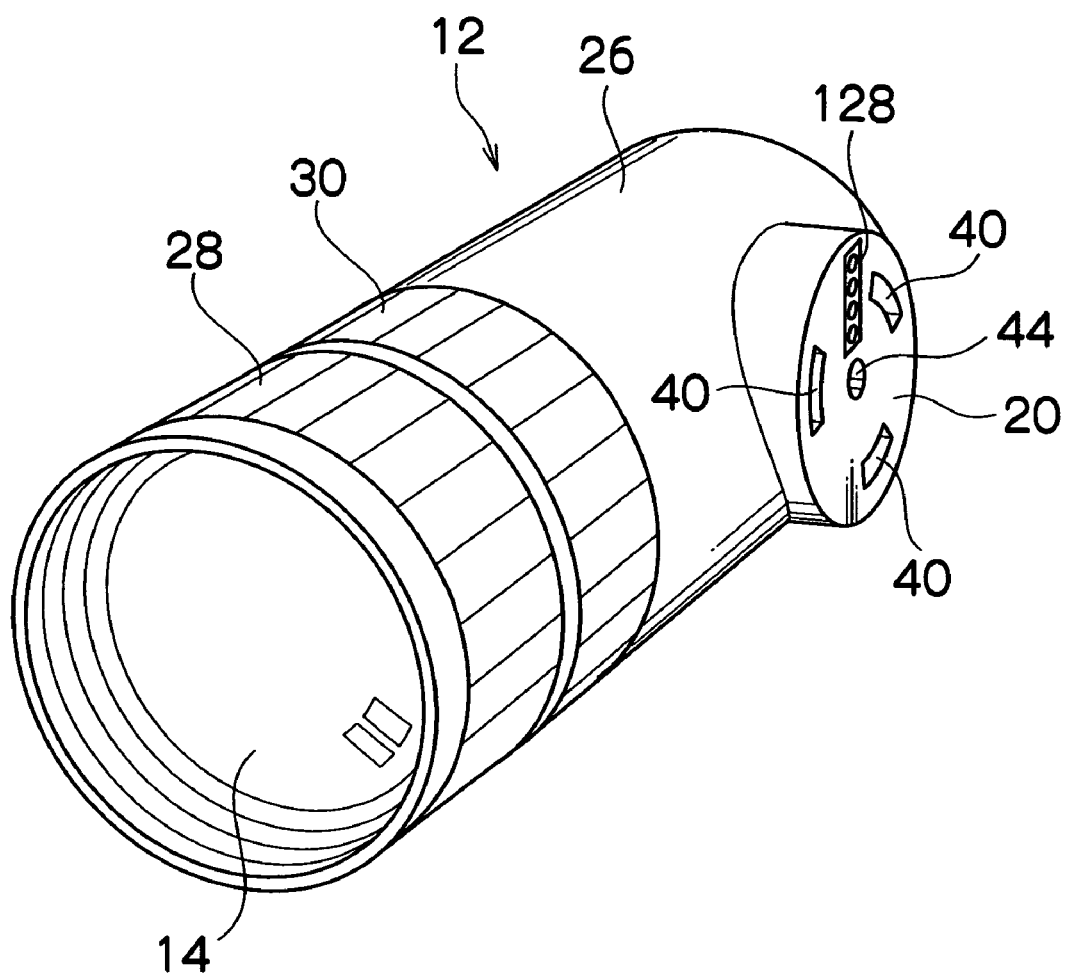
FIG. 9 is a perspective view showing a lens part of the digital camera of FIG. 8.

FIG. 8 and FIG. 9 show another embodiment of the digital camera 10.

As shown in FIG. 8, the camera body 24 has a mount part 22 which is provided with two detection pins 120, 122 for detecting whether the camera body 24 is connected to the lens mount part 18 on the right side of the lens part 12 or to the lens mount part 20 on the left side of the lens part 12, the pins 120, 122 being urged by an urging member (not shown) in a direction into which the pins project. While, the lens part 12 has lens mount parts 18 and 20, and the lens mount part 18 on the right side of the lens part 12 has a hole 124 formed therein for discriminating that the detection pin 120 is fitted in the hole 124 to be mounted there.

When the camera body 24 is connected to the lens mount part 18, the detection pin 120 is fitted into the hole 124 and only the detection pin 122 is pushed into the camera body 24, so that a detecting switch (not shown) detects the condition in which the detection pin 120 is projecting out and detection pin 122 is being pushed in. This causes an operation mode of the camera body 24 to be switched into a right hand operation mode by the CPU 56 which is a system control circuit.

After the switching into a right hand operation mode, three buttons 46, 48, 50 on the upper surface of the camera body 24 are assigned different functions depending on the right operation mode. That is, in the right hand operation mode, a button 46 is assigned as an image pickup button, a button 48 is assigned as a mode switch button, and a button 50 is assigned as a decision button, so that a shutter release can be operated with the button 46 which is positioned where a user can most easily operate with the index finger when the user holds the camera body 24 with his/her right hand.

Meanwhile, as shown in FIG. 9, since the lens mount part 20 on the left side does not have a hole formed therein, when the camera body 24 is connected to the lens mount part on the left side, both of the detection pins 120 and 122 are pushed against the camera body 24, thereby a detecting switch (not shown) detects the condition in which both of the detection pins 120 and 122 are pushed. This causes an operation mode of the camera body 24 to be switched into a left hand operation mode by the CPU 56.

In the left hand operation mode, contrary to the above, a button 50 is assigned as an image pickup button, a button 48 is assigned as a mode switch button, and a button 46 is assigned as a decision button, so that a shutter release can be operated with the button 50 which is positioned where a user can most easily operate with the index finger when the user holds the camera body 24 with his/her left hand. So, a button arrangement in direct opposition to the one for the right hand operation is provided, thereby sensuously the same operability is obtained.

In this embodiment, the detection by using the detection pins 120 and 122 has been explained, but other detecting device may be used, and for example, an identification device for identifying a presence or absence of a contact at an electric contact, a communication via connectors 126, 128, and 130 provided to the mount part 18, 20, and 22 respectively, a reflectance or pattern of a reflective member on a surface of a mount part, and the like may be used.

The subject to be switched is not limited to the assignment of buttons, and, among a plurality of displaying or warning devices, the one facing toward a user may be set to be used, or a flash lightning may be switched. Moreover, in this embodiment, the detection pins 120 and 122 are provided to the camera body 24, but the position is not limited there, and a detecting device may be provided to the lens part 12 so that a detected result can be transmitted to the camera body 24 by using a communication or other method, which provides a similar operation.

Figure 10:
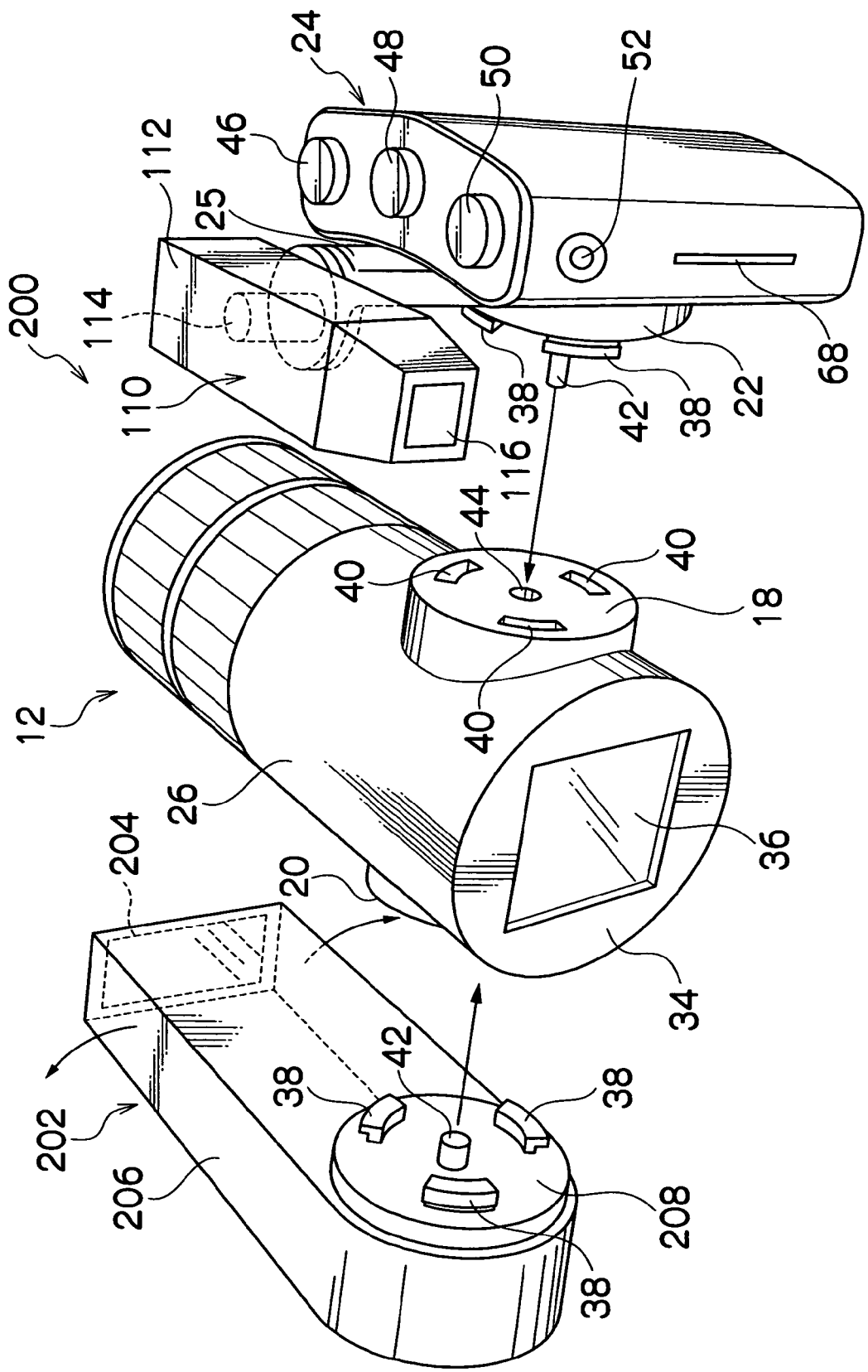
FIG. 10 is a perspective view showing another embodiment of a digital camera.

FIG. 10 shows another embodiment of a digital camera 200, in which the same or similar members to those of the digital camera 10 shown in FIG. 1 to FIG. 9 are given the same reference numerals and will not be discussed or illustrated in detail herein.

The digital camera 200 shown in FIG. 10 is in a form having a specification for right-handed persons, in which the lens mount part 18 is connected to the camera body 24, and the lens mount part 20 is connected to an electronic flashlight unit 202. Instead of the electronic flashlight unit 202, other accessory such as a microphone for collecting sound may be connected.

The electronic flashlight unit 202 includes a housing 206 having a light emission window 204 at a front portion thereof and a xenon tube 205 built therein (see FIG. 11), and a mount part 208 is rotatably coupled to a side surface of the housing 206 about a connector pin 42. The mount part 208 has three pawls 38 formed thereon for a bayonet attaching mechanism. Since the housing 206 is rotatably structured relative to the mount part 208, the direction of a light emission from the electronic flashlight unit 202 can be adjusted after the electronic flashlight unit 202 is connected to the lens mount part 20. When the specification is changed into the one for left-handed persons, the camera body 24 is connected to the lens mount part 20 on the left side, the electronic viewfinder 110 is reversed by 180 degrees, and the electronic flashlight unit 202 is connected to the lens mount part 18 on the right side. At this point, a reverse of the housing 206 by 180 degrees allows the light emission window 204 to be directed toward an object which is disposed in front of the light emission window 204. Thus, the digital camera 200 can be used both in the specification for right-handed persons and in the specification for left-handed persons.

Figure 11:
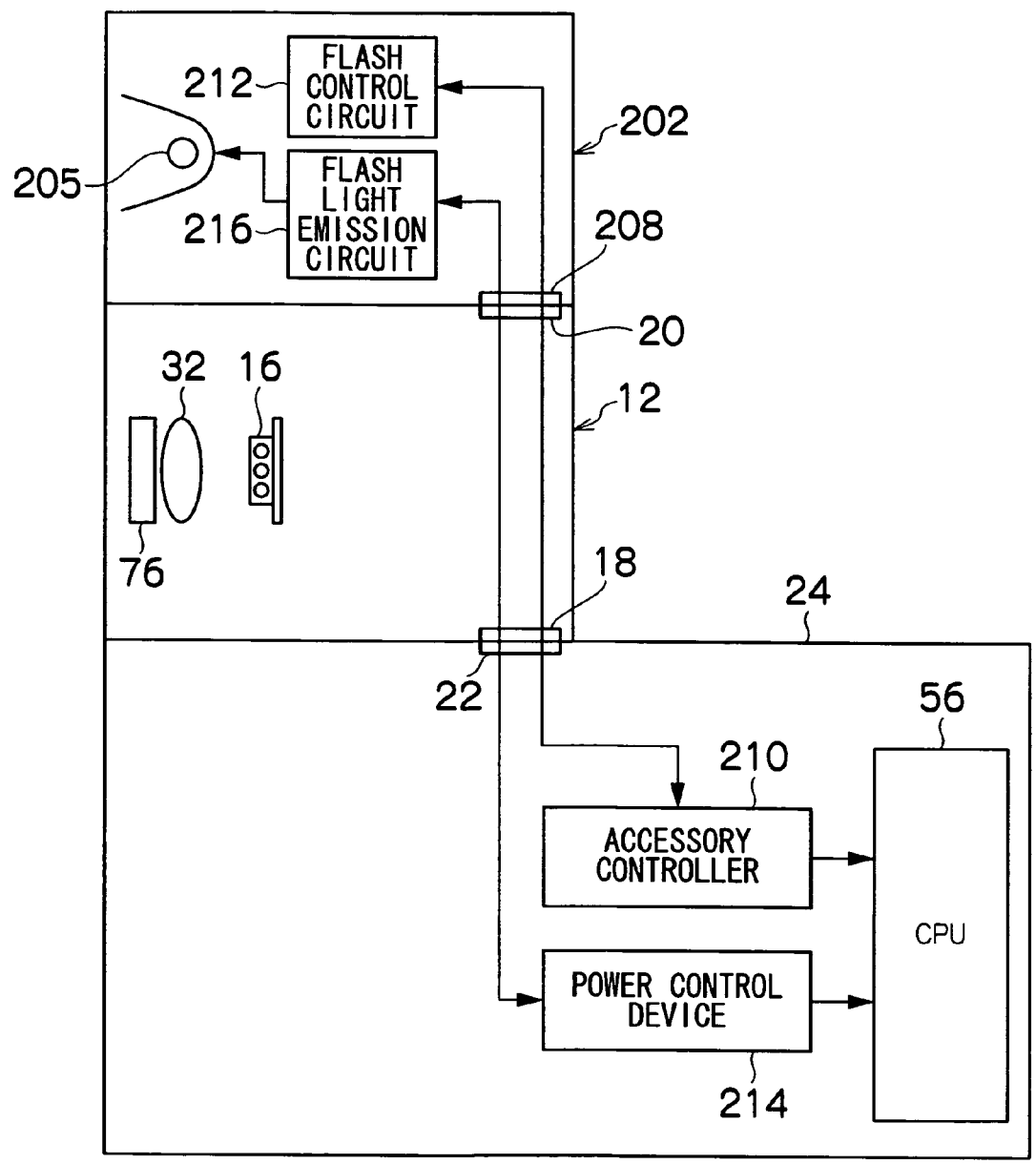
FIG. 11 is a block diagram showing a structure of the digital camera of FIG. 10.

FIG. 11 is a schematic block diagram showing a structure of the digital camera 200 in which the same or similar members to those of the digital camera 10 shown in FIG. 4 are given the same reference numerals and will not be discussed or illustrated in detail herein.

As shown in FIG. 11, a part of contacts provided to both of the lens mount parts 18 and 20 of the lens part 12 is configured to be electrically communicated with the opposite contacts to both lens mount parts 18 and 20. This configuration allows the camera body 24 which is mounted to the right side of the lens part 12 and the electronic flashlight unit 202 which is mounted to the left side of the lens part 12 as seen from a user, an accessory controller 210 and a flash control circuit 212, and a power control device 214 and a flash light emission circuit 216 to be connected via the lens part 12.

A supply of power from the camera body 24 to the flash light emission circuit 216 causes a condenser for light emission (not shown) to be charged so that a light emission signal is sent to the flash control circuit 212 at a predetermined timing to cause the xenon tube 205 to flash.

Figure 12:
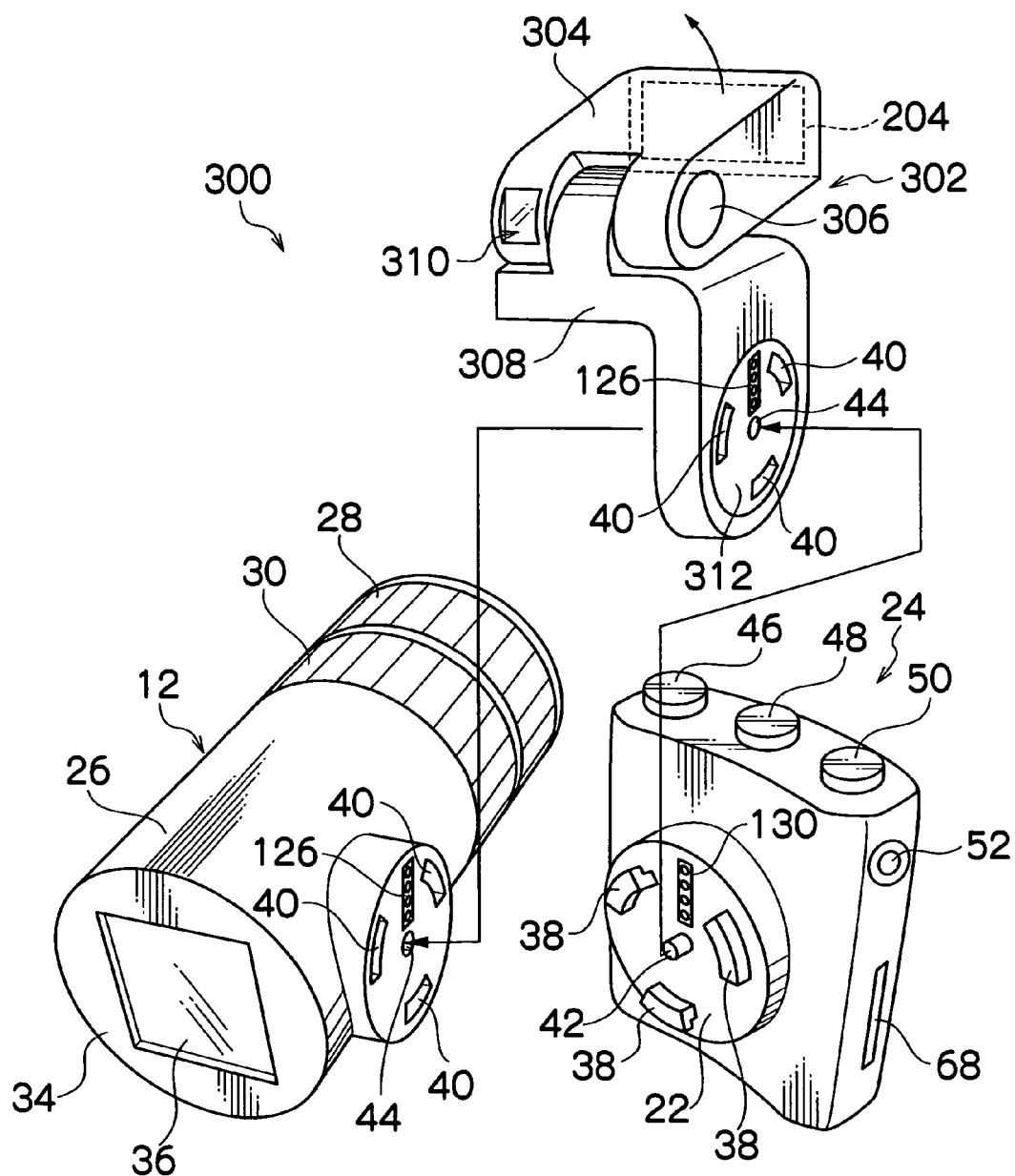
FIG. 12 is a perspective view showing another embodiment of a digital camera.

FIG. 12 shows another embodiment of a digital camera 300, in which the same or similar members to those of the digital camera 10, 200 shown in FIG. 1 to FIG. 11 are given the same reference numerals and will not be discussed or illustrated in detail herein.

The digital camera 300 shown in FIG. 12 is in a form having a specification for left-handed persons, in which the lens part 12 is connected to the camera body 24 via a electronic flashlight unit 302. Instead of the electronic flashlight unit 302, other accessory such as a microphone for collecting sound may be connected.

The electronic flashlight unit 302 includes a housing 304 having a light emission window 204 at a front portion thereof and a xenon tube 205 built therein (see FIG. 13), and an L-shaped bracket 308 which is rotatably coupled to a side surface of the housing 304 about via a shaft 306. To a rear surface of the housing 304 is built in an electronic viewfinder 310 for displaying a preview image which is picked up by the lens part 12. Since the housing 304 is rotatably configured relative to the bracket 308, the direction of light emission from the electronic flashlight unit 302 can be adjusted after the electronic flashlight unit 302 is connected to the lens mount part 18. When the specification is changed into a specification for left-handed persons, the electronic flashlight unit 302 is connected to the lens mount part 20 on the left side. At this point, a reverse of the housing 304 by 180 degrees allows the light emission window 204 to be directed toward an object which is disposed in front of the light emission window 204. Thus, the digital camera 300 can be used both in the specification for right-handed persons and in the specification for left-handed persons.

Figure 13:
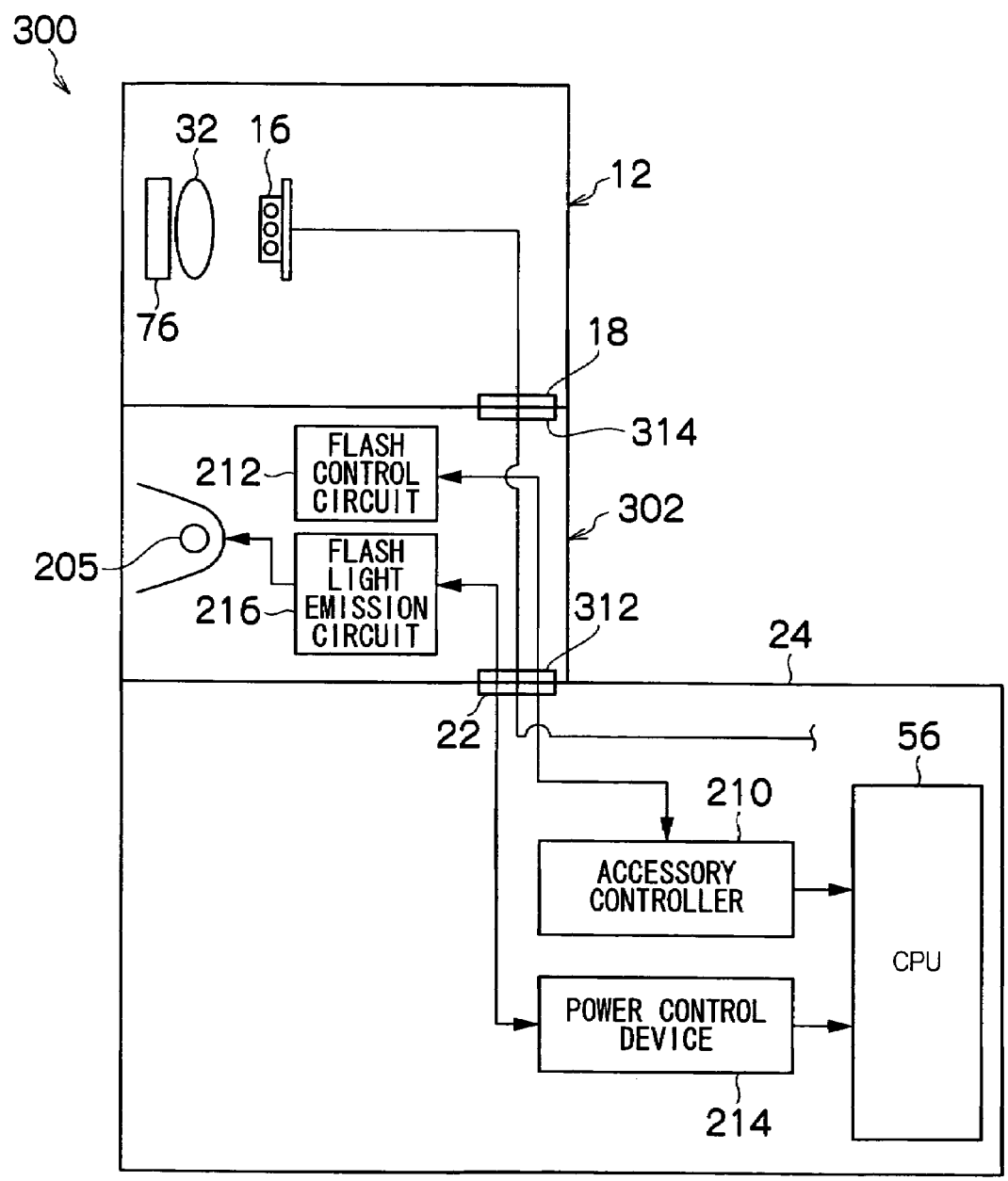
FIG. 13 is a block diagram showing a structure of the digital camera of FIG. 12.

The bracket 308 has one surface of a lower portion thereof to which a mount part 312 is provided to be connected to the mount part 22 of the camera body 24, and the other surface of the lower portion to which a mount part 314 is provided to be connected to the mount part 18 of the lens part 12 (see FIG. 13). This configuration allows the lens part 12 to be connected to the camera body 24 via the electronic flashlight unit 302.

FIG. 13 is a schematic block diagram showing a structure of the digital camera 300 in which the same or similar members to those of the digital camera 200 shown in FIG. 11 are given the same reference numerals and will not be discussed or illustrated in detail herein.

As shown in FIG. 13, a part of contacts of both lens mount part 312 and 314 of the electronic flashlight unit 302 are configured to be electrically communicated with the opposite contacts to both lens mount part 312 and 314. The lens mount part 18 on the right side of the lens part 12 and the mount part 22 of the camera body 24 can send signals of control systems such as an exposure signal, a focus signal, and a zoom signal, and a driving signal of the CCD 16, and receive a CCD output signal from the interchangeable lens part 12.

Figure 14:
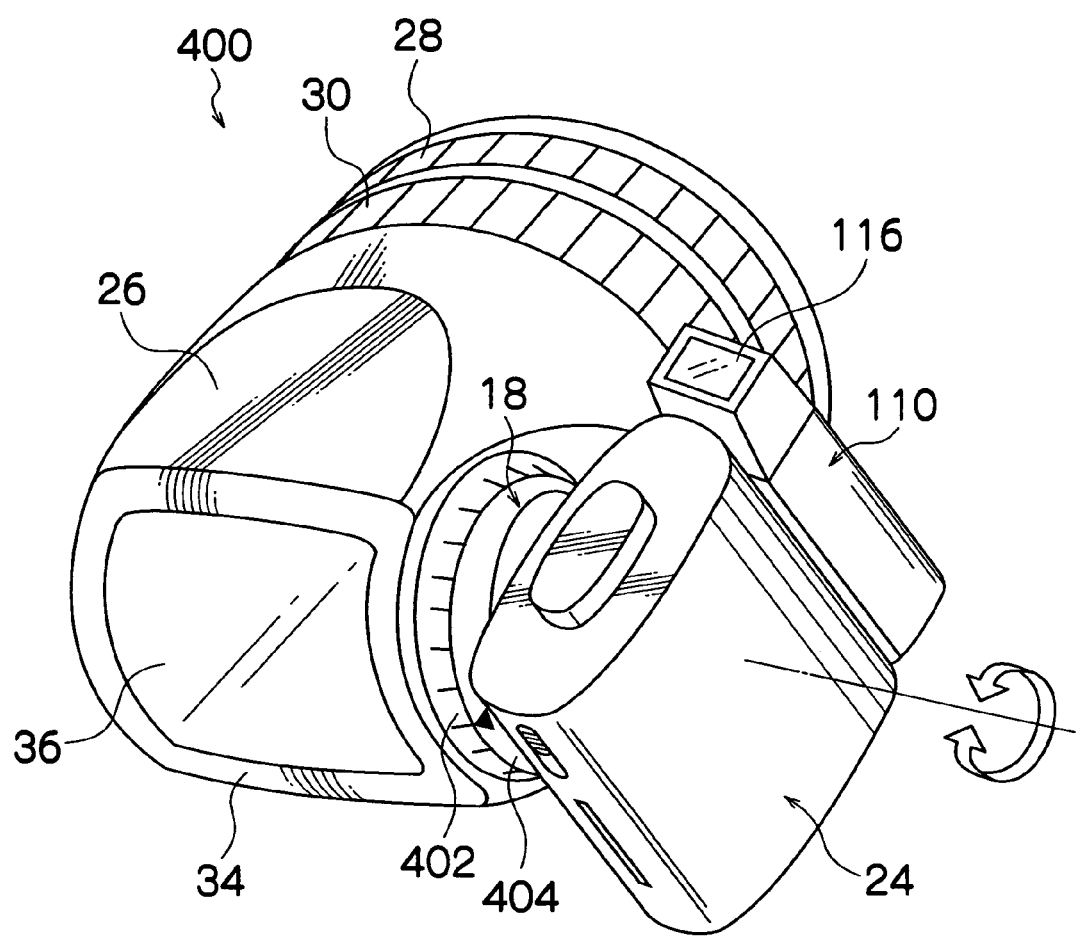
FIG. 14 is a perspective view showing another embodiment of a digital camera.

FIG. 14 shows another embodiment of a digital camera 400, in which the same or similar members to those of the digital camera 10 shown in FIG. 1 to FIG. 9 are given the same reference numerals and will not be discussed or illustrated in detail herein.

The interchangeable lens part 12 has a curved rear surface 34 to which a liquid crystal display monitor 36 is provided. A preview image during picking up an image is displayed on the liquid crystal display monitor 36, but in this case, an image pickup circuit and a liquid crystal display monitor driving circuit are built in the lens part 12. The image pickup circuit and the liquid crystal display monitor driving circuit may be built in the camera body 24. The camera body 24 is provided with an electronic viewfinder 110. The finder is not limited an electronic viewfinder of a liquid crystal display monitor, but an optical finder may be used.

As shown in FIG. 14, the mount part 18 is provided on the right side of the lens part 12 as seen from a user, and to the mount part 18, the camera body 24 is mounted. The lens part 12 can be carried around by a user with the camera body 24 taken away therefrom.

Figure 15:
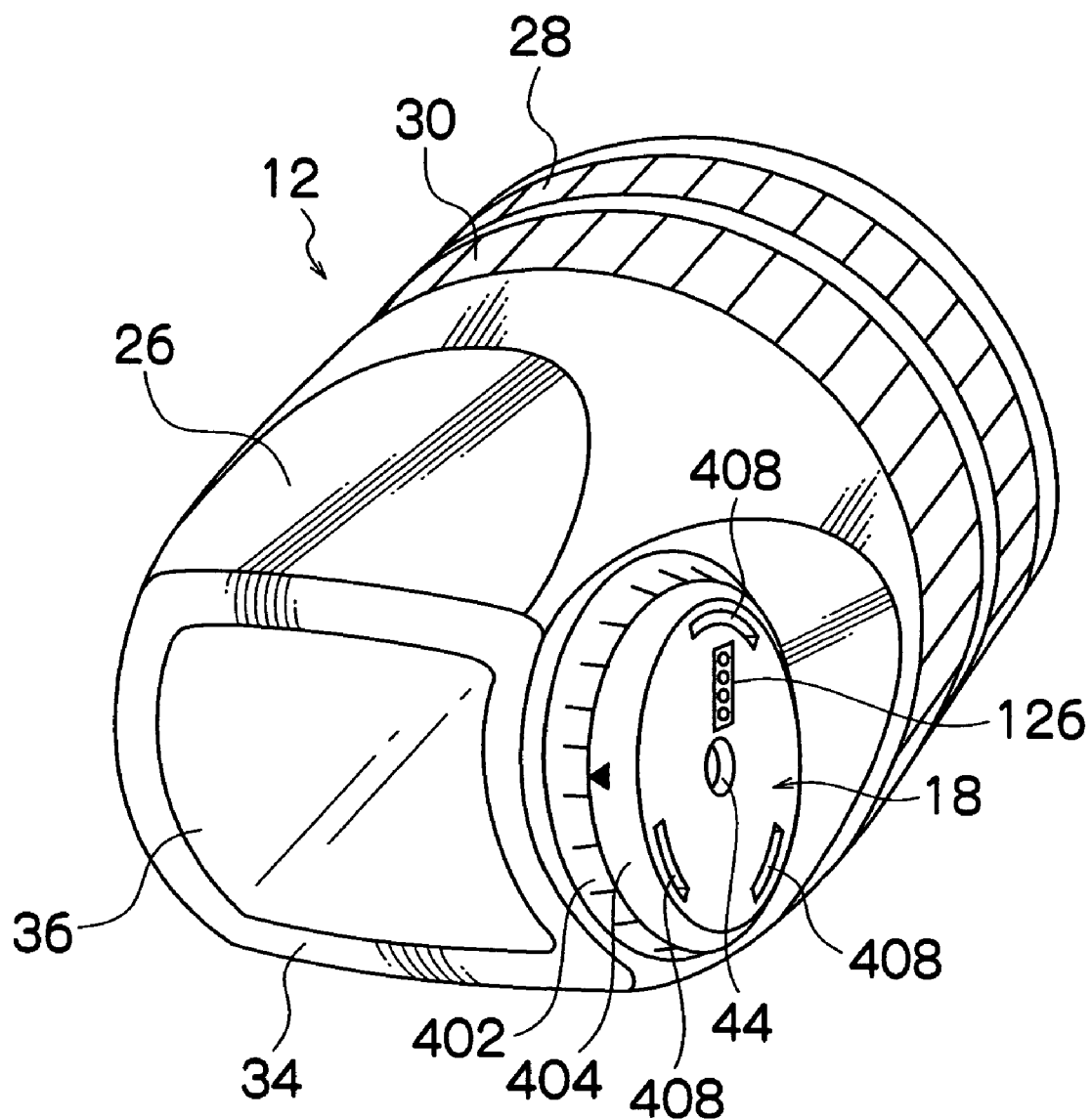
FIG. 15 is a perspective view showing a lens part of the digital camera of FIG. 14.

FIG. 15 is a detail view showing the mount part 18 on the right side of the lens part 12. The mount part 18 is configured as a two-layer structure having two disks 402 and 404, and the disks 402 and 404 are fitted to each other at the circumferential portions thereof with the disk 402 being rotatable relative to the disk 404. A wiring between an inner circuit of the lens part 12 and a connector 126 is arranged with a slack being left at the inside of the lens part 12 to provide flexibility to the rotation of the mount part 18.

The disk 404 is positioned in contact with the mount part 18 of the camera body 24, and has three arc-shaped holes 408 formed therein, in which three lock pawls (not shown) extended from the camera body are fitted, so that the lens part 12 and the camera body 24 are combined to each other, and the connector 126 of FIG. 15 is connected to a connector (not shown) of the camera body 24 to electrically connect the camera body 24 to the lens part 12. The three lock pawls and the three arc-shaped holes 408 are concentrically formed about the connector 44.

As shown in FIG. 14, the rotation of the disk 404 allows the camera body 24 to be rotatable relative to the lens part 12 as shown by an arrow, and enables an adjustment of the angle of the camera body. After an adjustment of the angle, the camera body is maintained at the adjusted angle by a frictional force of the disk 404 relative to the disk 402.

Figure 16:
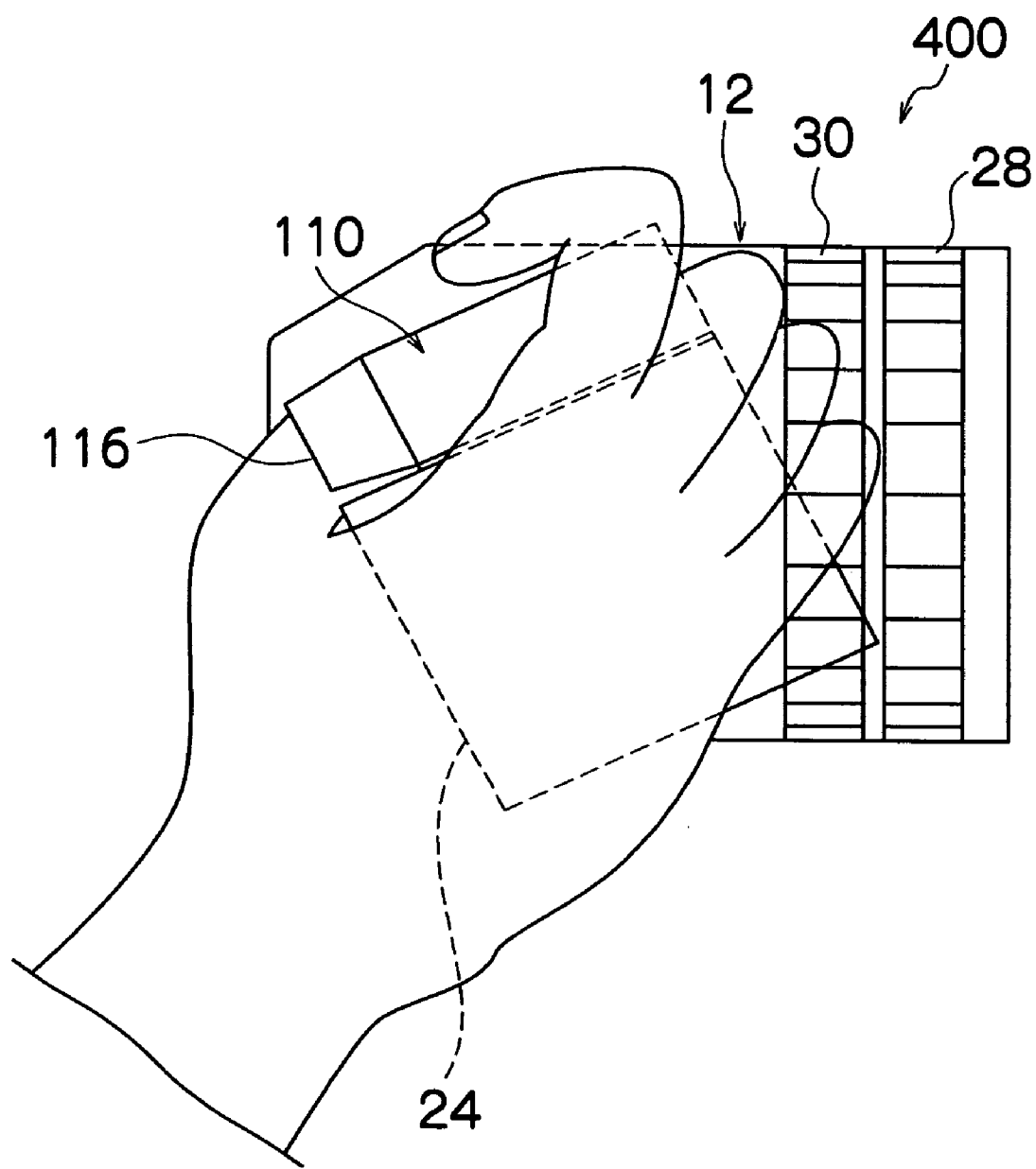
FIG. 16 is a side view showing the digital camera of FIG. 14.

FIG. 16 is a view showing the right side of the digital camera in the state of FIG. 15. As shown, by adjusting the rotation angle of the camera body 24 to make it comfortable for a user's wrist, the user can readily operate the digital camera 400 with his/her one hand.

In the above description, an adjusted angle is maintained by a frictional force, but other ways may be used, and for example, a click mechanism may be used to hold the camera body at a plurality of points, or a rotation lock mechanism may be used, and the lock is released to adjust the angle.

Figure 17:
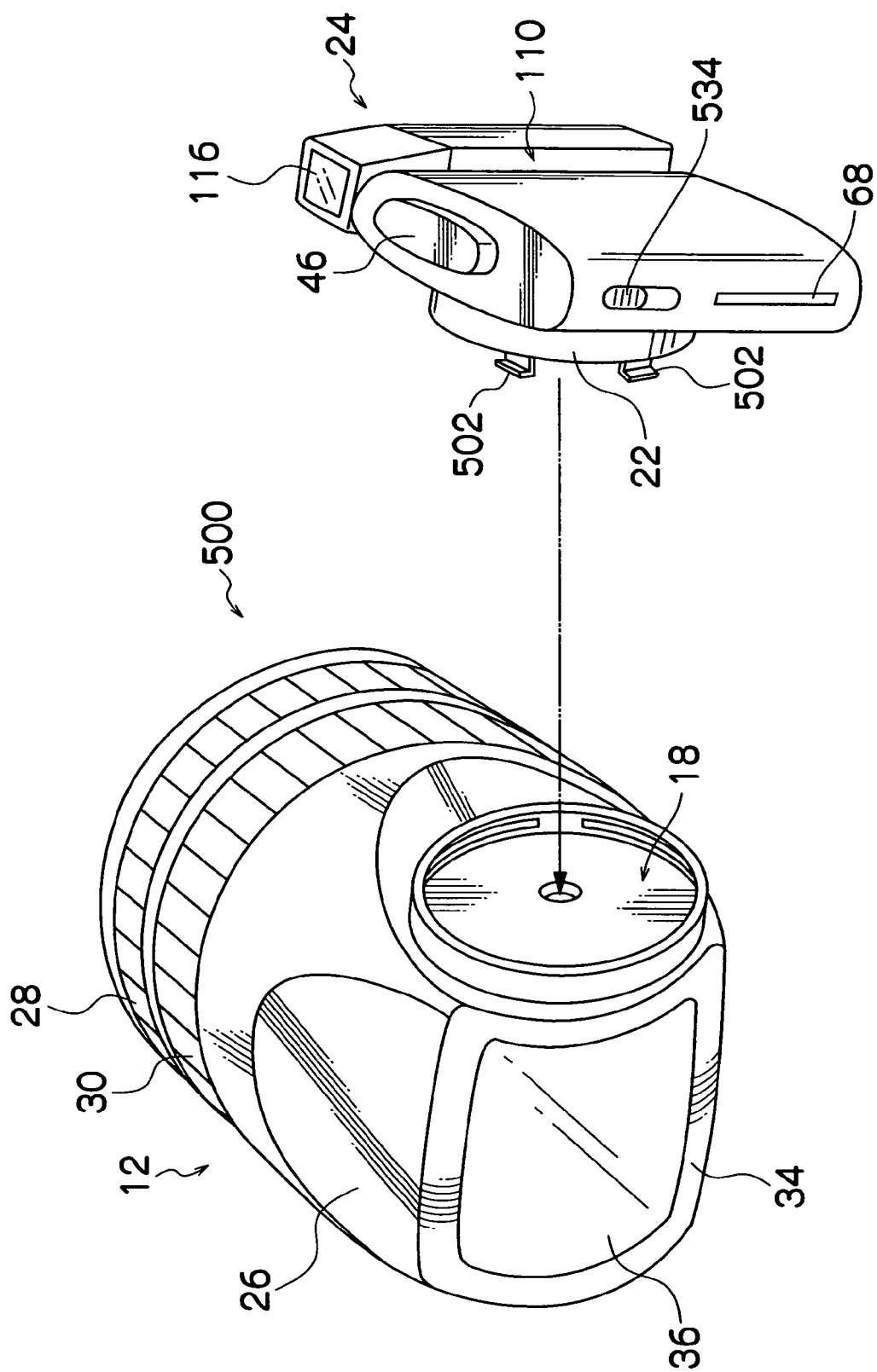
FIG. 17 is a perspective view showing another embodiment of a digital camera.

FIG. 17 shows a digital camera 500 of another embodiment, in which the same or similar members to those of the digital camera 10 shown in FIG. 1 to FIG. 9 are given the same reference numerals and will not be discussed or illustrated in detail herein.

Figure 18:
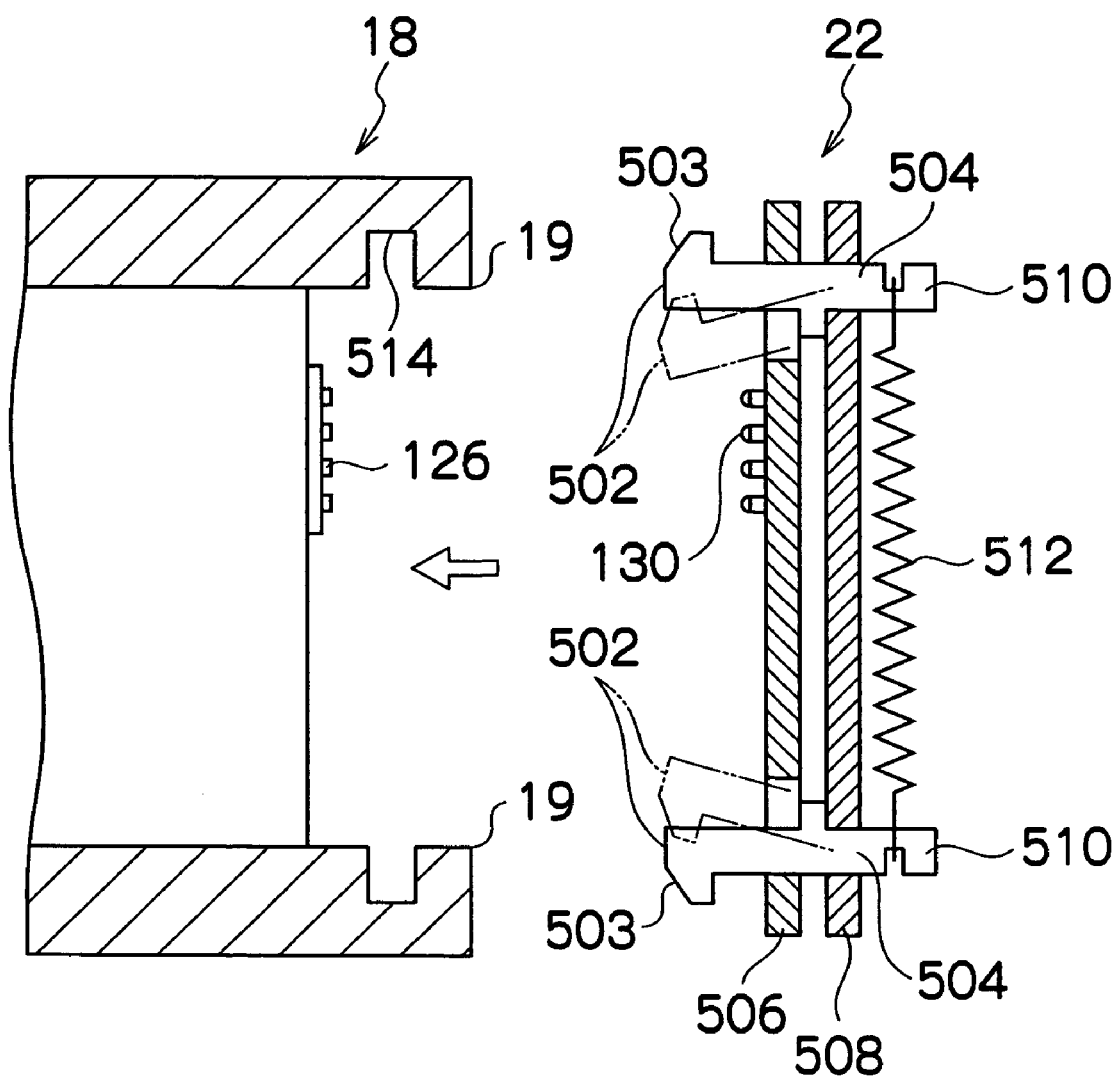
FIG. 18 is a cross sectional view showing a mount part coupling structure of the digital camera of FIG. 17.

FIG. 18 is a view of a mount part, showing cross sections of the mount part 18 of the lens part 12 and the mount part 22 of the camera body 24.

The mount part 22 of the camera body 24 has three pawl sections 502 (only two pawls are shown in FIG. 18) which are concentrically arranged to project outward. A lever 504, which is integrally formed with the pawl sections 502, is disposed through two plates 506 and 508, and an end section 510 which is located opposite to the pawl 502 is urged by a spring 512 toward the inner circumference of the plate 508. This configuration make the pawl section 502 urged toward the outer circumference to be maintained at the position shown by solid lines of FIG. 18.

The mount part 18 of the lens part 12 has grooves 514 formed in an inner circumferential surface into which the pawl sections 502 are fitted.

Figure 19:
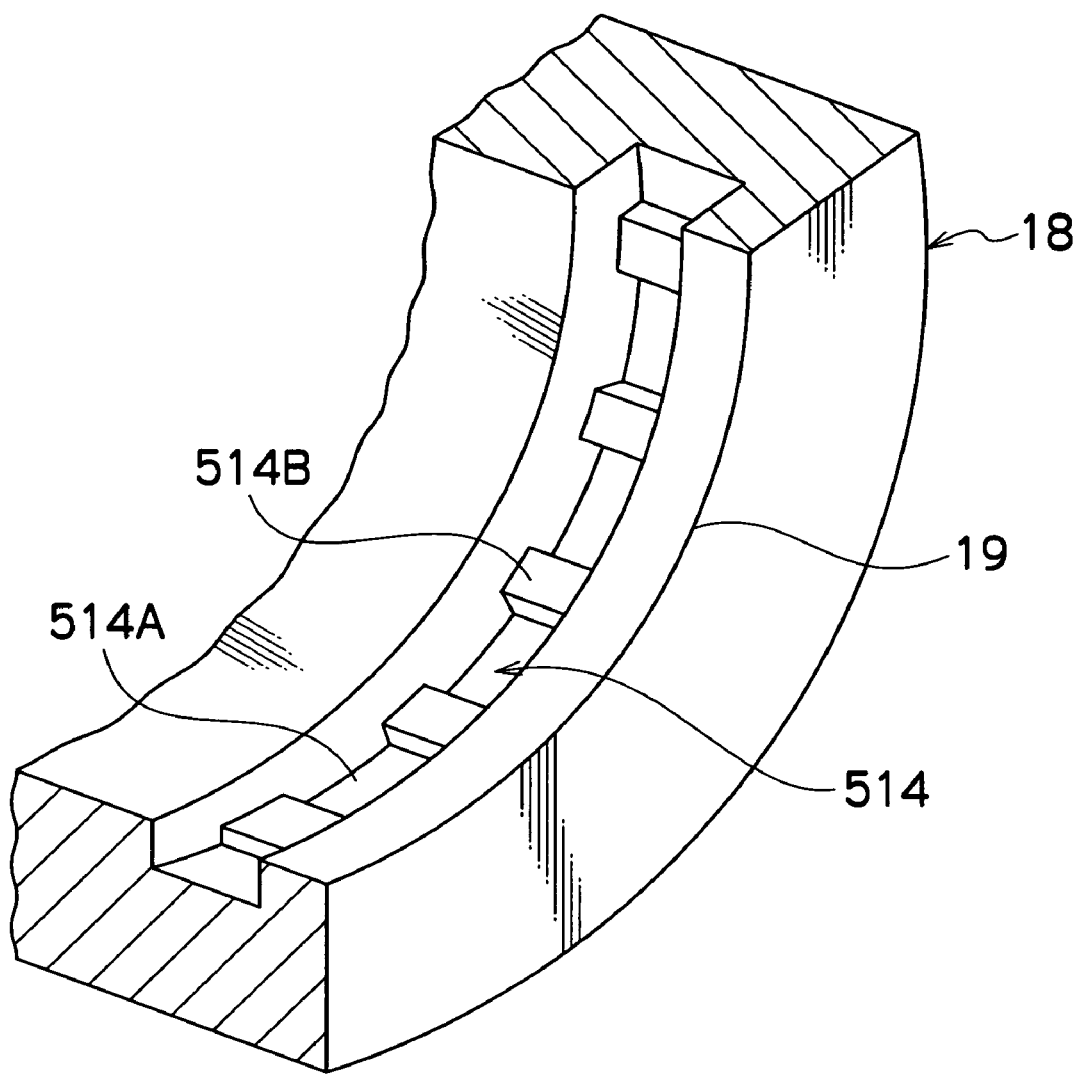
FIG. 19 is a schematic structural view showing a click mechanism of the coupling structure of FIG. 18.

When the mount part 22 of the camera body 24 is pressed against the mount part 18 of the lens part 12, tapered surfaces 503 of the pawl sections 502 contact inner circumferential corners 19 of the mount part 18, which causes the pawl sections 502 to move inward against the urging force of the spring 512 to be inserted into the recess of the mount part 18. When the pawl sections 502 reach the grooves 514, the pawl sections 502 is moved outward by the urging force of the spring 512 to be fitted into the grooves 514. In this state, the mount part 22 cannot fall out from the mount part 18, but is freely rotatable. Furthermore, the grooves 514 have recess portions 514A and convex portions 514B which are alternately formed on the entire bottom surface of the grooves 514 as FIG. 19, and this gives a definite feeling of clicking to a user in rotating the pawl sections 502.

Next, a mechanism for releasing a fit of the pawl sections 502 will be explained below.

Figure 20:
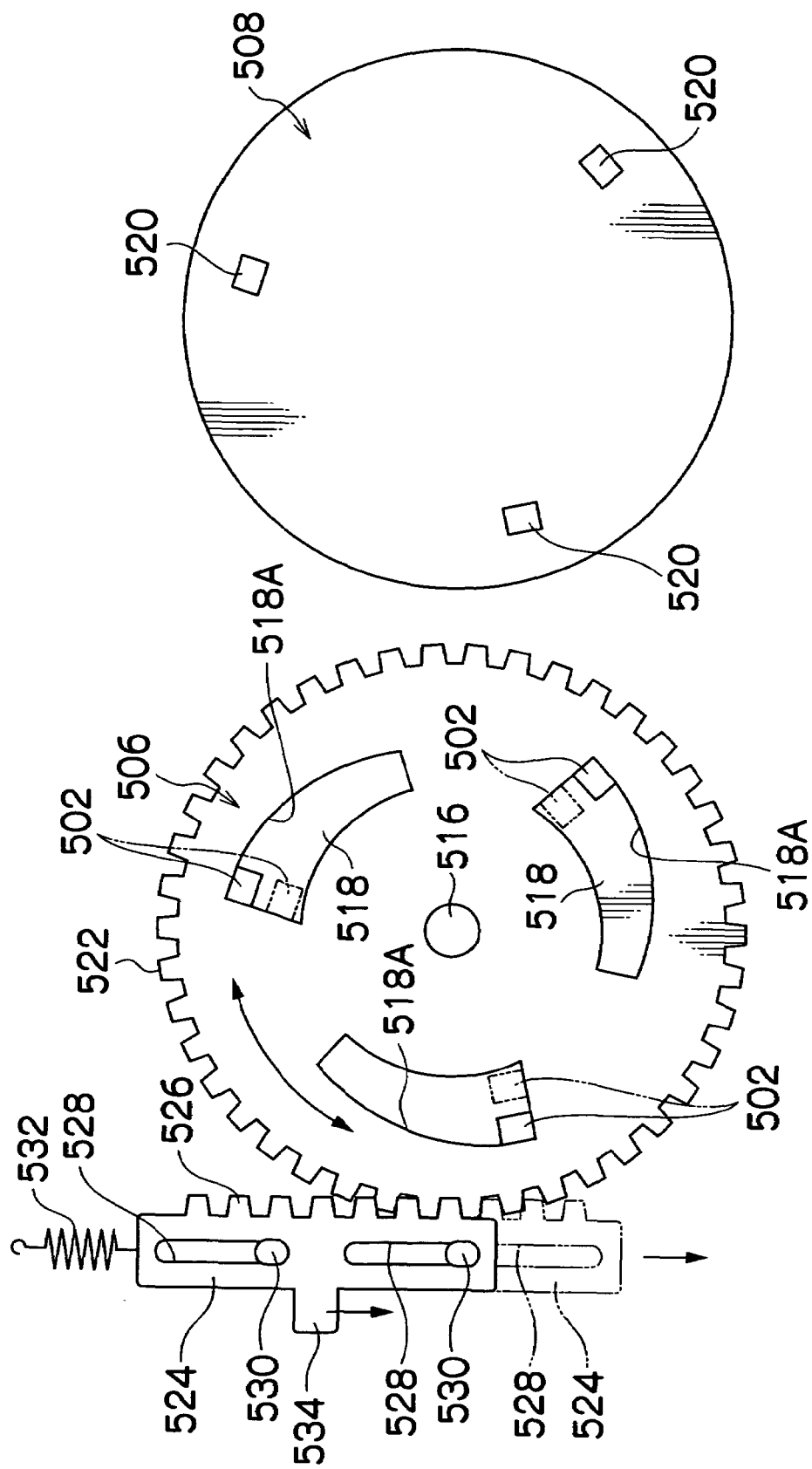
FIG. 20 is a structural view showing a releasing mechanism of the coupling structure of FIG. 18.

FIG. 20 is a development view showing the plates 506 and 508 of a mechanism for releasing a fit. The plate 506 is formed into a disk-like shape, and is rotatably provided to a shaft 516 which is mounted to the camera body 24, while the plate 508 which is similarly formed into a disk-like shape is fixed to the camera body 24. The levers 504 of the pawl sections 502 are inserted through generally fan-shaped openings 518 which are formed in the plate 506, and urged by the urging force of the spring 512 shown in FIG. 18 to be pressed against the outer peripheral edges 518A of the openings 518. The outer peripheral edges 518A are formed into an arc shape which curves convexly toward the outer circumference of the plate 506, as shown in FIG. 20. Also, the levers 504 are inserted through the openings 520 in the plate 508.

The plate 506 has a gear section 522 at the outer circumference thereof, and the gear section 522 is arranged in meshing engagement with racks 526 of a slider for releasing a fit 524. The slider 524 is built in the camera body 24, and has two long holes 528 which are formed into a linear shape and are fitted with guide pins 530 that are projected outwardly from the camera body 24. Also, the slider 524 is urged by a spring 532 upwardly of FIG. 20, so that the plate 506 is urged to rotate clockwise in FIG. 20 and the ends of the openings 518 on the longer arc side contact the pawl sections 502, which stops the rotation of the plate 506. At this point, the pawl sections 502 are at the fitting positions shown by solid lines of FIG. 18. The slider 524 has a knob 534 which is exposed on a side surface of the camera body 24 as shown in FIG. 17 to be manually operated.

Figure 21:
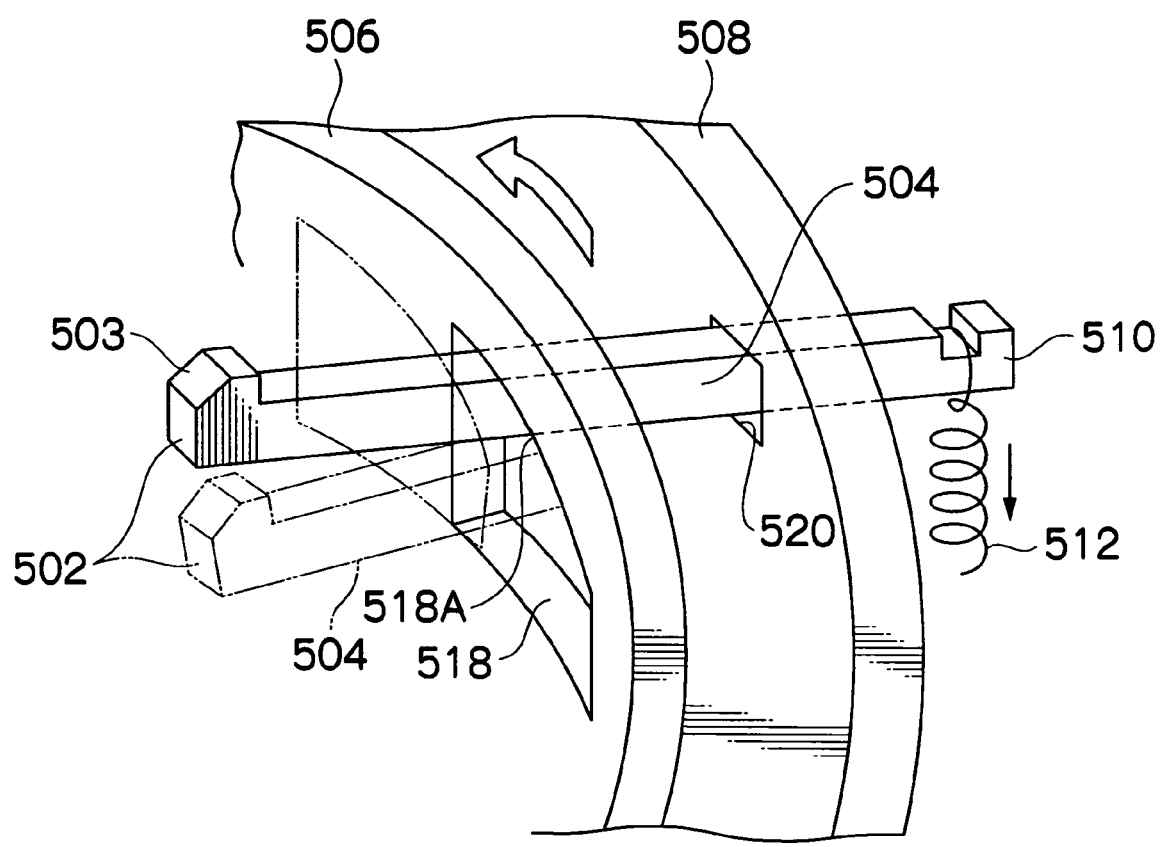
FIG. 21 is a schematic structural view showing the releasing mechanism of FIG. 20.

In order to release the fitting of the pawl sections 502, the knob 534 on the slider 524 is pulled down in a direction shown by an arrow. This causes the plate 506 to rotate counterclockwise in FIG. 20, and in turn the lever 504 is pressed by the outer peripheral edge 518A of the opening 518 to move inwardly against the urging force of the spring 512 as shown by a chain double-dashed line of FIG. 21, thereby the pawl section 502 is released from the groove 514. In this way, the fitting is released so that the camera body 24 is removed from the lens part 12.

In this embodiment, a recess is formed in the mount part 18 of the lens part 12, and the pawl section 502 is provided to the camera body 24, but contrary to the configuration, the pawl section 502 may be provided to the lens part 12, and the pawl section 502 may be provided to the mount part 22 of the camera body 24.

Figure 22:
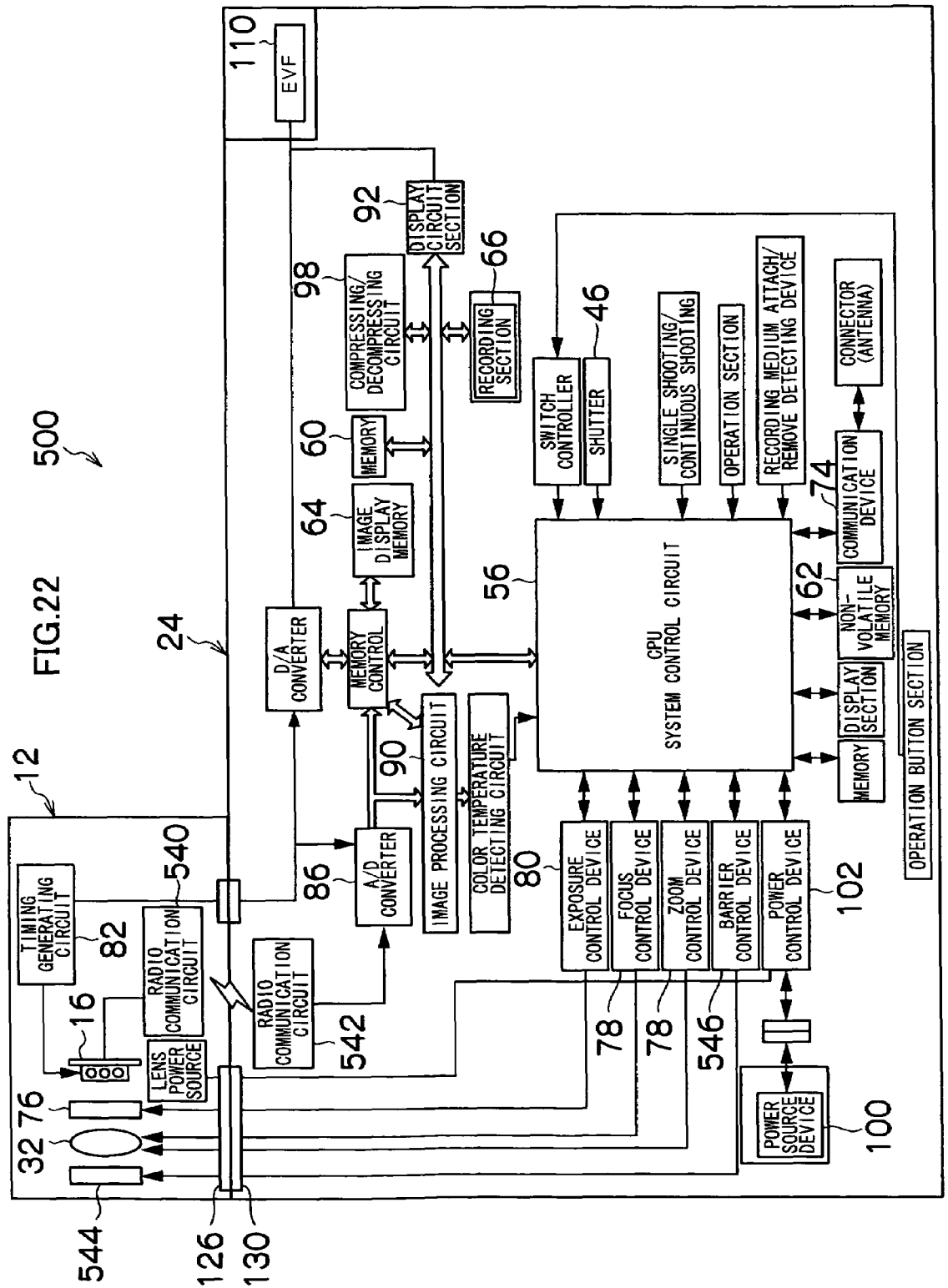
FIG. 22 is a block diagram showing an entire structure of the digital camera of FIG. 17.

FIG. 22 is a schematic block diagram showing a structure of the digital camera 500, in which the same or similar members to those of the digital camera 10 shown in FIG. 4 are given the same reference numerals and will not be discussed or illustrated in detail herein.

The digital camera 500 transmits a lens control signal for focusing and zooming which is output from a lens driving section (focus control device, zoom driving device) 78, power source supply from a power source device 100, and a CCD driving timing signal, and secures a response of the lens action by directly connecting the connectors 126 and 130, and also directly supplies power. The synchronism of CCD driving also can be obtained.

The CCD output signal is, after converted to radio wave, transmitted to a radio communication circuit 540 of the lens part 12, and is received by a radio communication circuit 542 of the camera body 24. This transmission and receipt may be done by using a general method for radio communication such as one for wireless LAN, but since the transmission and receipt is only for access distance, the output is desirably the minimum. An access distance communication can be performed more easily by converting the CCD output signal into a light signal and arranging a sending device and a receiving device at opposing positions at mount parts. In any case, the mount parts 18, 22 can be configured to a compact size without many contacts arranged inside of the mount parts 18, 22.

Since the CCD output signal needs to communicate a large volume of data in a short period of time, the number of contacts is increased in view of the communication by electric contacts, which disturbs the downsizing of the mount parts. Reference numeral 544 designates a lens barrier which is moved between a position for covering the lens for image pickup and a position for exposing the lens for image pickup by a barrier controlling device 546 that is controlled by the CPU 55.

Figure 23:
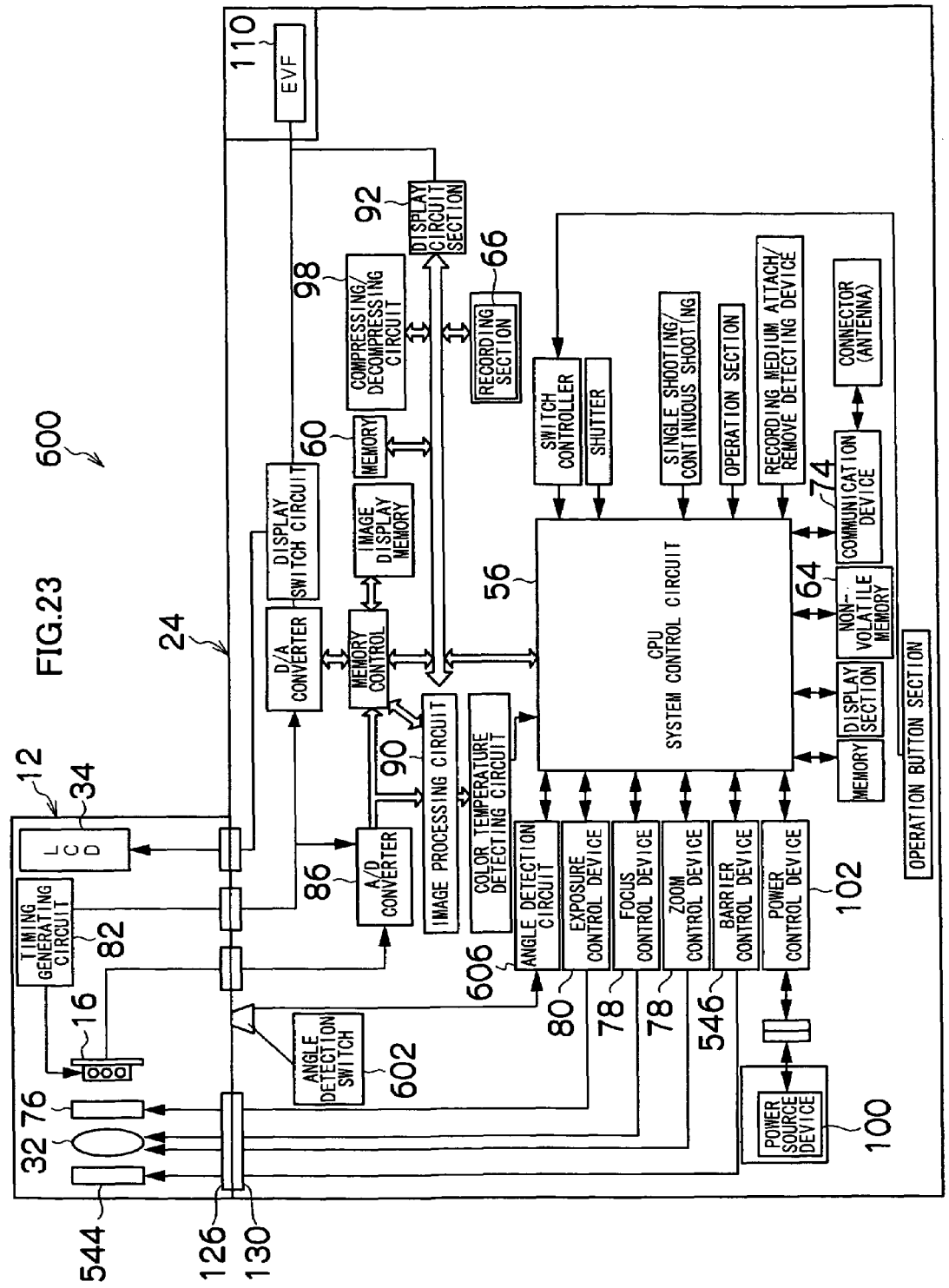
FIG. 23 is a block diagram showing an entire structure of another embodiment of a digital camera.

FIG. 23 shows a digital camera 600 of another embodiment, in which the same or similar members to those of the digital camera 500 shown in FIG. 17 are given the same reference numerals and will not be discussed or illustrated in detail herein.

The digital camera 600 has an angle detecting switch (angle detecting device) 602 at the mount part 22 of the camera body 24. Specifically, the angle detecting device 602 may be the one configured with a combination of a magnet and a hall device, the one configured with a mechanical switch and a cam, or the one configured with a rotary switch.

Figure 24:
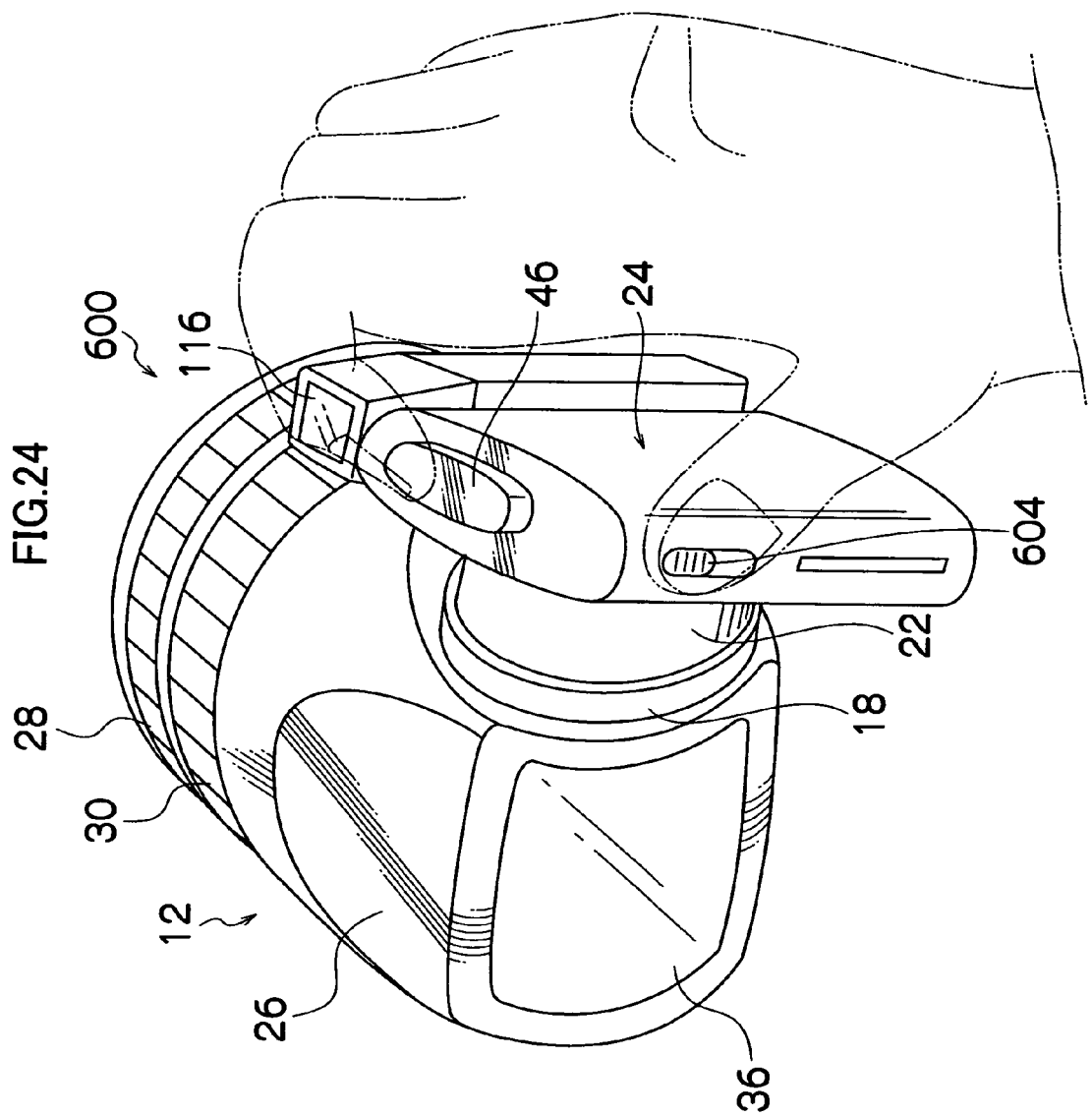
FIG. 24 is a perspective view showing a usage type of the digital camera of FIG. 23.

The lens part 12 having the camera body 24 mounted thereto will be in a form as shown in FIG. 24. In this form, when a power source switch 604 is turned on, the angle detecting switch 602 detects that the camera body 24 is vertically mounted, and information of the vertical mount is output to the CPU 56 via an angle detecting circuit 606. At this point, the CPU 56 switches the operation mode of the digital camera 600 into a static image pick-up mode. In this case, the button 46 arranged on the upper surface of the camera body 24 is switched into an image pickup button.

Figure 25:
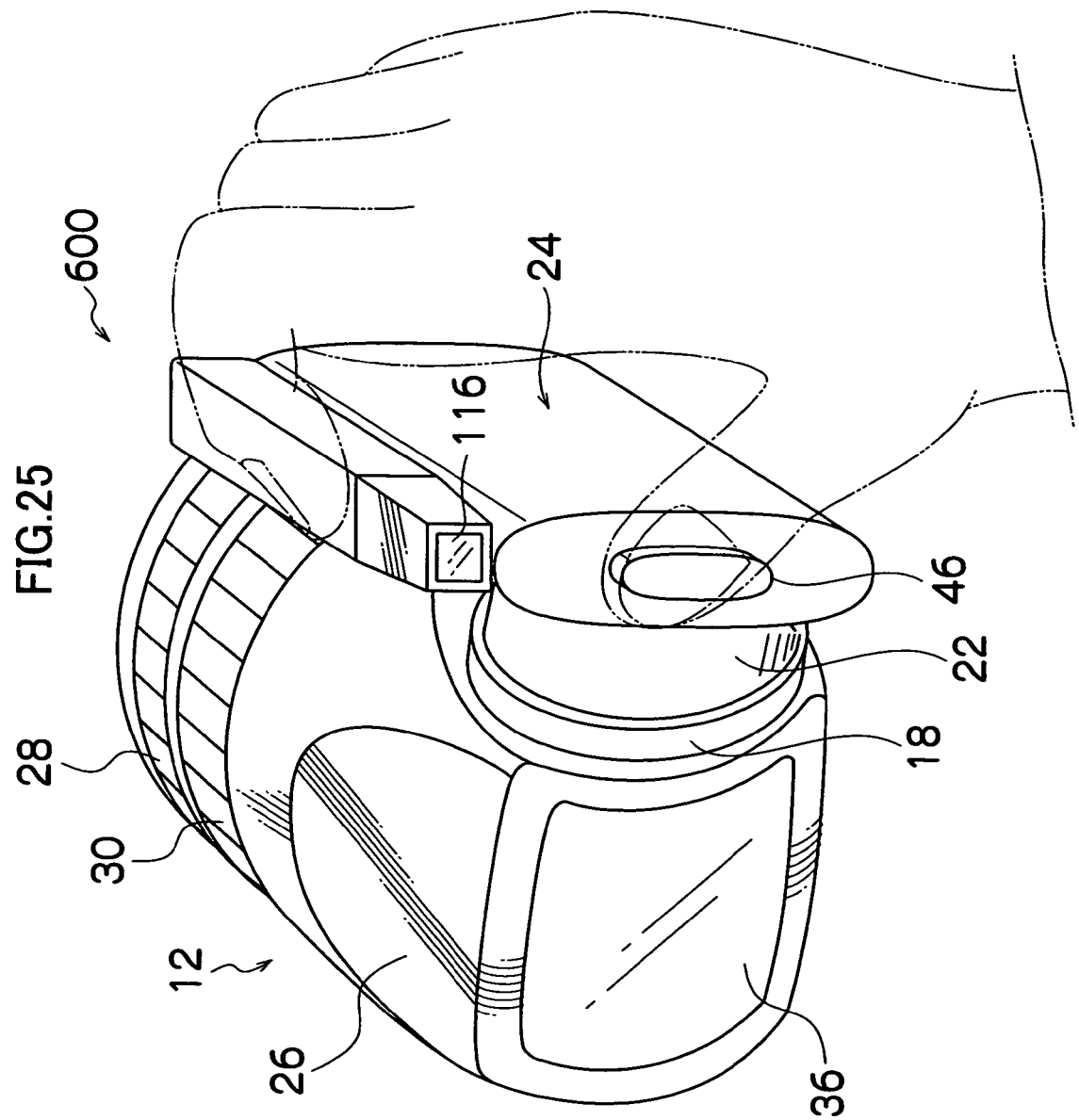
FIG. 25 is a perspective view showing a usage type of the digital camera of FIG. 23.

In order to switch the mode into a dynamic image pick-up mode, the camera body 24 is rotated counterclockwise by 90 degrees toward a user as shown in FIG. 25. Then, the angle detecting switch 602 detects that the camera body 24 is horizontally mounted, and information of the horizontal mount is output to the CPU 55 via an angle detecting circuit 606. At this point, the CPU 56 switches the operation mode of the digital camera 600 into a dynamic image pick-up mode. In this case, the button 46 is switched into a record/stop button.

Figure 26:
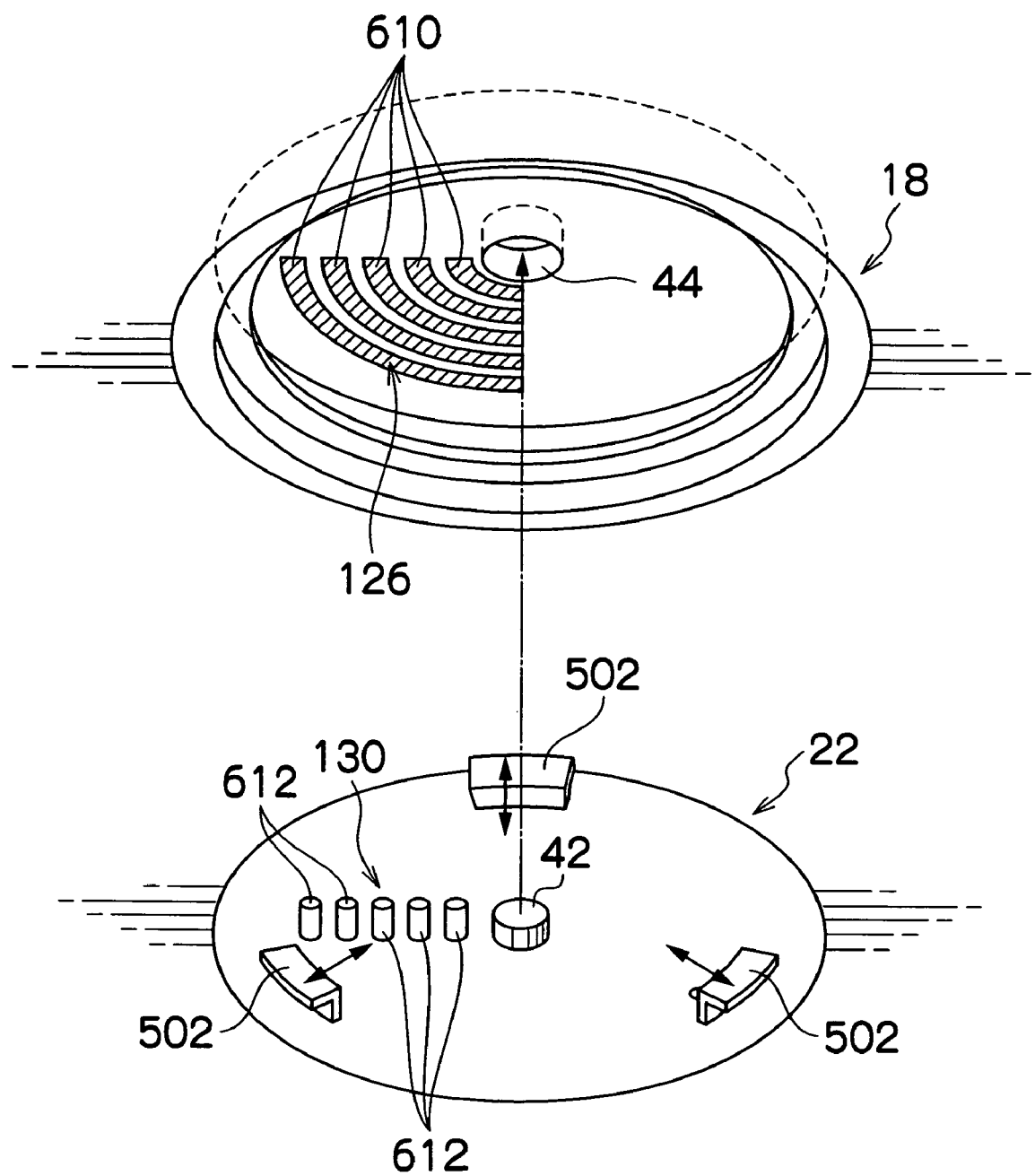
FIG. 26 is a view illustrating a connector structure of a mount part.

FIG. 26 shows an example of a contact structure of the connectors 126, 130.

The mount part 18 has a connector 126 formed of a plurality of concentric patterns 610 each of which is connected to a circuit of the lens part 12 at a back surface of a substrate. The patterns 610 are arranged along an arc of a quarter of a circle, but other arrangement may be used.

Meanwhile, the mount part 22 of the camera body 24 has a connector 130 formed of a power source and terminal pins 612 for serial communication which are linearly arranged in a radial direction at predetermined spaces to be connected to a circuit of the camera body 24. When the mount part 18 and 22 are mounted to each other, the terminal pins 612 are pressed against the pattern 610. In this state, even when one of the terminal pins 612 is temporarily interrupted due to a contact failure for example, since other terminal pins are kept in contact with the patterns 610, the mount part 18 and 22 are securely in a conductive state even after the mount part 18 and 22 are relatively rotated by 90 degrees.

Figure 27:
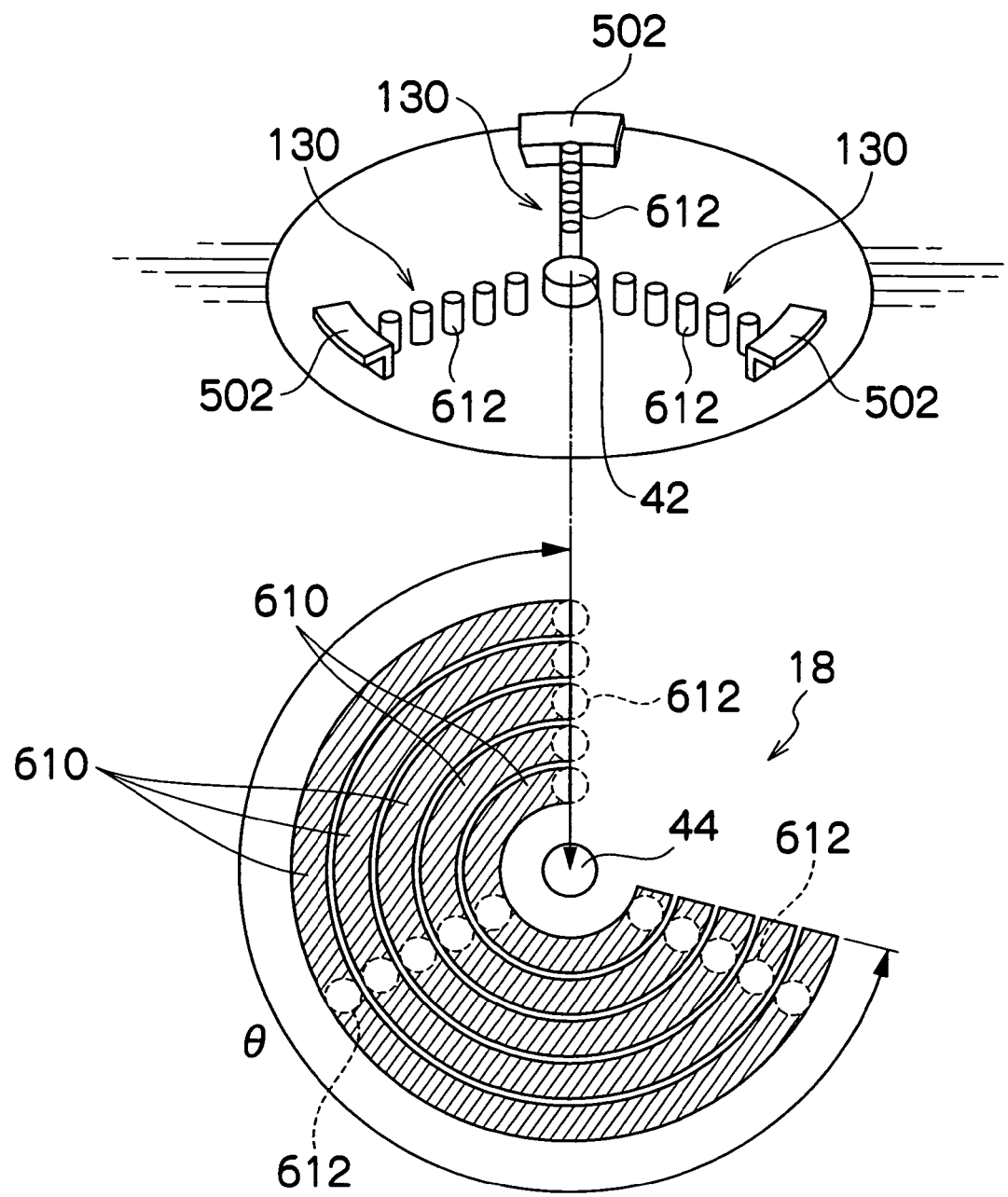
FIG. 27 is a view illustrating a connector structure of a mount part.

FIG. 27 shows another contact structure. The mount part 18 has a connector 126 formed of a plurality of concentric patterns 610 each of which is connected to a circuit of the lens part 12 at a back surface of a substrate. The patterns 610 are arranged along an arc of a three-fourths of a circle (θ=270 degrees) so that at least two rows of connectors 130 of three rows of connectors 130 of connectors 130 described below.

Meanwhile, the mount part 22 of the camera body 24 has three connectors 130 formed of a power source and terminal pins 612 for serial communication which are linearly arranged in a radial direction at predetermined spaces, the three connectors being at spaces 120 degrees on the circumference, to be connected to a circuit of the camera body 24. This structure, that is at least two lines of connectors 130 are kept in contact with the patterns 610, improves reliability on conduction.

Figure 28A:
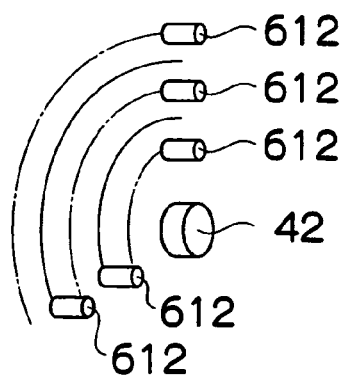
FIGS. 28A to 28C are views illustrating an arrangement of terminal pins in a connector.
Figure 28B:
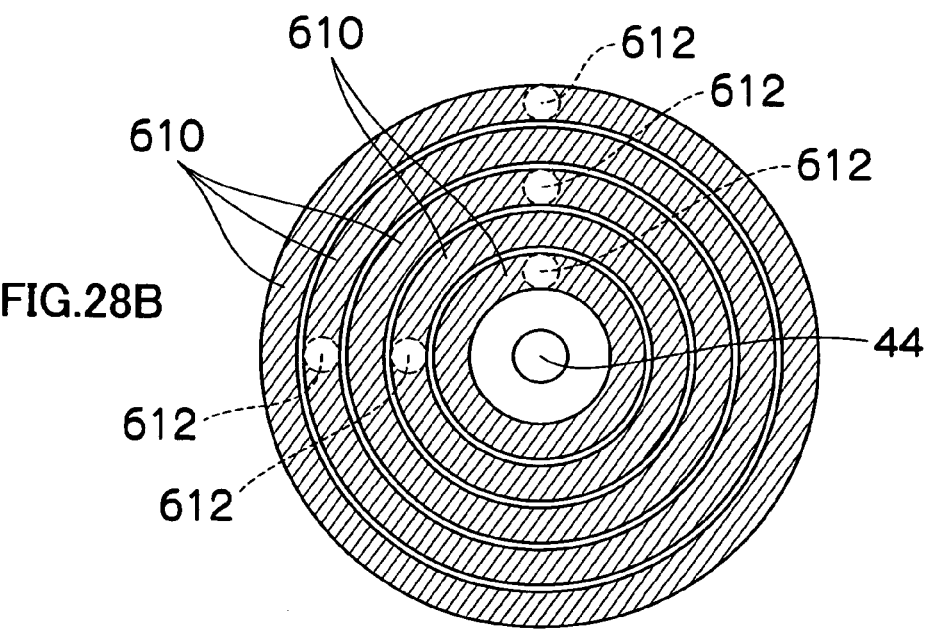
Figure 28C:
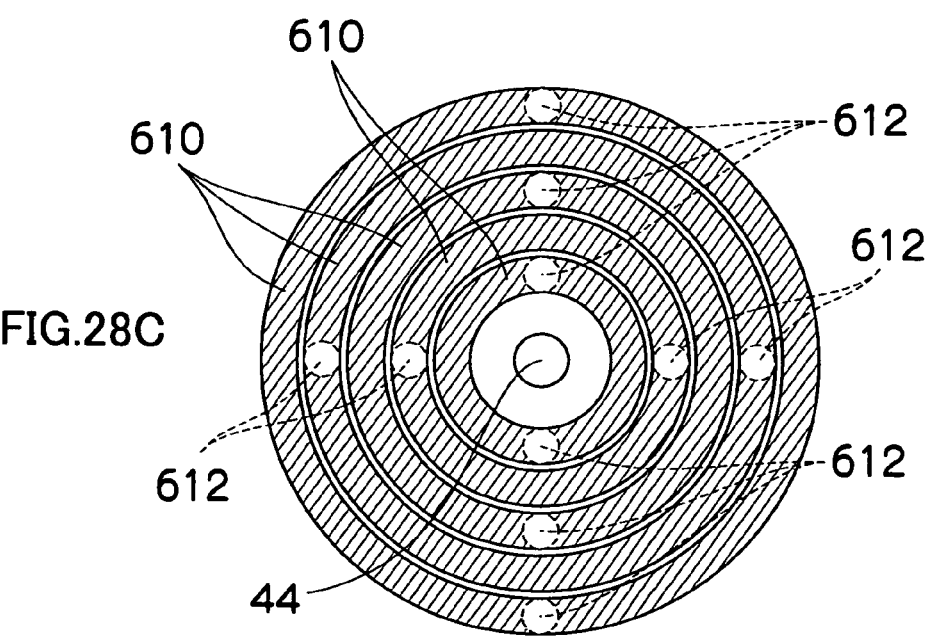
Figure 29:
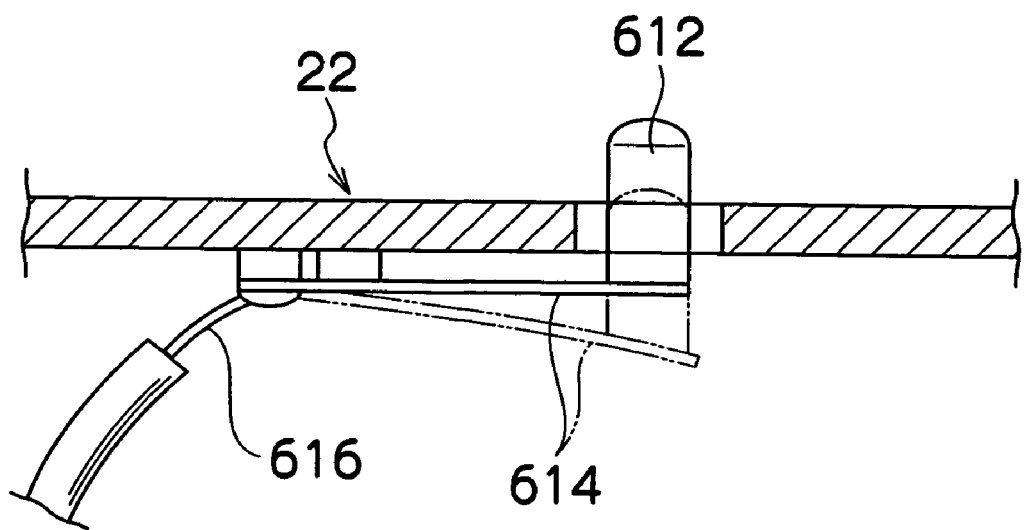
FIG. 29 is a view illustrating an urging structure of terminal pins.

As shown in FIG. 28A, when adjacent terminal pins 612 are arranged at wider spaces on circumferences, the terminal pins 612 are not close to each other, which provides a stable structure and a reliable conduction. In this case, as shown in FIG. 28B, a concentric arrangement of the patterns 610 in a ring shape improves reliability on conduction. Also, as shown in FIG. 28C, when the arrays of the terminal pins 612 shown in FIG. 28B are symmetrically disposed about the connector 44, the reliability on conduction is further improved. The terminal pins 612 are attached to the leaf spring 614 as shown in FIG. 29 to be urged in a projecting direction toward the surface of the mount part 22, and when the patterns 610 press the pins 612, the pins 612 are moved into a direction to be pushed in against the urging force of the leaf spring 614. The urging force of the leaf spring 614 stables the contact between the pins 612 and the patterns 610. Reference numeral 616 designates a lead wire for connecting the terminal pins 612 to a circuit of the camera body 24.

Figure 30:
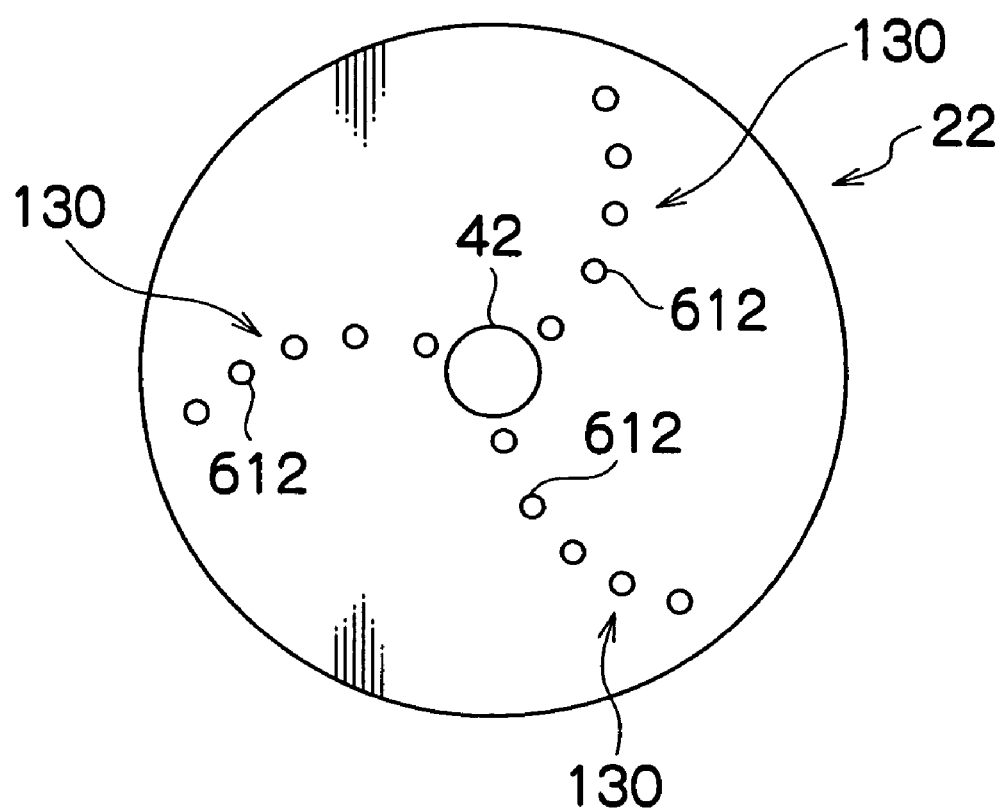
FIG. 30 is a view illustrating an arrangement of terminal pins in a connector.
Figure 31:
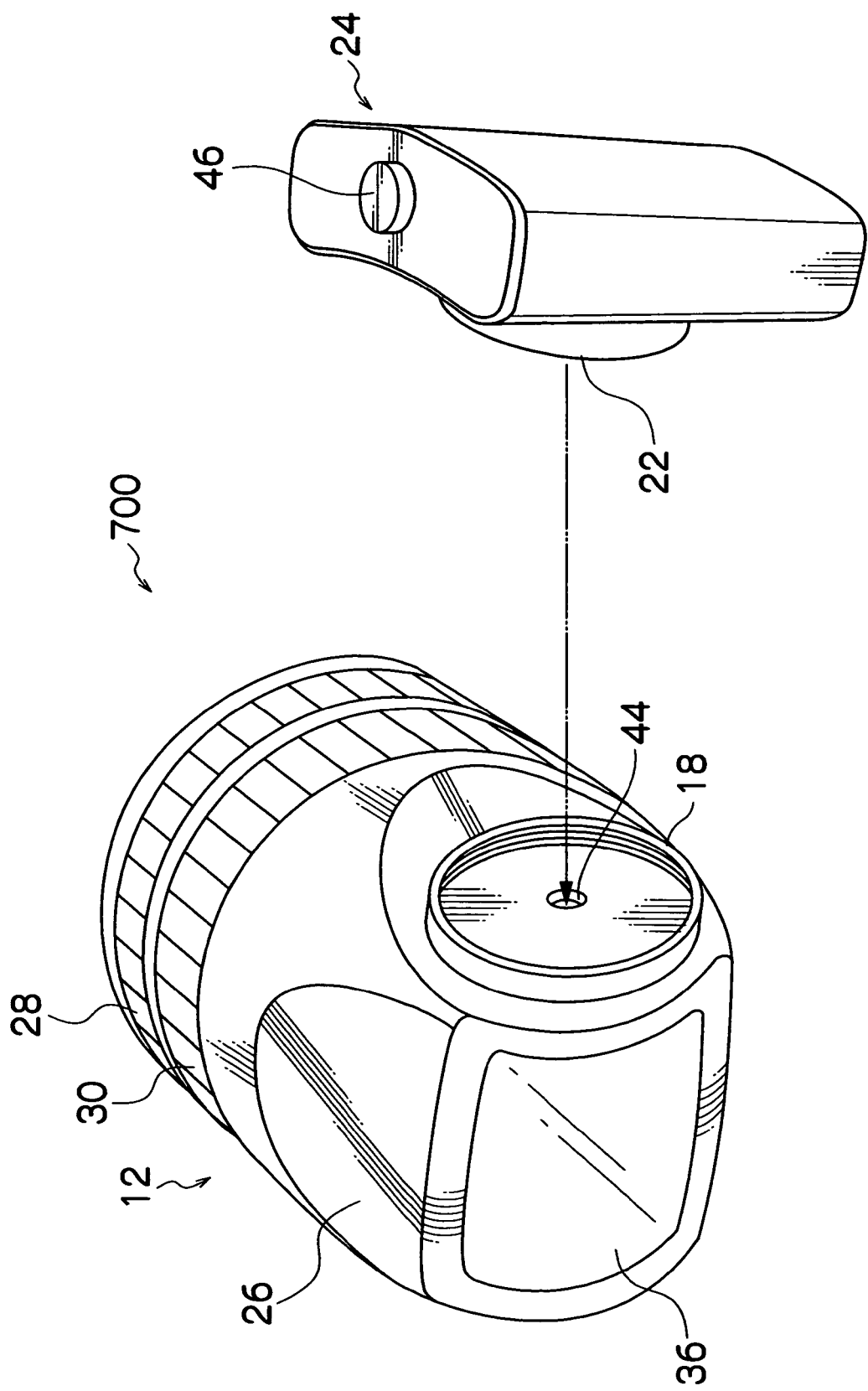
FIG. 31 is a perspective view showing another embodiment of a digital camera.

FIG. 30 shows another contact structure. The mount part 22 of the camera body 24 has terminal pins 612 which are spirally arranged about the center of the mount part 22. This arrangement allows the terminal pins 612 to be disposed at wider spaces and be not so close to each other as compared to the radially arranged terminal pins 612, which provides a stable structure and reliable conduction. As shown in FIG. 30, the terminal pins 612 which are spirally arranged in three directions further increase the stability of conduction.

FIG. 31 to FIG. 35 show another embodiment of a digital camera 700, in which the same or similar members to those of the digital camera 10 shown in FIG. 1 to FIG. 9 are given the same reference numerals and will not be discussed or illustrated in detail herein.

Figure 32:
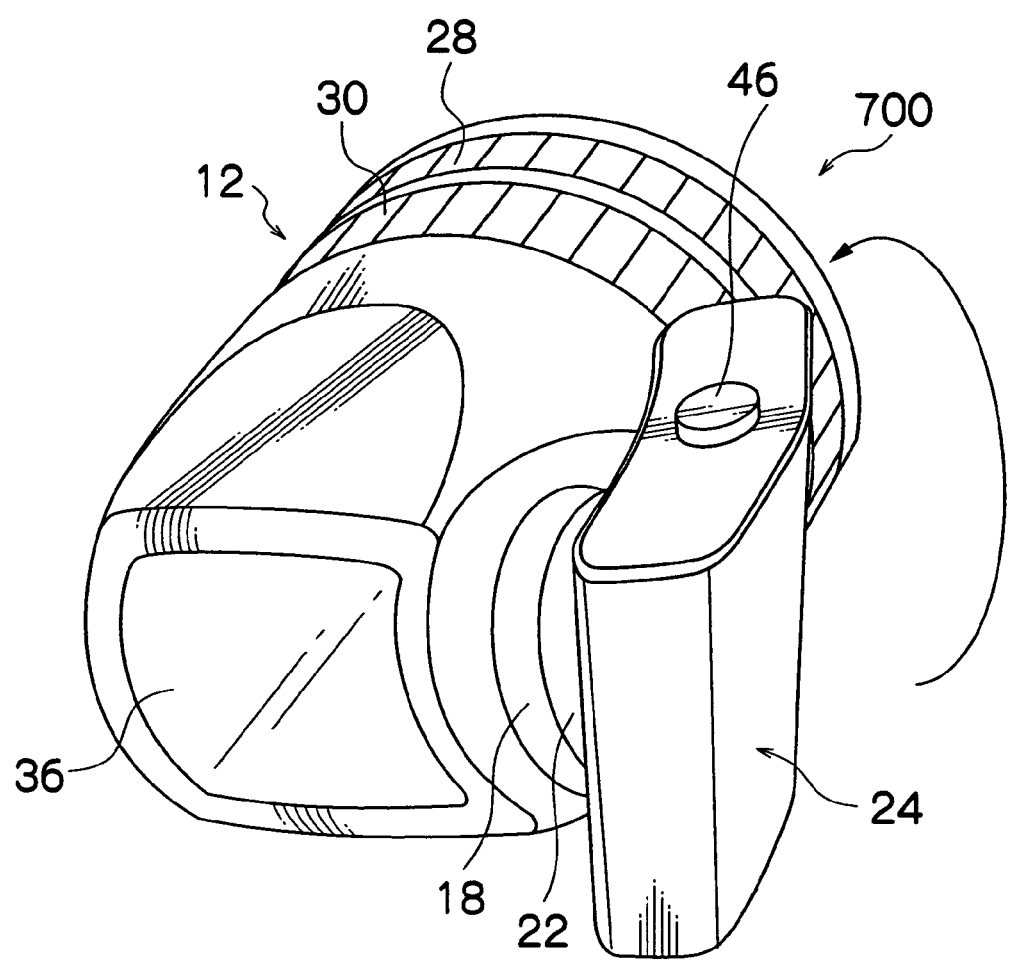
FIG. 32 is a perspective view showing a usage type of the digital camera of FIG. 31.
Figure 33:
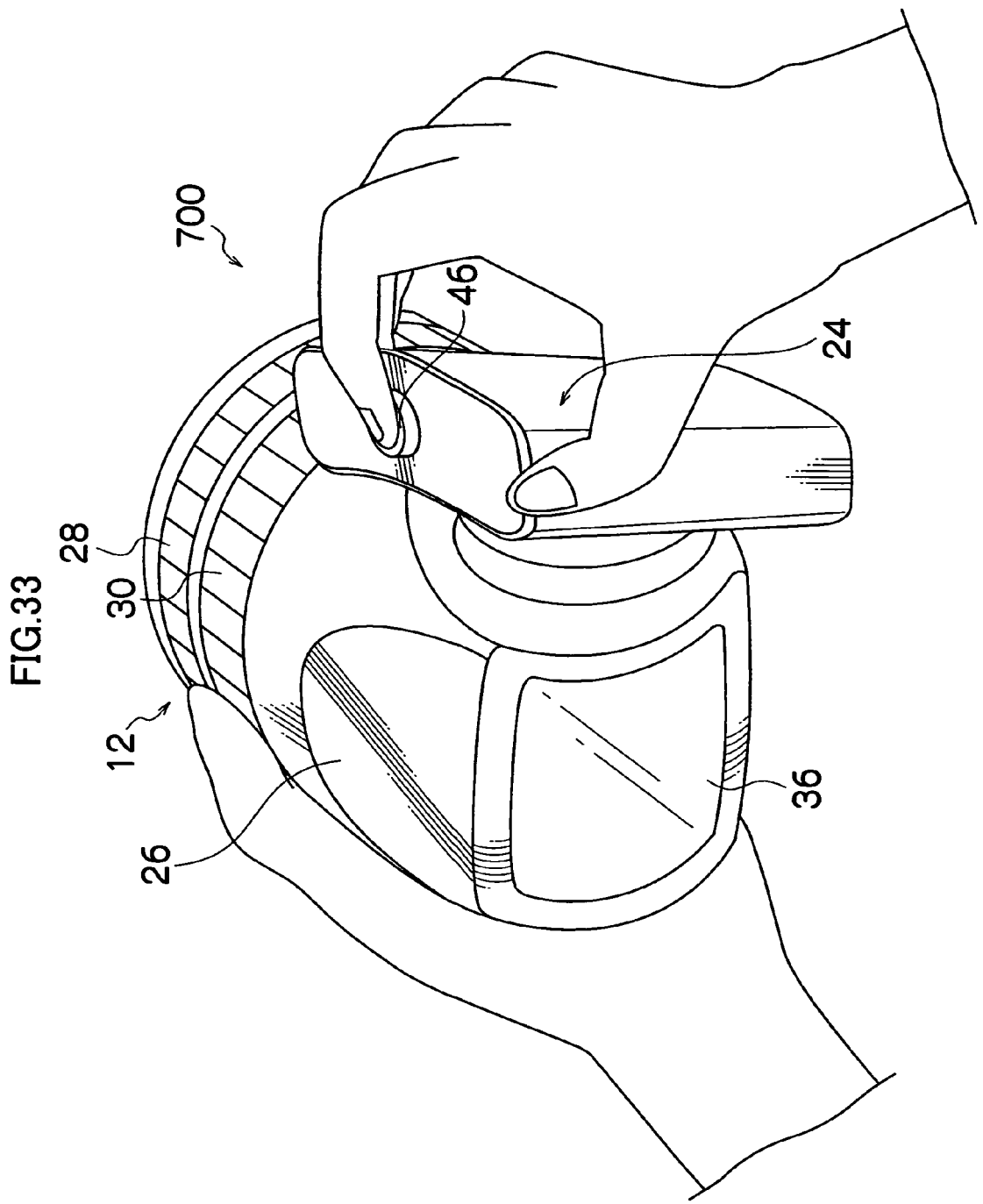
FIG. 33 is a perspective view showing a usage type of the digital camera of FIG. 31.
Figure 34:
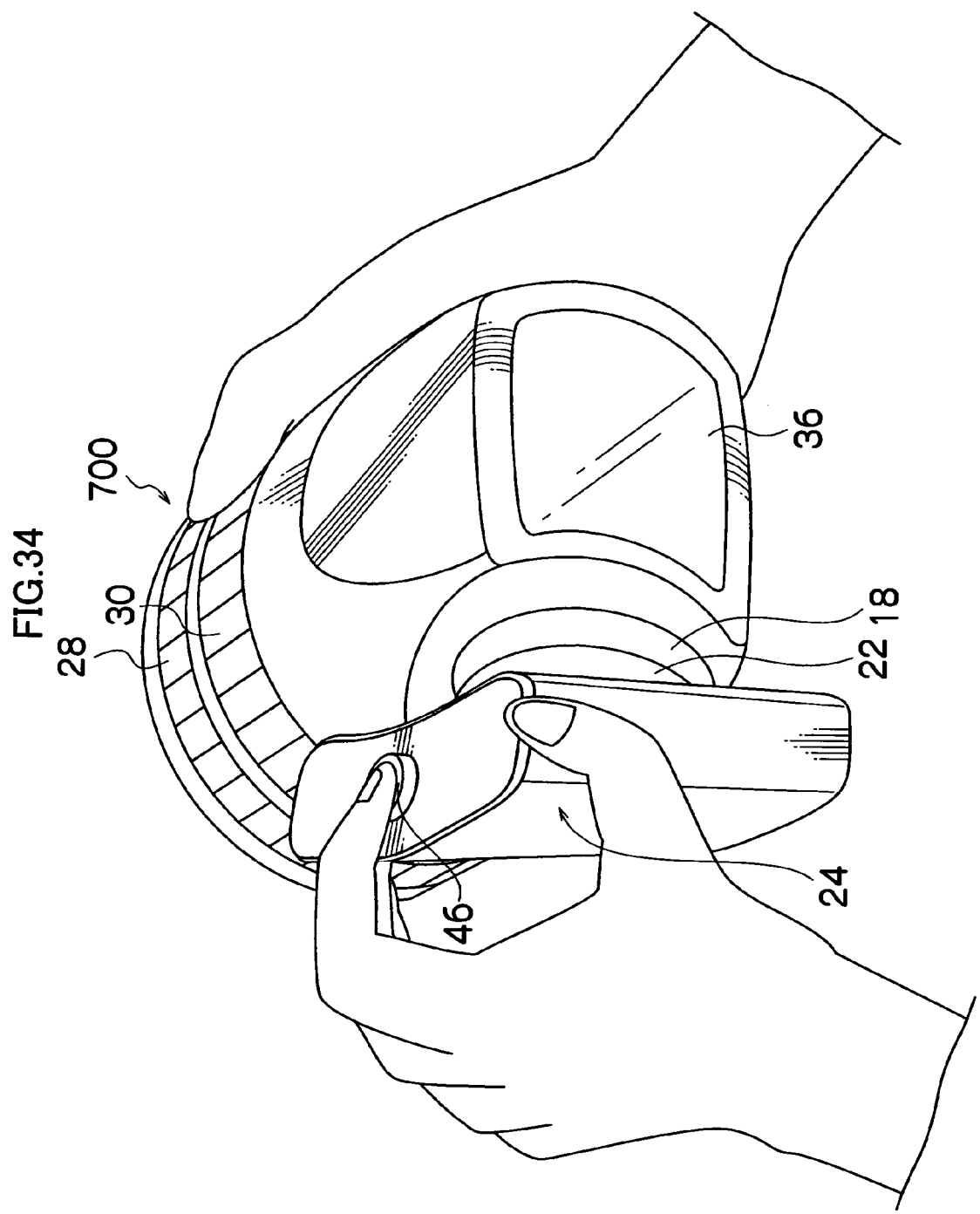
FIG. 34 is a perspective view showing a usage type of the digital camera of FIG. 31.

As shown in FIG. 32, the camera body 24 is rotatably structured relative to the lens part 12. FIG. 33 shows a form of a specification for right-handed persons. A rotation of the camera body 24 by 180 degrees from the state makes the form changed into the one of a specification for left-handed persons shown in FIG. 34.

Figure 35:
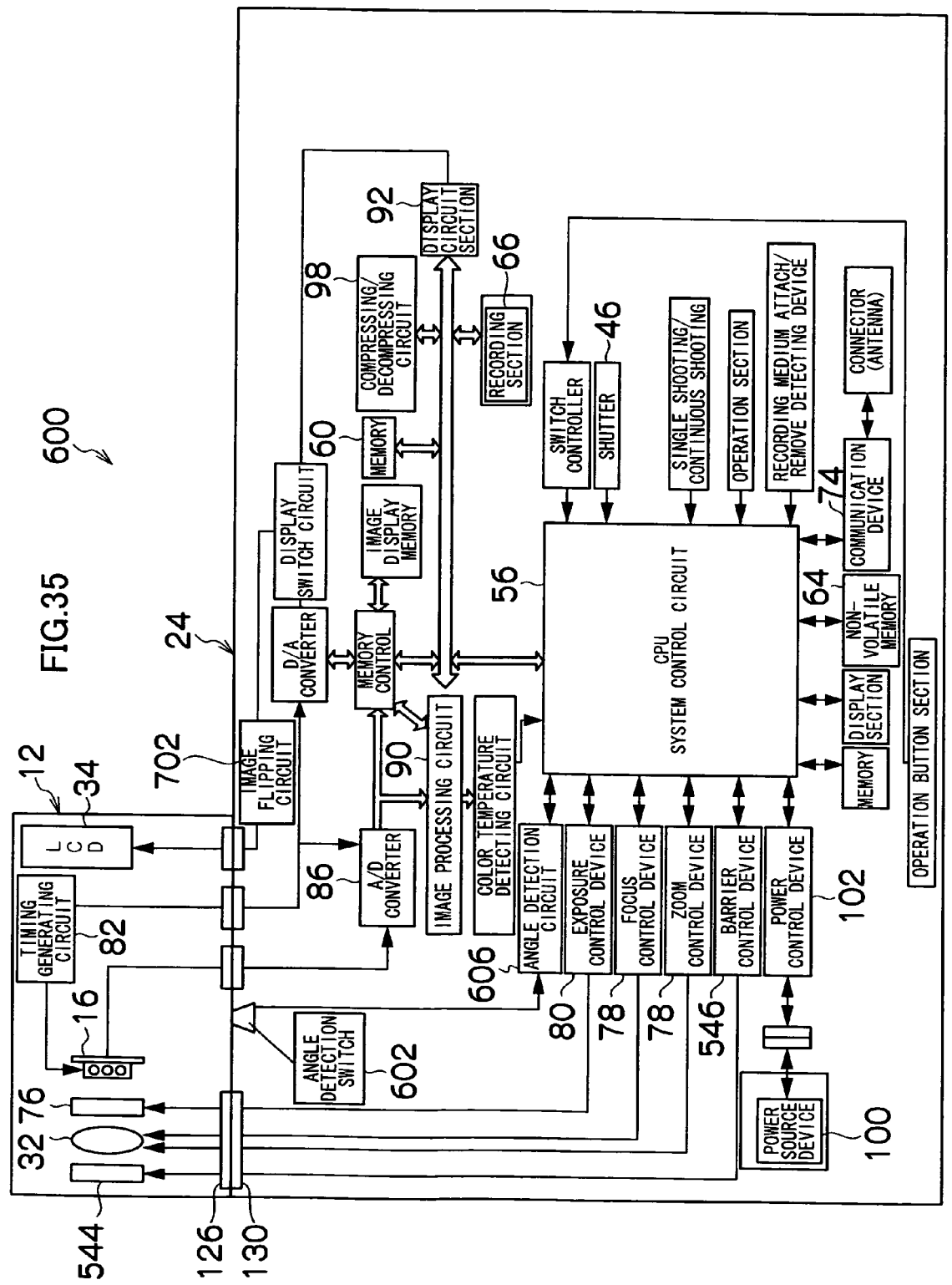
FIG. 35 is a block diagram showing an entire structure of the digital camera of FIG. 31.

According to the block diagram shown in FIG. 35, the mount part 22 has an angle detecting switch 602 of the camera body 24 for detecting the specification for right-handed persons or the specification for left-handed persons. When the CPU 55 detects the form of the specification for left-handed persons via the angle detecting circuit 606 by the angle detecting switch 602, an image processing circuit 90 outputs an image which is reversed by 180 degrees to a display reversing circuit 702, as an operation corresponding to the form of the specification for left-handed persons. This allows the image to be correctly recorded, but since the liquid crystal display monitor 36 is also reversed, the display reversing circuit 702 is caused to operate, thereby the display on the liquid crystal display monitor 36 is rotated by 180 degrees to be displayed. In this way, in the form of FIG. 34, a formed image is displayed on the liquid crystal display monitor.

FIG. 36 to FIG. 42 show another embodiment of a digital camera 800, in which the same or similar members to those of the digital camera 1 shown in FIG. 1 to FIG. 9 are given the same reference numerals and will not be discussed or illustrated in detail herein.

Figure 36:
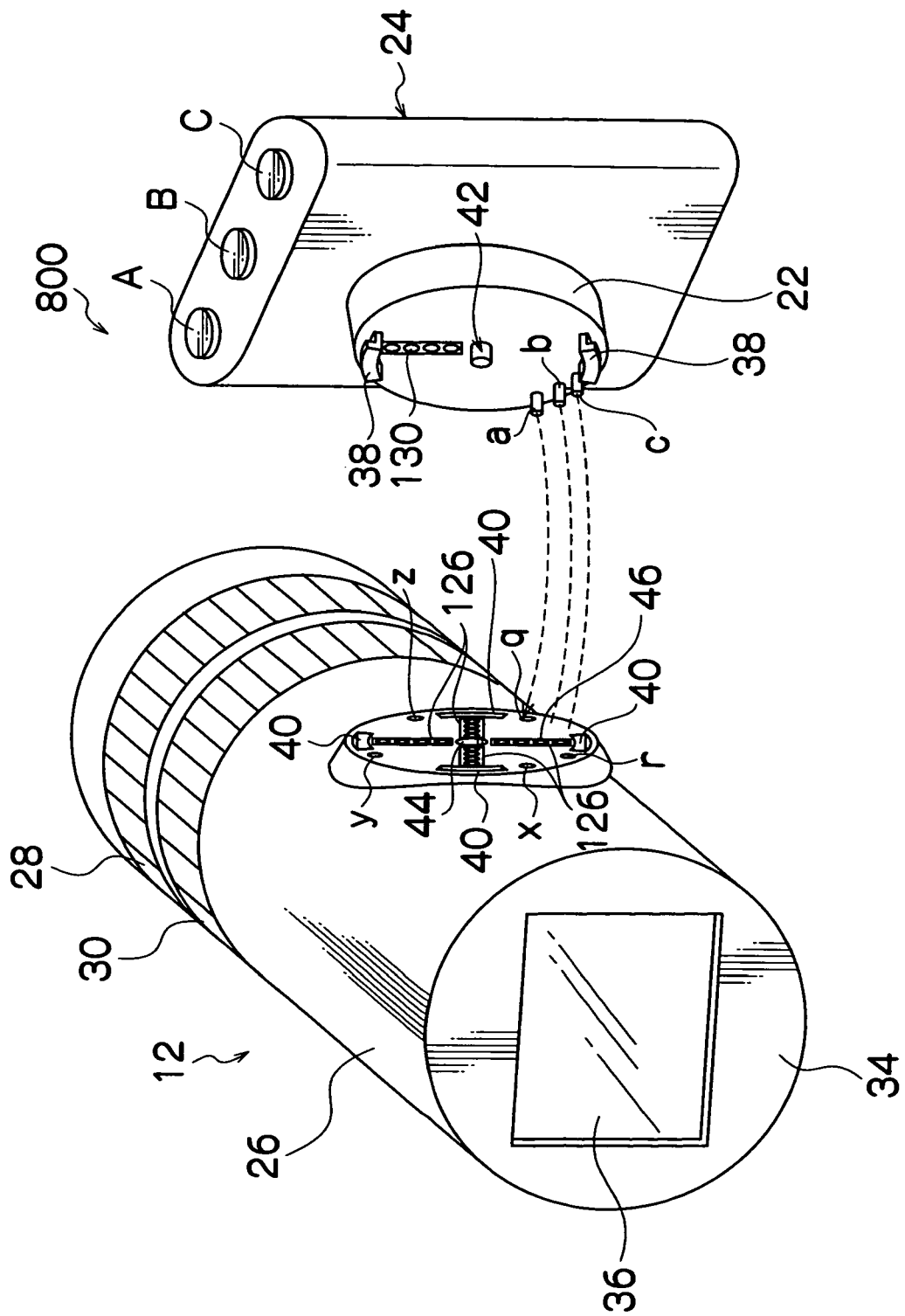
FIG. 36 is a perspective view showing another embodiment of a digital camera.

As shown in FIG. 36, the camera body 24 has two symmetry lock pawls 38 on the mount part 22, and when lock pawls 38 are engaged in the lock holes 40 in the les part 12, the camera body 24 is mounted to the lens part 12. The lock pawls 38 and the lock holes 40 are removably configured with a lock releasing mechanism (not shown) which makes the lock pawls 38 retracted inward to release the engagement. The lock holes 40 are concentrically arranged at 90 degrees in the same shape at four locations, so that the camera body 24 can be mounted at the four angles rotated by 90 degrees including the angle of FIG. 36. In order to make the camera body 24 and the lens part 12 in conduction with each other at the rotated four angles, the connector 126 of the mount part 18 is radially arranged at every 90 degrees about the mount part 18. The lens part 12 has the liquid crystal display monitor 36 on the back surface 34 of the lens part 12, thereby a preview image is displayed during image pickup, and a recorded image id displayed during playback.

Figure 37:
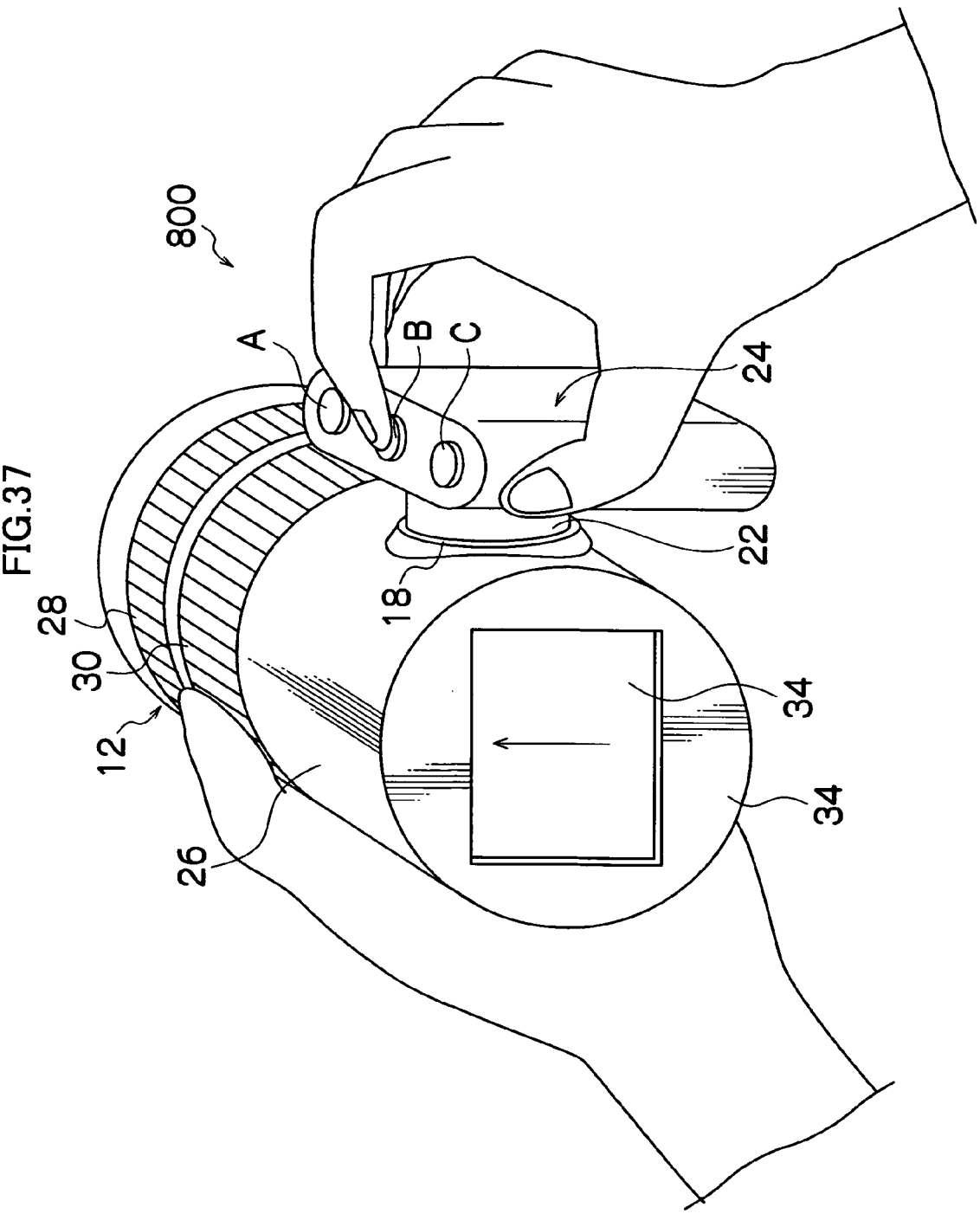
FIG. 37 is a perspective view showing a usage type of the digital camera of FIG. 36.

FIG. 37 shows the camera body 24 mounted to the lens part 12 at the angle shown in FIG. 36. When a user holds the digital camera 800 with his/her right hand in this way, the digital camera 800 provides a form suitable for an operation for picking up a static image.

Figure 38:
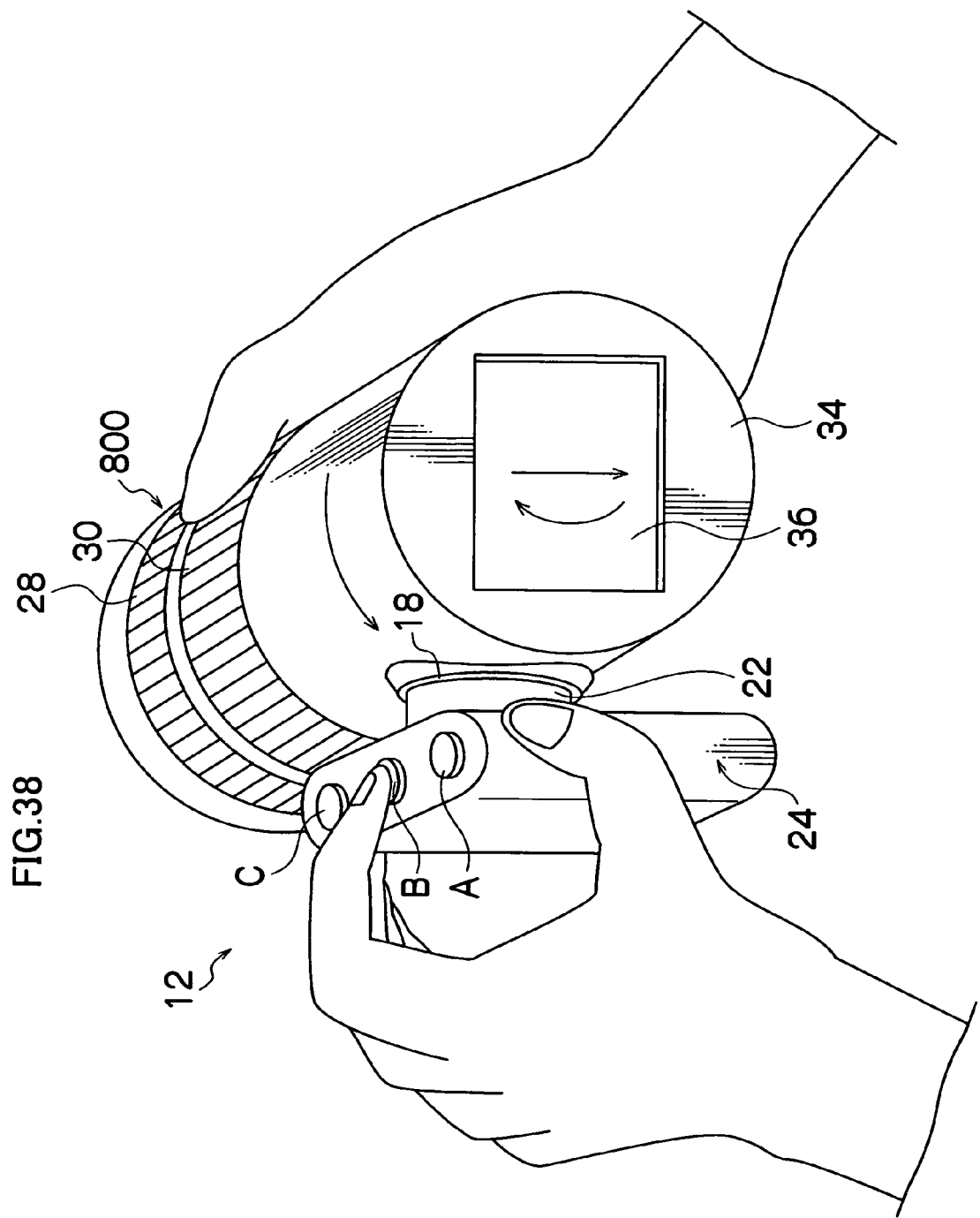
FIG. 38 is a perspective view showing a usage type of the digital camera of FIG. 36.

FIG. 38 shows the camera body 24 having a specification for left-handed persons, which is rotated by 180 degrees from the state of FIG. 37. As shown in FIG. 38, the digital camera 800 provides a form suitable for an operation for picking up a static image when a user holds the digital camera 800 with his/her left hand.

Figure 39:
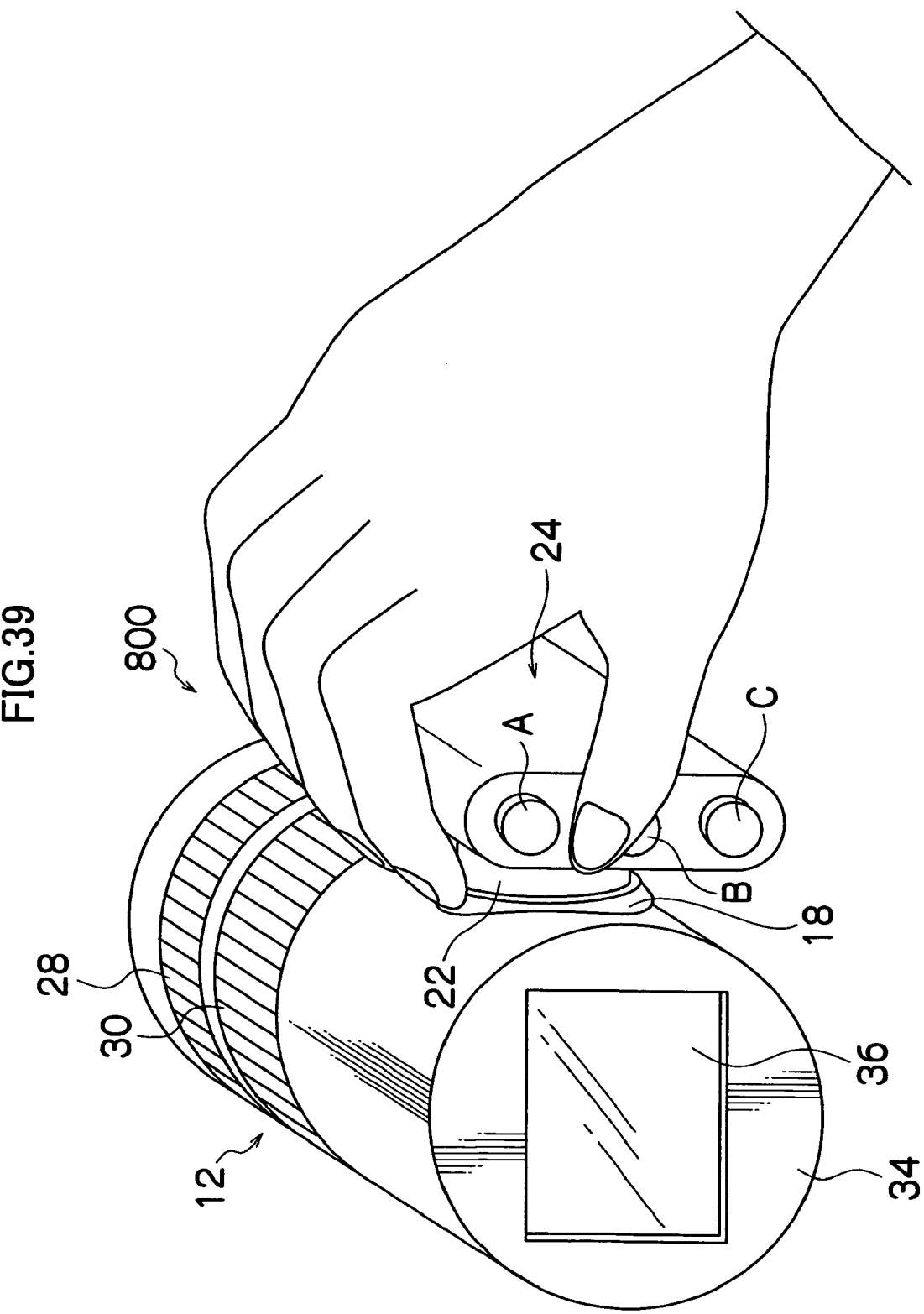
FIG. 39 is a perspective view showing a usage type of the digital camera of FIG. 36.

FIG. 39 shows a usage type of the digital camera 24 which is rotated by 90 degrees counterclockwise toward a user from the state of FIG. 27, and mounted. In this case, a user holds the digital camera 800 from the top of the camera body 24 with his/her hand, and this provides a form that the user do not get tired after a long time of holding, and the operation mode is changed into a dynamic image pick-up mode, which will be explained below.

Figure 40:
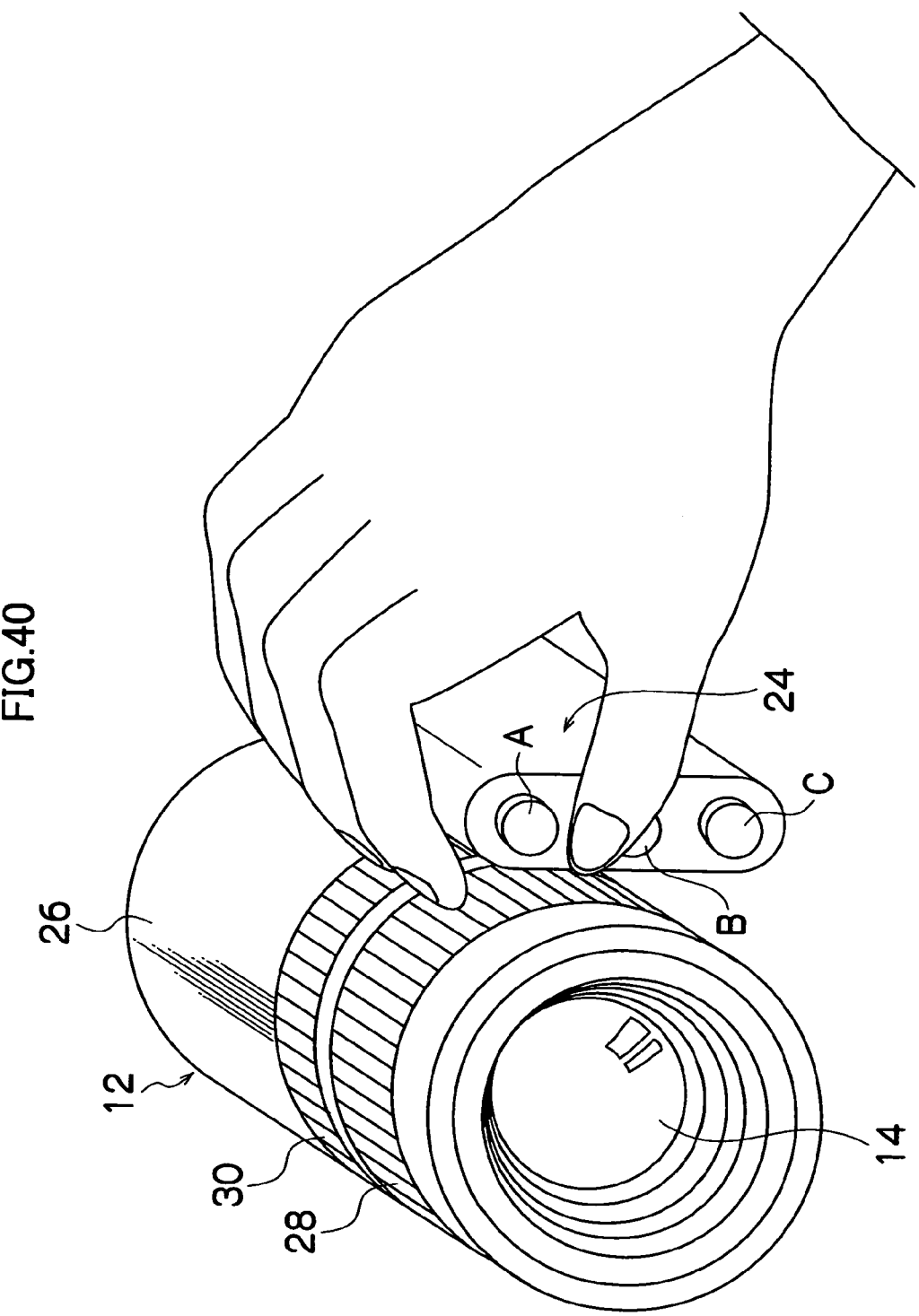
FIG. 40 is a perspective view showing a usage type of the digital camera of FIG. 36.

FIG. 40 shows a form of the digital camera 800 suitable for a self portrait, which is obtained by rotating the camera body 24 toward a user by 90 degrees from the state of FIG. 27.

Figure 41:
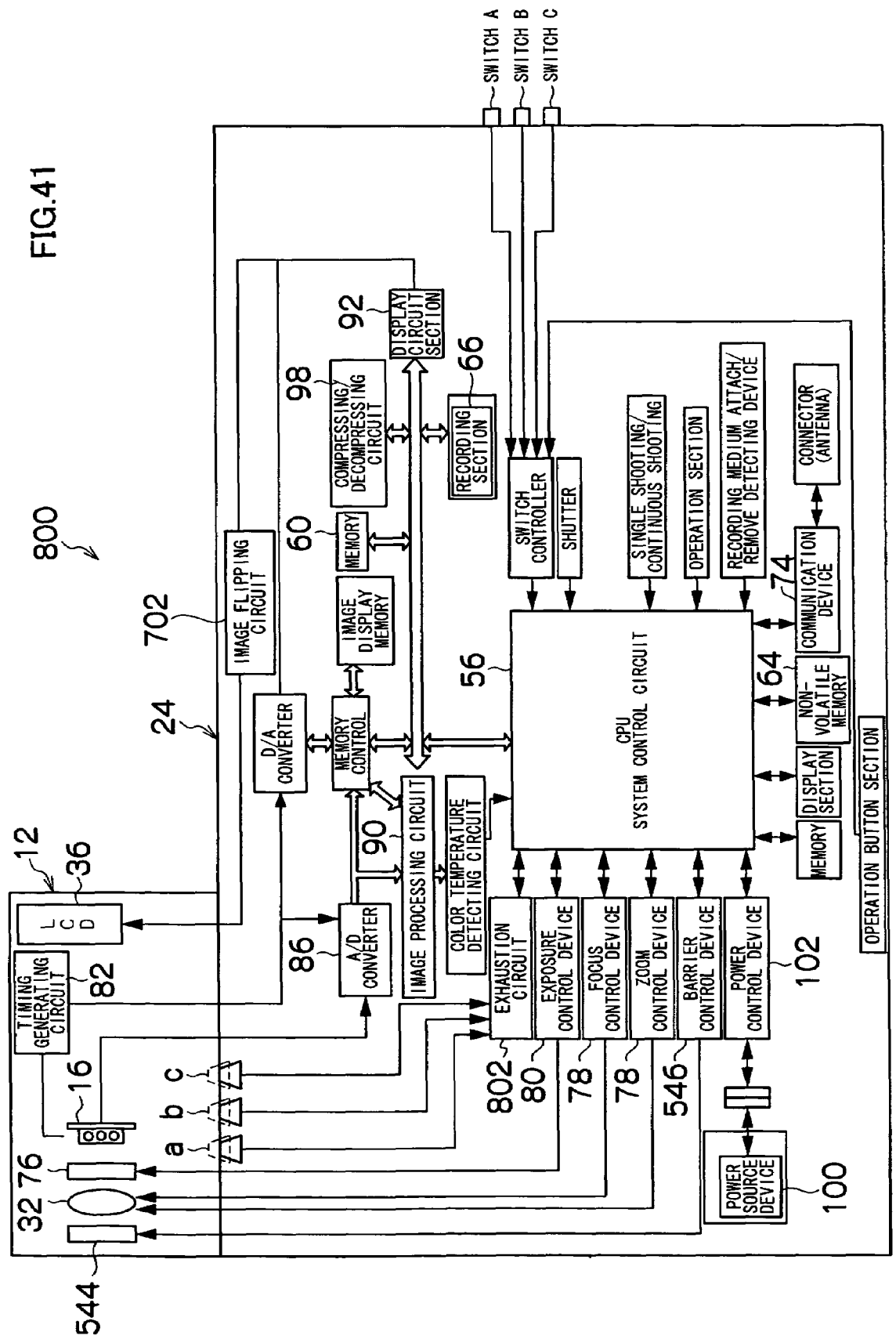
FIG. 41 is a block diagram showing an entire structure of the digital camera of FIG. 36.

The angle (direction) of the camera body 24 relative to the lens part 12 is obtained by detecting the position of the three detection pins a, b, c shown in FIG. 36 by a detecting circuit 802 shown in FIG. 41. The CPU 56 automatically performs operations for reversing a recorded image, reversing an image displayed on the liquid crystal display monitor 36, switching the dynamic image pick-up mode/static image pick-up mode, and switching function/action upon a press of a switch A, B, or C of the camera body 24, depending on the mounted state.

The mount part 18 of the lens part 12 has four connectors 126 at 90 degrees so that the connectors contact the connector 130 of the camera body 24 when the camera body 24 is positioned at four positions shown in FIG. 37 to FIG. 40 respectively.

FIG. 41 is a block diagram showing a structure of the digital camera 800.

As shown in FIG. 41, the mount part 22 of the camera body 24 has detection pins a, b, c for detecting the state of the mounted camera body 24, and the lens part 23 includes the liquid crystal display monitor 36 which is driven by a display circuit 92 of the camera body 24. An image reversing circuit 702 is provided between the display circuit 92 and the liquid crystal display monitor 38, so that when a holding by a left hand is detected, the image reversing circuit 702 outputs an image P which is reversed by 180 degrees, as an action in relation to the left hand. As a displayed image is reversed, an upright image is displayed on the liquid crystal display monitor 36 for the specification for left-handed persons of FIG. 38.

Figure 42:
FIG. 42 is a table showing results detected by detection pins and switching of operations which are linked to the results.

FIG. 42 is a table showing the detections by the detection pins a, b, c, and switches of each action with associated with the detections. The detections by the detection pins a, b, and c are sensed when at least one of the detection pins a, b, c is inserted in holes q, r, x, y, and z which are formed at predetermined positions in the mount part 18 of the lens part 12.

According to the FIG. 42, with the detections pin a, b, and c being projected, the les part 12 is not mounted yet, and in this case, recorded image, LCD recorded image, movie/still, and the switches A, B, and C are all in OFF state.

Next, when the lens part 12 is mounted to the camera body 24 at the position for right hand which is shown in FIG. 37, the detection pin a is inserted in the hole q to be in PROJECTED state, and the detection pins b and c are pushed into the bottom of the mount part 18 to be in PUSHED IN state. In this case, the power source is ON, both of the recorded image and LCD recorded image are displayed upright, and the movie/still is in a still mode for picking up a static image. And the switch A is set to be a release button (image pickup button), the switch B is set to be a decision button, and the switch C is set to be a mode switch button.

Next, when the camera body 24 is positioned to the position for left hand which is shown in FIG. 38, the detection pins a, b are pushed into the bottom of the mount part 18 to be in PUSHED IN state, and the detection pin c is inserted into the hole y to be in PROJECTED state. In this case, the power source is ON, both of the recorded image and LCD recorded image are reversed by 180 degrees and displayed, and the movie/still is in a still mode for picking up a static image. And the switch A is set to be a mode switch button, the switch B is set to be a decision button, and the switch C is set to be a release button.

Then, when the camera body 24 is positioned at the movie position shown in FIG. 39, the detection pins a and c are pushed into the bottom of the mount part 18 to be in PUSHED IN state, and the detection pin b is inserted into the hole z to be in PROJECTED state. In this case, the power source is ON, both of the recorded image and LCD recorded image are displayed upright, and the movie/still is in a still mode for picking up a dynamic image. And the switch A is set to be a mode switch button, the switch B is set to be a record button, and the switch C is set to be a decision button.

And when the camera body 24 is positioned at a self portrait position shown in FIG. 40, the detection pins a and c are inserted into the hole r and x to be in PROJECTED state, and the detection pin b is pushed into the bottom of the mount part 18 to be in PUSHED IN state. In this case, the power source is ON, the recorded image is reversed by 180 degrees and displayed, the LCD recorded image are in OFF state, and both of the movie/still can be selective. And the switch A is set to be a mode switch button for movie or still, the switch B is set to be a record button upon a selection of movie or a release button upon a selection of still, and the switch C is set to be a decision button.

As described above, according to this embodiment of digital camera 800, an appropriate operation mode is automatically set depending to a position of the camera body 24 relative to the lens part 12, which provides a highly user-friendly digital camera.

What is claimed is:

1. A camera, comprising:
   a lens part having an image pickup device and a plurality of mounts;
   a camera body having an identifying device for identifying to which one of the plurality of mount parts the camera body is mounted; and
   a switching device which is provided to the camera body, the switching device for switching a camera control which is performed by a member provided to the camera body based on the mount part identified by the identifying device.

2. The camera according to claim 1, further comprising a rotatable viewfinder provided to the camera body,
   wherein the rotatable viewfinder is caused to rotate depending on a mounted position of the camera body relative to the lens part.

* * * * *